(12) United States Patent
Kitao

(10) Patent No.: US 7,349,880 B1
(45) Date of Patent: Mar. 25, 2008

(54) COMMERCE INFORMATION PROCESSOR, COMMERCE TERMINAL, COMMERCE INFORMATION PROCESSING METHOD, AND RECORDED MEDIUM

(75) Inventor: Yoshitaka Kitao, Tokyo (JP)

(73) Assignee: SBI Securities Co., Ltd., Tokyo (JP)

(*) Notice: Subject to any disclaimer, the term of this patent is extended or adjusted under 35 U.S.C. 154(b) by 1380 days.

(21) Appl. No.: 09/890,171

(22) PCT Filed: Oct. 12, 2000

(86) PCT No.: PCT/JP00/07071

§ 371 (c)(1),
(2), (4) Date: Jul. 26, 2001

(87) PCT Pub. No.: WO01/55923

PCT Pub. Date: Aug. 2, 2001

(30) Foreign Application Priority Data

Jan. 27, 2000 (JP) .............................. 2000-018235

(51) Int. Cl.
*G06Q 40/00* (2006.01)
(52) U.S. Cl. .............................. 705/37; 705/35; 705/36
(58) Field of Classification Search ............ 705/10–44
See application file for complete search history.

(56) References Cited

U.S. PATENT DOCUMENTS

| 4,903,201 | A |   | 2/1990 | Wagner |
|---|---|---|---|---|
| 5,671,358 | A |   | 9/1997 | Debe et al. |
| 5,758,097 | A |   | 5/1998 | Debe et al. |
| 5,803,500 | A | * | 9/1998 | Mossberg .................... 283/67 |
| 5,809,483 | A |   | 9/1998 | Broka et al. |
| 6,151,589 | A | * | 11/2000 | Aggarwal et al. ........ 705/36 R |

FOREIGN PATENT DOCUMENTS

| JP | 10-207966 | 1/1998 |
|---|---|---|
| JP | 10-320470 | 12/1998 |
| WO | 97/037315 | 10/1997 |

OTHER PUBLICATIONS

PCT International Application Publication No. WO 97/37315; Fisher et al "Method and System for Processing and Transmitting Electronic Auction Information" Publication date: Oct. 9, 1997.
PCT International Application Publication No. WO 90/1157; Belden et al "Simulated Live Market Trading System"; Publication date: Oct. 4, 1990.

* cited by examiner

*Primary Examiner*—Frantzy Poinvil
(74) *Attorney, Agent, or Firm*—Lowe, Hauptman, Ham & Berner, LLP

(57) ABSTRACT

A transaction information processing apparatus and the like for carrying out electronic business transactions of various products and services is provided. Equipped with a subscription information database (12) for storing a subscription total number or a subscription total amount, a bid information database (15) for storing a bid unit price and a bid number or a bid total amount, and successful bid processing section (21*h*) for carrying out a successful bid processing of a transaction item. This successful bid processing section (21*h*) includes a successful bid stock price determination section (21*j*) for determining the same successful bid price to all the successful bidders, and a successful bid stock number determination section (21*k*) for determining successful bid numbers to all the successful bidders. According to this apparatus, it is possible to determine objectively and rationally prices of products of which actual transaction volumes are small.

15 Claims, 55 Drawing Sheets

FIG.4

ISSUE ENTERPRISE INFORMATION DB

| ISSUE ENTERPRISE ID | PASSWORD | COMPANY NAME | ADDRESS | ELECTRONIC MAIL ADDRESS | ENTERPRISE BASIC INFORMATION | PROSPECTUS DATA | DESIRED ATTRIBUTE INFORMATION | BUSINESS POLICY INFORMATION |
|---|---|---|---|---|---|---|---|---|
| HID0001 | XXXX | OO CO., LTD. | ---, TOKYO | OX@OO.co.jp | TEXT | PDF | TEXT | TEXT |
| HID0002 | XXXX | COMPANY △△ | ---, TOKYO | XX@△OO.co.jp | TEXT | PDF | TEXT | TEXT |

FIG.5

INVESTOR INFORMATION DB

| INVESTOR DB | PASSWORD | COMPANY NAME | ADDRESS | ELECTRONIC MAIL ADDRESS | ATTRIBUTE INFORMATION | INVESTMENT POLICY INFORMATION |
|---|---|---|---|---|---|---|
| TID0001 | XXXX | ○○ LIFE INSURANCE | ---, TOKYO | O×@○○.co.jp | TEXT | TEXT |
| TID0002 | XXXX | X△VC | ---, TOKYO | ××@△○○.co.jp | TEXT | TEXT |

FIG.6

SUBSCRIPTION DB

| ISSUE ENTERPRISE ID | ISSUING SYSTEM | SUBSCRIPTION CONDITION ||||||||
|---|---|---|---|---|---|---|---|---|
| | | SUCCESSFUL BID STOCK NUMBER (STOCKS) | SUBSCRIPTION TOTAL AMOUNT (YEN) | LOWEST BID STOCK PRICE (YEN) | LOWEST BID STOCK NUMBER (STOCKS) | LOWEST BID TOTAL AMOUNT (YEN) | UNIT STOCK NUMBER (STOCKS) | BID PERIOD | SCHEDULED SUCCESSFUL BID PROCESSING DATE | BID DUE DATE |
| HID0001 | STOCK NUMBER ISSUING SYSTEM | 1,000 | ····· | 10,000 | 800 | ····· | NONE | 2000.6.1~ 2000.6.3 | 2000.6.4 | 2000.6.30 |
| HID0002 | TOTAL AMOUNT ISSUING SYSTEM | ····· | 100,000,000 | 10,000 | ····· | 50,000,000 | 100 | 2000.6.5~ 2000.6.7 | 2000.6.8 | 2000.6.30 |

FIG.7

SELECTION INFORMATION DB

| ISSUE ENTERPRISE ID | INVESTOR ID |
|---|---|
| HID0001 | TID0005,TID0021,~ |
| HID0002 | TID0001,TID0003,~ |

FIG.8

REFERENCE RECORD INFORMATION DB

| ISSUE ENTERPRISE ID | INVESTOR ID |
|---|---|
| HID0001 | TID0021,TID0052,~ |
| HID0002 | TID0001,TID0003,~ |

FIG.9

BID INFORMATION DB

| ISSUE ENTERPRISE ID | INVESTOR ID | BID STOCK PRICE (YEN) | BID STOCK NUMBER (STOCKS) | BID TOTAL AMOUNT (YEN) | LOWEST PERMISSIBLE PURCHASE STOCK NUMBER (STOCKS) |
|---|---|---|---|---|---|
| HID0001 | TID0021 | 300,000 | 200 | · · · · | NONE |
|  | TID0052 | 400,000 | 300 | · · · · | 200 |
|  | TID0213 | 200,000 | · · · · | 40,000,000 | NONE |

FIG.10

SUCCESSFUL BID INFORMATION DB

| ISSUE ENTERPRISE ID | INVESTOR ID | SUCCESSFUL BID PRICE (YEN) | SUCCESSFUL BID STOCK NUMBER (STOCK) | CONTRACT AMOUNT (YEN) |
|---|---|---|---|---|
| HID0001 | TID0224 | 300,000 | 500 | 150,000,000 |
|  | TID0234 | 300,000 | 400 | 120,000,000 |

[CASE 1]

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | NONE |

(b)

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 700 | NONE |
| B | STOCK NUMBER BIDDING SYSTEM | 400,000 | 200 | NONE |
| C | STOCK NUMBER BIDDING SYSTEM | 300,000 | 100 | NONE |
| D | STOCK NUMBER BIDDING SYSTEM | 200,000 | 500 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |
| B | 400,000 | 200 | 900 |
| C | 300,000 | 100 | 10,000 |

← DETERMINE SUCCESSFUL BID STOCK PRICE (e)

| BIDDERS | SUCCESSFUL BID STOCK PRICE (YEN) | SUCCESSFUL BID STOCK NUMBER (STOCKS) |
|---|---|---|
| A | 300,000 | 700 |
| B | 300,000 | 200 |
| C | 300,000 | 100 |
| D | · · · · | 0 |

[CASE 2]

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | NONE |

(b)

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 700 | NONE |
| B | STOCK NUMBER BIDDING SYSTEM | 400,000 | 200 | NONE |
| C | STOCK NUMBER BIDDING SYSTEM | 300,000 | 300 | NONE |
| D | STOCK NUMBER BIDDING SYSTEM | 300,000 | 200 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |
| B | 400,000 | 200 | 900 |
| C | 300,000 | 300 | 1,200 |
| D | 300,000 | 200 | 1,400 |

← DETERMINE SUCCESSFUL BID STOCK PRICE (e)

| BIDDERS | SUCCESSFUL BID STOCK PRICE (YEN) | SUCCESSFUL BID STOCK NUMBER (STOCKS) |
|---|---|---|
| A | 300,000 | 700 |
| B | 300,000 | 200 |
| C | 300,000 | 60 |
| D | 300,000 | 40 |

[CASE 3]

(a)

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | 100 |

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 700 | NONE |
| B | STOCK NUMBER BIDDING SYSTEM | 400,000 | 200 | NONE |
| C | STOCK NUMBER BIDDING SYSTEM | 300,000 | 300 | 100 |
| D | STOCK NUMBER BIDDING SYSTEM | 300,000 | 200 | 100 |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 700 | 700 |
| B | 400,000 | 200 | 900 |
| C | 300,000 | 300 | 1,200 | ←DETERMINE SUCCESSFUL BID STOCK PRICE (e)

| BIDDERS | SUCCESSFUL BID STOCK PRICE (YEN) | SUCCESSFUL BID STOCK NUMBER (STOCKS) |
|---|---|---|
| A | 300,000 | 700 |
| B | 300,000 | 200 |
| C | 300,000 | 100 |
| D | 300,000 | 0 |

[CASE 4]

(a)

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | 100 |

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 500 | NONE |
| B | STOCK NUMBER BIDDING SYSTEM | 400,000 | 300 | NONE |
| C | STOCK NUMBER BIDDING SYSTEM | 300,000 | 300 | NONE |
| D | STOCK NUMBER BIDDING SYSTEM | 300,000 | 100 | NONE |
| E | STOCK NUMBER BIDDING SYSTEM | 300,000 | 100 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |
| B | 400,000 | 300 | 800 |
| C | 300,000 | 300 | 1,100 | ←DETERMINE SUCCESSFUL BID STOCK PRICE (e)

| BIDDERS | SUCCESSFUL BID STOCK PRICE (YEN) | SUCCESSFUL BID STOCK NUMBER (STOCKS) |
|---|---|---|
| A | 300,000 | 500 |
| B | 300,000 | 300 |
| C | 300,000 | 100 |
| D | 300,000 | (100) |
| E | 300,000 | (0) |

} LOT (for rows D and E)

FIG. 30

[CASE 5]

(a)

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | 100 |

(b)

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 500 | NONE |
| B | STOCK NUMBER BIDDING SYSTEM | 400,000 | 300 | NONE |
| C | STOCK NUMBER BIDDING SYSTEM | 300,000 | 300 | 200 |
| D | STOCK NUMBER BIDDING SYSTEM | 300,000 | 100 | NONE |
| E | STOCK NUMBER BIDDING SYSTEM | 300,000 | 100 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |
| B | 400,000 | 300 | 800 |
| C | 300,000 | 300 | 1,100 ← DETERMINE SUCCESSFUL BID STOCK PRICE |

(e)

| BIDDERS | SUCCESSFUL BID STOCK PRICE (YEN) | SUCCESSFUL BID STOCK NUMBER (STOCKS) |
|---|---|---|
| A | 300,000 | 500 |
| B | 300,000 | 300 |
| C | 300,000 | 0 |
| D | 300,000 | 100 |
| E | 300,000 | 100 |

[CASE 6]

(a)

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | 100 |

| BIDDERS | ISSUING SYSTEM | BID STOCK PRICE (YEN) | BID STOCK NUMBER (STOCKS) | LOWEST PERMISSIBLE PURCHASE STOCK NUMBER (STOCKS) |
|---|---|---|---|---|
| A | STOCK NUMBER BIDDING SYSTEM | 500,000 | 500 | NONE |
| B | STOCK NUMBER BIDDING SYSTEM | 400,000 | 400 | NONE |
| C | STOCK NUMBER BIDDING SYSTEM | 300,000 | 100 | NONE |
| D | STOCK NUMBER BIDDING SYSTEM | 300,000 | 100 | NONE |
| E | STOCK NUMBER BIDDING SYSTEM | 300,000 | 100 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 500 | 500 |
| B | 400,000 | 400 | 900 |
| C | 300,000 | 100 | 1,000 |

← DETERMINE SUCCESSFUL BID STOCK PRICE (e)

| BIDDERS | SUCCESSFUL BID STOCK PRICE (YEN) | SUCCESSFUL BID STOCK NUMBER (STOCKS) |
|---|---|---|
| A | 300,000 | 500 |
| B | 300,000 | 400 |
| C | 300,000 | (100) |
| D | 300,000 | (100) |
| E | 300,000 | (100) |

} LOT

[CASE 7]

(a)

| ISSUING SYSTEM | STOCK NUMBER ISSUING SYSTEM |
|---|---|
| SUBSCRIPTION STOCK NUMBER (STOCKS) | 1,000 |
| UNIT STOCK NUMBER (STOCKS) | NONE |

| BIDDERS | ISSUING SYSTEM | BID STOCK PRICE (YEN) | BID TOTAL AMOUNT (YEN) | LOWEST PERMISSIBLE PURCHASE STOCK NUMBER (STOCKS) |
|---|---|---|---|---|
| A | TOTAL AMOUNT BIDDING SYSTEM | 500,000 | 150,000,000 | NONE |
| B | TOTAL AMOUNT BIDDING SYSTEM | 400,000 | 120,000,000 | NONE |
| C | TOTAL AMOUNT BIDDING SYSTEM | 300,000 | 90,000,000 | NONE |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 500,000 | 300 | 300 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 400,000 | 375 | 375 |
| B | 400,000 | 300 | 675 |

(e)

| BIDDERS | SUCCESSFUL BID STOCK PRICE (YEN) | SUCCESSFUL BID STOCK NUMBER (STOCKS) | CUMULATIVE STOCK NUMBER (STOCKS) |
|---|---|---|---|
| A | 300,000 | 500 | 500 |
| B | 300,000 | 400 | 900 |
| C | 300,000 | 300 | 1,200 |

← DETERMINE SUCCESSFUL BID STOCK PRICE (f)

| BIDDERS | SUCCESSFUL BID STOCK PRICE (YEN) | SUCCESSFUL BID STOCK NUMBER (STOCKS) |
|---|---|---|
| A | 300,000 | 500 |
| B | 300,000 | 400 |
| C | 300,000 | 100 |

[CASE 8]

(a)

| ISSUING SYSTEM | TOTAL AMOUNT ISSUING SYSTEM |
|---|---|
| SUBSCRIPTION TOTAL AMOUNT (YEN) | 100,000,000 |
| UNIT STOCK NUMBER (STOCKS) | NONE |

| BIDDERS | ISSUING SYSTEM | BID STOCK PRICE (YEN) | BID TOTAL AMOUNT (STOCKS) |
|---|---|---|---|
| A | STOCK NUMBER BIDDING SYSTEM | 200,000 | 300 |
| B | STOCK NUMBER BIDDING SYSTEM | 150,000 | 500 |
| C | STOCK NUMBER BIDDING SYSTEM | 150,000 | 300 |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID AMOUNT (YEN) |
|---|---|---|---|---|
| A | 200,000 | 300 | 60,000,000 | 60,000,000 |

(d)

| BIDDERS | SUCCESSFUL BID STOCK PRICE (YEN) | SUCCESSFUL BID STOCK NUMBER (STOCKS) | PAID AMOUNT (YEN) | CUMULATIVE BID AMOUNT (YEN) |
|---|---|---|---|---|
| A | 200,000 | 300 | 60,000,000 | 60,000,000 |
| B | 150,000 | 500 | 75,000,000 | 135,000,000 |

← DETERMINE SUCCESSFUL BID STOCK PRICE (e)

| BIDDERS | SUCCESSFUL BID STOCK PRICE (YEN) | SUCCESSFUL BID STOCK NUMBER (STOCKS) | PAID AMOUNT (YEN) | CUMULATIVE BID AMOUNT (YEN) |
|---|---|---|---|---|
| A | 150,000 | 300 | 60,000,000 | 60,000,000 |
| B | 150,000 | 166 | 24,900,000 | 84,900,000 |
| C | 150,000 | 100 | 15,000,000 | 99,900,000 |

[CASE 9]

| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 200,000 | 500 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 200,000 | 350 | 350 |
| B | 200,000 | 500 | 850 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 190,000 | 368 | 368 |
| B | 190,000 | 500 | 868 |

(e)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 150,000 | 466 | 466 |
| B | 150,000 | 500 | 966 |
| C | 150,000 | 300 | 1,266 ← DETERMINE SUCCESSFUL BID STOCK PRICE |

(f)

| BIDDERS | SUCCESSFUL BID STOCK PRICE (YEN) | SUCCESSFUL BID STOCK NUMBER (STOCKS) | PAID AMOUNT (YEN) |
|---|---|---|---|
| A | 150,000 | 466 | 6,919 |
| B | 150,000 | 500 | 10,081 |
| C | 150,000 | 34 | 0 |

FIG.35

[CASE 10]

(a)

| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 200,000 | 500 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 200,000 | 350 | 350 |
| B | 200,000 | 600 | 950 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 190,000 | 368 | 368 |
| B | 190,000 | 600 | 968 |

(e)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 170,000 | 411 | 411 |
| B | 170,000 | 600 | 1,011 |

← DETERMINE SUCCESSFUL BID STOCK PRICE (f)

| BIDDERS | SUCCESSFUL BID STOCK PRICE (YEN) | SUCCESSFUL BID STOCK NUMBER (STOCKS) | PAID AMOUNT (YEN) |
|---|---|---|---|
| A | 170,000 | 407 | 69,190,000 |
| B | 170,000 | 593 | 100,810,000 |

[CASE 11]

| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 200,000 | 600 | · · · · |
| C | STOCK NUMBER BIDDING SYSTEM | 170,000 | 300 | · · · · |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 200,000 | 350 | 350 |
| B | 200,000 | 600 | 950 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 190,000 | 368 | 368 |
| B | 190,000 | 600 | 968 |

(e)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 170,000 | 411 | 411 |
| B | 170,000 | 600 | 1,011 |
| C | 170,000 | 300 | 1,311 |

← DETERMINE SUCCESSFUL BID STOCK PRICE (f)

| BIDDERS | SUCCESSFUL BID STOCK PRICE (YEN) | SUCCESSFUL BID STOCK NUMBER (STOCKS) | PAID AMOUNT (YEN) |
|---|---|---|---|
| A | 170,000 | 407 | 69,190,000 |
| B | 170,000 | 593 | 100,810,000 |
| C | 170,000 | 0 | 0 |

[CASE 12]

| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 150,000 | 600 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 200,000 | 350 | 350 |

(d)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 190,000 | 368 | 368 |

(e)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 150,000 | 466 | 466 |
| B | 150,000 | 600 | 1,066 |
| C | 150,000 | 300 | 1,366 |

← DETERMINE SUCCESSFUL BID STOCK PRICE (f)

| BIDDERS | SUCCESSFUL BID STOCK PRICE (YEN) | SUCCESSFUL BID STOCK NUMBER (STOCKS) | PAID AMOUNT (YEN) |
|---|---|---|---|
| A | 150,000 | 466 | 69,900,000 |
| B | 150,000 | 356 | 53,400,000 |
| C | 150,000 | 178 | 26,700,000 |

[CASE 13]

| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 150,000 | · · · · | 70,000,000 |
| B | STOCK NUMBER BIDDING SYSTEM | 150,000 | 600 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| A | 150,000 | 466 | 466 |
| B | 150,000 | 600 | 1,066 |
| C | 150,000 | 300 | 1,366 |

← DETERMINE SUCCESSFUL BID STOCK PRICE (d)

| BIDDERS | SUCCESSFUL BID STOCK PRICE (YEN) | SUCCESSFUL BID STOCK NUMBER (STOCKS) | PAID AMOUNT (YEN) |
|---|---|---|---|
| A | 150,000 | 466 | 69,900,000 |
| B | 150,000 | 356 | 53,400,000 |
| C | 150,000 | 178 | 26,700,000 |

[CASE 14]

FIG.39

(a)
| ISSUING SYSTEM | TOTAL AMOUNT ISSUING SYSTEM |
|---|---|
| SUBSCRIPTION STOCK NUMBER (STOCKS) | 1,000 |
| LOWEST BID STOCK PRICE (YEN) | 100,000 |

(b)
| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 150,000 | · · · · | 70,000,000 |
| B | STOCK NUMBER BIDDING SYSTEM | 160,000 | 600 | · · · · |
| C | STOCK NUMBER BIDDING SYSTEM | 150,000 | 300 | · · · · |

(c)
| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| B | 160,000 | 600 | 600 |

(d)
| BIDDERS | SUCCESSFUL BID STOCK PRICE (YEN) | SUCCESSFUL BID STOCK NUMBER (STOCKS) | CUMULATIVE BID STOCK NUMBER (STOCKS) |
|---|---|---|---|
| B | 150,000 | 600 | 600 |
| A | 150,000 | 466 | 1,066 |
| C | 150,000 | 300 | 1,366 |

← DETERMINE SUCCESSFUL BID STOCK PRICE (e)
| BIDDERS | SUCCESSFUL BID STOCK PRICE (YEN) | SUCCESSFUL BID STOCK NUMBER (STOCKS) | PAID AMOUNT (YEN) |
|---|---|---|---|
| B | 150,000 | 600 | 900,000,000 |
| A | 150,000 | 243 | 364,500,000 |
| C | 150,000 | 157 | 23,550,000 |

FIG.40

[CASE 15]

(a)

| ISSUING SYSTEM | TOTAL AMOUNT ISSUING SYSTEM |
|---|---|
| SUBSCRIPTION TOTAL AMOUNT (YEN) | 100,000,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 200,000 | 150 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |
| B | 200,000 | 150 | 30,000,000 | 100,000,000 |

← DETERMINE SUCCESSFUL BID STOCK PRICE (d)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |
| B | 200,000 | 150 | 30,000,000 | 100,000,000 |

[CASE 16]

| ISSUING SYSTEM | TOTAL AMOUNT ISSUING SYSTEM |
|---|---|
| SUBSCRIPTION TOTAL AMOUNT (YEN) | 100,000,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 190,000 | 500 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |

(d)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 190,000 | 368 | 69,920,000 | 69,920,000 |
| B | 190,000 | 500 | 95,000,000 | 164,920,000 |

← DETERMINE SUCCESSFUL BID STOCK PRICE (e)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 190,000 | 368 | 69,920,000 | 69,920,000 |
| B | 190,000 | 158 | 30,020,000 | 99,940,000 |

[CASE 17]

| ISSUING SYSTEM | TOTAL AMOUNT ISSUING SYSTEM |
|---|---|
| SUBSCRIPTION TOTAL AMOUNT (YEN) | 100,000,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 200,000 | 500 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |
| B | 200,000 | 500 | 100,000,000 | 170,000,000 |

← DETERMINE SUCCESSFUL BID STOCK PRICE (d)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 206 | 41,200,000 | 41,200,000 |
| B | 200,000 | 294 | 58,800,000 | 100,000,000 |

FIG.43

[CASE 18]

(a)

| ISSUING SYSTEM | TOTAL AMOUNT ISSUING SYSTEM |
|---|---|
| SUBSCRIPTION TOTAL AMOUNT (YEN) | 100,000,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 150,000 | 600 | · · · · |
| C | STOCK NUMBER BIDDING SYSTEM | 150,000 | 300 | · · · · |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |

(d)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 190,000 | 368 | 69,920,000 | 69,920,000 |

(e)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 150,000 | 466 | 69,900,000 | 69,900,000 |
| B | 150,000 | 600 | 95,000,000 | 159,900,000 |
| C | 150,000 | 300 | 45,000,000 | 204,900,000 |

← DETERMINE SUCCESSFUL BID STOCK PRICE (f)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 150,000 | 466 | 69,900,000 | 69,900,000 |
| B | 150,000 | 133 | 19,950,000 | 89,850,000 |
| C | 150,000 | 67 | 10,050,000 | 99,900,000 |

[CASE 19] FIG.44

(a)

| ISSUING SYSTEM | TOTAL AMOUNT ISSUING SYSTEM |
|---|---|
| SUBSCRIPTION TOTAL AMOUNT (YEN) | 100,000,000 |
| LOWEST BID STOCK PRICE (YEN) | 100,000 |

(b)

| BIDDERS | ISSUING SYSTEM | BID STOCK PRICE (YEN) | BID TOTAL AMOUNT (STOCKS) | BID TOTAL AMOUNT (YEN) |
|---|---|---|---|---|
| A | TOTAL AMOUNT BIDDING SYSTEM | 200,000 | · · · · | 70,000,000 |
| B | STOCK NUMBER BIDDING SYSTEM | 150,000 | 100 | · · · · |
| C | STOCK NUMBER BIDDING SYSTEM | 100,000 | 300 | · · · · |

(c)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 200,000 | 350 | 70,000,000 | 70,000,000 |

(d)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 190,000 | 368 | 69,920,000 | 69,920,000 |

(e)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 150,000 | 466 | 69,900,000 | 69,900,000 |
| B | 150,000 | 100 | 15,000,000 | 84,900,000 |

(f)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 100,000 | 700 | 70,000,000 | 70,000,000 |
| B | 100,000 | 100 | 10,000,000 | 80,000,000 |
| C | 100,000 | 300 | 30,000,000 | 110,000,000 |

← DETERMINE SUCCESSFUL BID STOCK PRICE (g)

| BIDDERS | SUCCESSFUL BID STOCK PRICE (YEN) | SUCCESSFUL BID STOCK NUMBER (STOCKS) | PAID AMOUNT (YEN) | CUMULATIVE BID STOCK AMOUNT (YEN) |
|---|---|---|---|---|
| A | 100,000 | 700 | 70,000,000 | 70,000,000 |
| B | 100,000 | 100 | 10,000,000 | 80,000,000 |
| C | 100,000 | 200 | 20,000,000 | 100,000,000 |

FIG.45

[THIS IS AN ENTERPRISE LIST READING SCREEN]

| COMPANY NAME | ADDRESS | ISSUING SYSTEM | SUCCE-SSFUL BID STOCK NUMBER (STOCKS) | SUBSC-RIPTION TOTAL AMOUNT (YEN) | LOWEST BID STOCK PRICE (YEN) | LOWEST BID STOCK NUMBER (STOCK) | LOWEST BID TOTAL AMOUNT (YEN) | UNIT STOCK NUMBER (STOCKS) | BID PERIOD | SUCCESS-FUL BID PROCESSING SCHEDULED | BID TERM |
|---|---|---|---|---|---|---|---|---|---|---|---|
| ○○ CO., LTD. | ---, TOKYO | STOCK NUMBER ISSUING SYSTEM | 1,000 | ・・・・・ | 10,000 | 800 | ・・・・・ | NONE | 2000.6.1~ 2000.6.3 | 2000.6.4 | 2000.6.30 |
| COMPANY △△ | ---, TOKYO | TOTAL AMOUNT ISSUING SYSTEM | ・・・・・ | 100,000,000 | 10,000 | ・・・・・ | 50,000,000 | 100 | 2000.6.5~ 2000.6.7 | 2000.6.8 | 2000.6.30 |

[THIS BID SCREEN]

BID ITEM : OX CO., LTD.

FOR A PERSON WHO SELECTS THE STOCK NUMBER BIDDING SYSTEM
- BID STOCK PRICE ☐ (YEN) — G9-1
- BID STOCK NUMBER ☐ (STOCKS) — G9-2

FOR A PERSON WHO SELECTS THE TOTAL AMOUNT SELECTION SYSTEM
- BID STOCK PRICE ☐ (YEN) — G9-3
- TOTAL BIT STOCK ☐ (YEN) — G9-4

LOWEST PERMISSIBLE PURCHASE STOCK NUMBER ☐ (STOCKS) — G9-5

CONTENTS OF PROSPECTUS  ⊙ CONFIRMED (G9-6)   ○ NOT YET CONFIRMED (G9-7)

[ BID INDICATION ] — G9-8

FIG.48

[THIS IS A CONFIRMATION SCREEN]

BID ITEM : OX CO., LTD.

PROVISIONAL CONTRACT AMOUNT  [ 57,000,000 ] YEN   (G16-1)

[ CANCEL THE BID ] (G16-2)   [ INDICATE THE BID ] (G16-3)

FIG.52

(SOFTBANK FRONTIER SECURITIES CO., LTD.)
WELCOME TO FRONTIER CLUB

Welcome to FRONTIER CLUB

THIS IS THE SITE FOR MEMBERS OF SOFTBANK FRONTIER SECURITIES CO., LTD.

WELCOME TO FRONTIER CLUB.
PLEASE INPUT USER ID AND PASSWORD.
THEN, PLEASE CLICK LOG-IN BUTTON.

USER ID :

PASSWORD :

TRANSMIT

WHEN YOU CANNOT LOG IN, PLEASE CALL SOFTBANK FRONTIER SECURITIES CO., LTD.

FIG.54

| HOME | LIST OF ISSUE ENTERPRISES | BID | BID RECORD | UTILIZATION METHOD | MEMBER-SHIP RULE AND DETAILS | ABOUT FRONTIER SECURITIES | ENQUIRY | PORTFOLIO -IR |

Mr./Mrs./Miss [        ] HAS LOGGED-IN AT PRESENT

FRONTIER CLUB
— STOCK ISSUE MARKET OF UNLISTED ENTERPRISES —
WELCOME TO FRONTIER CLUB.
FRONTIER CLUB IS A MEMBERSHIP ORGANIZATION STRUCTURED BY INSTITUTIONAL INVESTORS, VENTURE CAPITALS, AND INVESTMENT SPECIALISTS OF BUSINESS COMPANIES.

LATEST INFORMATION        UPDATED ON JANUARY 13, 2000

JANUARY 27, 2000 : HOMEPAGE OF FRONTIER OPENED !

NOVEMBER 30, 1999 : SOFTBANK FRONTIER SECURITIES JOINED JAPAN SECURITIES ASSOCIATION
NOVEMBER 8, 1999 : REGISTRATION OF SECURITIES BUSINESS OF SOFTBANK FRONTIERSECURITIES COMPLETED

▶ CLICK HERE WHEN YOU WANT TO CHECK INFORMATION OF UNLISTED ENTERPRISES

▶ CLICK HERE WHEN YOU WANT TO PARTICIPATE IN BID

FIG.55

(SOFTBANK FRONTIER SECURITIES CO., LTD.) WELCOME TO FRONTIER CLUB

Mr./Mrs./Miss [ ] HAS LOGGED-IN AT PRESENT

1/1 PAGE

| TOP | LIST OF ISSUE ENTERPRISES | BID | BID RECORD | UTILIZATION METHOD | MEMBERSHIP RULE AND DETAILS | ABOUT FRONTIER SECURITIES |

THE FOLLOWING COMPANY NAMES AND DATES ARE SAMPLES FOR DEMONSTRATION

| COMPANY NAME | PLACE | INFORMATION PRESENTATION STARTING DATE | BID PERIOD | PRICE DETERMINATION DATE | DATE OF PAYMENT | REMARK |
|---|---|---|---|---|---|---|
| OX CO., LTD | TOKYO | 2000.2.1~ | 2000.2.15~16 | 2000.2.17 | 2000.2.20 | |
| COMPANY OX | OSAKA | 2000.2.18~ | NOT FIRM | NOT FIRM | NOT FIRM | BID PERIOD WILL BE DETERMINED ON FEBRUARY 12, 2000 |
| ▲■ CO., LTD | KOBE | 2000.2.1~ | 2000.2.11~13 | 2000.2.15 | 2000.2.18 | |

· THE BID PERIOD, THE SUCCESSFUL BID RESULT DETERMINATION DATE, AND THE PAYMENT DATE MAY BE CHANGED

FIG.56

CASE 1  ISSUE STOCK NUMBER···1,000 STOCKS, UNIT STOCK NUMBER···NONE, WHEN THERE IS NO LIMIT TO THE LOWEST PERMISSIBLE PURCHASE STOCK NUMBER IN COMPANY A AND COMPANY B

| | | |
|---|---|---|
| 500 THOUSAND YEN | 700 STOCKS | COMPANY X |
| 400 THOUSAND YEN | 200 STOCKS | COMPANY Y |
| 300 THOUSAND YEN | 500 STOCKS | (300 STOCKS FOR COMPANY A, AND 200 STOCKS FOR COMPANY B) |

IN THIS CASE
1. 60 STOCKS TO COMPANY A, AND 40 STOCKS TO COMPANY B (PROPORTIONAL ALLOCATION)

CASE 2  ISSUE STOCK NUMBER···1,000 STOCKS, UNIT STOCK NUMBER···100 STOCKS, WHEN THE LIMIT OF THE LOWEST PERMISSIBLE PURCHASE STOCK NUMBER IS 100 STOCKS OR ABOVE IN COMPANY A AND COMPANY B

| | | |
|---|---|---|
| 600 THOUSAND YEN | 700 STOCKS | COMPANY X |
| 400 THOUSAND YEN | 200 STOCKS | COMPANY Y |
| 300 THOUSAND YEN | 500 STOCKS | (300 STOCKS FOR COMPANY A, AND 200 STOCKS FOR COMPANY B) |

IN THIS CASE
1. 100 STOCKS TO COMPANY A, AND ZERO STOCKS TO COMPANY B

CASE 3  ISSUE STOCK NUMBER···1,000 STOCKS, UNIT STOCK NUMBER···NONE, WHEN THERE IS NO LIMIT TO THE LOWEST PERMISSIBLE PURCHASE STOCK NUMBER IN COMPANY A , COMPANY B, AND COMPANY C

| | | |
|---|---|---|
| 500 THOUSAND YEN | 600 STOCKS | COMPANY X |
| 400 THOUSAND YEN | 300 STOCKS | COMPANY Y |
| 300 THOUSAND YEN | 500 STOCKS | (300 STOCKS FOR COMPANY A, 100 STOCKS FOR COMPANY B, AND 100 STOCKS FOR COMPANY C) |

IN THIS CASE
1. 120 STOCKS TO COMPANY A, AND 40 STOCKS TO COMPANY B AND COMPANY C RESPECTIVELY

CASE 4  ISSUE STOCK NUMBER···1,000 STOCKS, UNIT STOCK NUMBER···100 STOCKS, WHEN THERE IS NO LIMIT TO THE LOWEST PERMISSIBLE PURCHASE STOCK NUMBER IN COMPANY A , COMPANY B, AND COMPANY C

| | | |
|---|---|---|
| 500 THOUSAND YEN | 500 STOCKS | COMPANY X |
| 400 THOUSAND YEN | 300 STOCKS | COMPANY Y |
| 300 THOUSAND YEN | 500 STOCKS | (300 STOCKS FOR COMPANY A, 100 STOCKS FOR COMPANY B, AND 100 STOCKS FOR COMPANY C) |

IN THIS CASE
1. 100 STOCKS TO COMPANY A, AND 100 STOCKS TO EITHER COMPANY B OR COMPANY C BY LOT

CASE 5  ISSUE STOCK NUMBER···1,000 STOCKS, UNIT STOCK NUMBER···100 STOCKS, WHEN THE LOWEST PERMISSIBLE PURCHASE STOCK NUMBER IS 200 STOCKS IN COMPANY A, AND THERE IS NO LIMIT TO THE LOWEST PERMISSIBLE PURCHASE STOCK NUMBER IN COMPANY B AND COMPANY C

| | | |
|---|---|---|
| 500 THOUSAND YEN | 500 STOCKS | COMPANY X |
| 400 THOUSAND YEN | 300 STOCKS | COMPANY Y |
| 300 THOUSAND YEN | 500 STOCKS | (300 STOCKS FOR COMPANY A, 100 STOCKS FOR COMPANY B, AND 100 STOCKS FOR COMPANY C) |

IN THIS CASE
1. ZERO STOCKS TO COMPANY A, AND 100 STOCKS TO COMPANY B AND COMPANY C RESPECTIVELY

CASE 6  ISSUE STOCK NUMBER···1,000 STOCKS, UNIT STOCK NUMBER···100 STOCKS, WHEN THERE IS NO LIMIT TO THE LOWEST PERMISSIBLE PURCHASE STOCK NUMBER IN COMPANY A , COMPANY B, AND COMPANY C

| | | |
|---|---|---|
| 600 THOUSAND YEN | 600 STOCKS | COMPANY X |
| 400 THOUSAND YEN | 400 STOCKS | COMPANY Y |
| 300 THOUSAND YEN | 300 STOCKS | (100 STOCKS FOR COMPANY A, 100 STOCKS FOR COMPANY B, AND 100 STOCKS FOR COMPANY C) |

IN THIS CASE
1. 100 STOCKS TO ANY OF COMPANY A, COMPANY B AND COMPANY C BY LOT

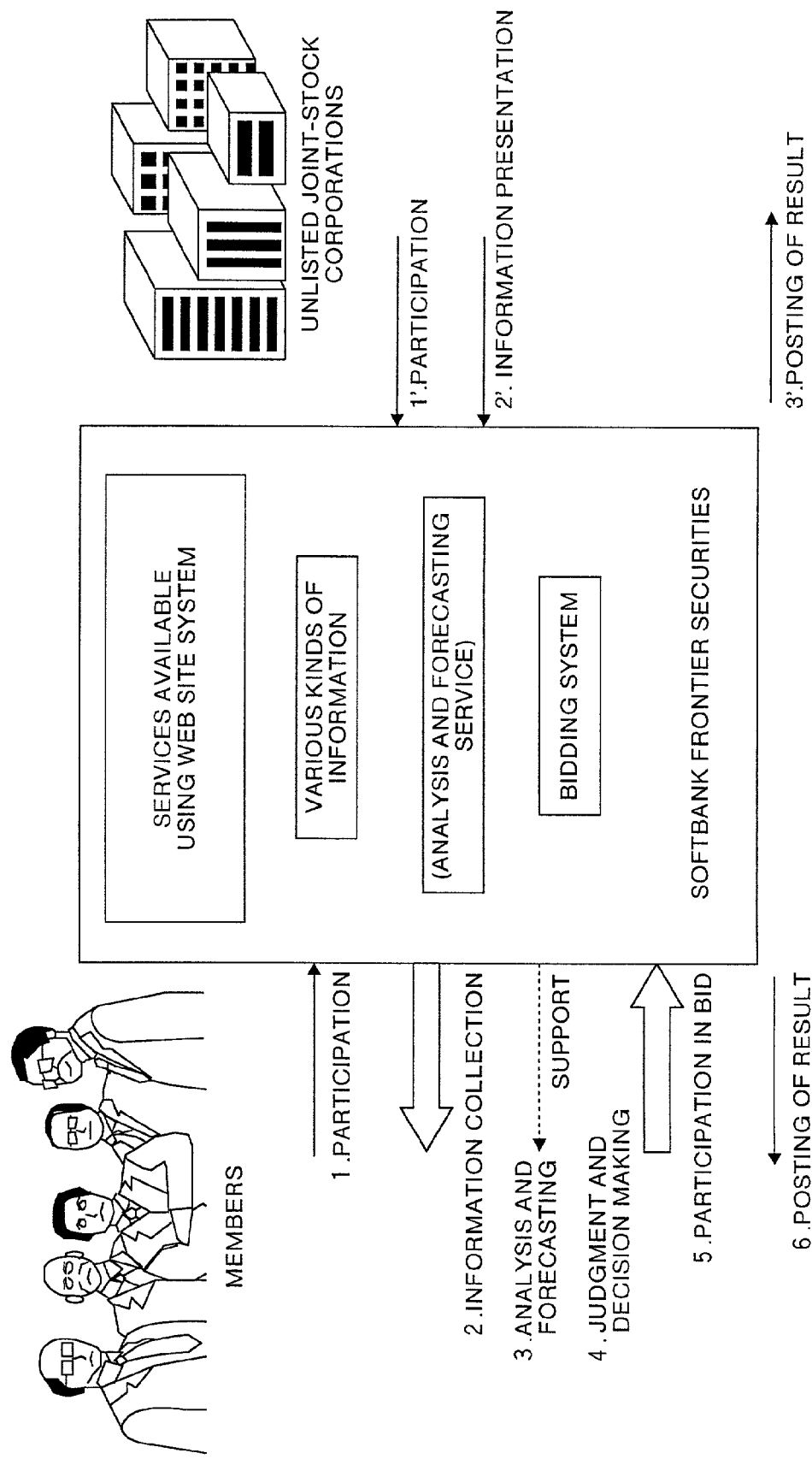

COMMERCE INFORMATION PROCESSOR, COMMERCE TERMINAL, COMMERCE INFORMATION PROCESSING METHOD, AND RECORDED MEDIUM

TECHNICAL FIELD

The present invention relates to a method of and apparatus for processing transaction information, a terminal unit for performing transaction, and recording medium for executing transactions of unlisted stocks, or other products or services. The present invention particularly relates to a method of and apparatus for processing transaction information, a terminal unit for performing transaction, and recording medium that have characteristics in transaction price determination systems and the like.

BACKGROUND ART (Necessity for Price Determination)

Conventionally, various products and services have been transacted among enterprises and individuals. Particularly, in recent years, may virtual markets have been opened for electronic transactions along the development of network techniques as represented by the Internet. In these virtual markets, a large number of transactions have been carried out ranging from relatively low-price products like electric products to high-price products like real estates and stocks.

In general, in order to carry out these transactions in fair and properly it is most important to form prices of products and services objectively and rationally, and to maintain balance between demand and supply.

However, in some cases, it is difficult to determine prices of products and services when there is no actual transaction or when the actual transaction volume is small even when there have been actual transactions.

As an example of transaction for which the price determination is difficult, there are unlisted stocks newly issued by a joint-stock corporation.

(Outline of a Stock Price Determination)

Outline of an unlisted stock conventional price determination will be described below.

A joint-stock corporation can raise own funds by issuing stocks. Stocks issued in this way can be broadly classified into unlisted stocks and publicly held stocks according to the modes of transaction.

Of the above, the publicly held stocks are stocks that investors can freely sell and purchase in the stock exchange in each country (such as the Tokyo Stock Exchange and NASDAQ: National Association of Securities Dealers Automated Quotations, etc.) or the stock market like the over-the-counter stock market.

The unlisted stocks are stocks other than the publicly held stocks. The unlisted stocks are important means for medium and small enterprises as represented by venture enterprises to broadly and directly raise their business funds from investors. The transaction amount of unlisted stocks is expected to increase in future, and therefore, early establishment of an objective and rational transaction system has been desired.

When enterprises issue these stocks, it is necessary to set stock prices objectively and rationally in order to achieve fair and smooth transactions as described above.

The stock prices of publicly held stocks are automatically determined based on the supply and demand balance in the stock market, and therefore, there is no problem in this price determination system. However, in the case of the stock prices of unlisted stocks, there is no actual transaction record, and there is no place of price determination at the start. Therefore, it is necessary to determine their stock prices artificially to some extent at the time of issuing the stocks.

Therefore, conventionally, various systems have been utilized for determining stock prices of unlisted stocks. Different systems have been utilized between the case of determining the stock prices of unlisted stocks that are scheduled to be made public very soon, and the case of determining the stock prices of unlisted stocks for which a date of publication has not been decided yet.

(Price Determination for Unlisted Stocks Scheduled to be Made Public Very Soon—Competitive Bidding System)

A price determination system for unlisted stocks scheduled to be made public very soon will be explained first. The competitive bidding system has been employed for this price determination. According to this competitive bidding system, a lowest bid stock price is calculated first. General investors are invited to attend the competitive bid based on this lowest bid stock price that is shown to the investors. A stock price is determined based on a result of this bid.

As the method for determining the lowest bid stock price, a price calculation system based on similar companies is employed. According to this price calculation system based on similar companies, a plurality of enterprises (hereinafter similar enterprises) are selected that are similar to the stock issuing enterprise in type of industry, a form of business, achievement, growth, or scale. The lowest bid stock price is determined by taking into account earning power and net assets of these similar enterprises.

However, according to this competitive bidding system, general investors who have an object of speculation give a large influence to the price formation. Therefore, this system has had a problem in that the stock price is determined irrationally.

Further, the lowest bid stock price is determined based on the scales of the similar enterprises, without taking into account such unique elements as growth possibility and earning power of the issuing company. Therefore, the lowest bid stock price has been irrational in that the price that takes into account the present value of future earning (a future earning discounted present value).

Further, the lowest bid stock price is influenced by the stock prices of the similar enterprises. Therefore, the lowest bid stock price becomes high when the total stock market is in good condition, and the lowest bid stock price becomes low when the total stockmarket is in poor condition, regardless of the actual performance of the similar enterprises. Thus, the lowest bid stock price has been irrational.

(Price Determination for Unlisted Stocks Scheduled to be Made Public Very Soon—Book-Building System)

In order to improve the competitive bidding system having the above problems, there has also been utilized in recent years a price determination system called a book-building system (a demand build-up system). According to this book-building system, first at the time of issuing stocks, opinions of investors who are believed to have high inventive ability in stock prices are obtained. Based on these opinions, a provisional stock price is proposed to investors. Then, investors' demand for the stocks based on this provisional stock price is checked. A stock price is finally determined according to this demand.

According to this book-building system, rationality can be expected to a certain extent. However, at the time of selecting the investors having high inventive ability, a person who selects these investors tends to be arbitrary. For this reason, there is still irrationality in this system.

(Price Determination System for Unlisted Stocks for Which a Date of Publication has not Been Decided Yet—a Negotiation/Consultation System)

Next, there will be explained a price determination system for unlisted stocks for which a date of publication has not been decided yet. A negotiation/consultation system has been employed for this price determination system. According to this system, the stock issuing enterprise determines a stock price based on negotiation/consultation between the issuing enterprise and investors.

However, according to this negotiation/consultation system, it has been said that a power relationship between the issuing enterprise and the investors gives a large influence to a stock price. Specifically, in many cases, a stock issue price of a not-widely-known issuing enterprise has been determined at a low price that is disadvantageous to the issuing enterprise, even when future growth of this issuing enterprise can be expected. This is because the not-widely-known issuing company needs to raise funds from investors of famous leading venture capital. On the other hand, in many cases, a stock issue price of a widely known issuing enterprise has been determined at a high price with an addition of a substantial premium, even when future growth of this issuing enterprise cannot be expected.

As explained above, according to the issue price determination system based on the negotiation/consultation system, the issue price is greatly influenced by the power relationship between the issue enterprise and the investors. Therefore, it has been difficult to rationally determine an issue price. Further, the procurement of fund has been difficult even when the issue enterprise is a promising enterprise with possibility of high future growth.

Further, according to the negotiation/consultation system, there is a limit to the number of investors who can attend the negotiation/consultation. Therefore, it has been difficult to make a large number of investors attend the price formation, so that it has been impossible to achieve a fair expansion of layers of investors.

As is clear from the above explanation, while it is important to determine objectively and rationally a price of unlisted stocks, it is very difficult to determine this price. It is understood from the above that each of the above systems proposed so far has advantages and disadvantages.

Particularly, in recent years, a clear standard of price determination has been desired. Any one of the above systems is insufficient in this point, and therefore, a new price determination system that replaces these conventional systems has been desired.

Furthermore, in the case of executing electronic transactions using a network like the Internet, it is difficult or impossible to carry out an artificial selection or consultation like the conventional system. Therefore, the establishment of a system capable of automatically carrying out this has been strongly desired.

In addition to the above-described conventional systems, there have also been proposed other price determination systems. However, none of these systems is a system adaptable to a mode of transaction in which an instant decision is obtained based on the participation of a large number of investors like the above electronic transactions. Therefore, a new useful system that satisfies these requirements has been desired.

These problems occur not only in the unlisted stocks, but similarly occur in all transactions of products and services of which actual transaction volume is small.

The present invention has been made in the light of the above problems. It is an object of the present invention to provide a method of and apparatus for processing transaction information, a terminal unit for performing transaction, and a recording medium capable of achieving transactions based on an objective and rational determination of transaction prices of products and services that have no past transaction record like unlisted stocks.

DISCLOSURE OF THE INVENTION

According to the present invention, there is provided a transaction information processing apparatus (for example, a server unit in a first embodiment) that is connected to a plurality of transaction terminal units (for example, client units in the first embodiment) via a network, for processing information relating to a predetermined transaction item. This transaction information processing apparatus comprises a subscription information storage unit (for example, a subscription information DB in the first embodiment) which stores a subscription total number or a subscription total amount as a condition for inviting bids for the transaction item; a bid information storage unit (for example, a bid information DB in the first embodiment) which stores a bid unit price and a bid number or a bid total amount transmitted from bidders via the transaction terminal unit; and a successful bid processing unit (for example, a successful bid processing section in the first embodiment) which carries out a successful bid processing of the transaction item, based on the subscription total number or the subscription total amount stored in the subscription information storage unit, and the bid unit price and the bid number or the bid total amount stored in the bid information storage unit. The successful bid processing unit comprises a successful bid price determination unit (for example, a successful bid stock price determination section in the first embodiment) which determines the same successful bid price to all the successful bidders; and a successful bid number determination unit (for example, a successful bid stock number determination section in the first embodiment) which determines successful bid numbers to all the successful bidders.

As described above, according to a conventional transaction site, it has been difficult to determine objectively and rationally prices of products and services of which actual transaction volume is small.

On the other hand, according to the present apparatus, the same successful bid price to all the successful bidders is automatically determined, and successful bid numbers to all the successful bidders are automatically determined, based on the subscription total number or the subscription total amount, and the bid unit price and the bid number or the bid total amount, respectively. Therefore, the successful bid price and the successful bid numbers are automatically determined according to a constant rule that is fair to all the investors. As the stock price of a transaction item is determined based on only the bid unit price and the bid number that are bid by the bidder, it is possible to form the price objectively and rationally by eliminating the arbitrariness.

According to a next invention, there is provided a transaction information processing apparatus of the above invention, wherein when a subscription total number is stored as a condition for inviting bids, the successful bid price determination unit calculates a cumulative number of the bid until when the cumulative number reaches the subscription total number in the order of bidders of high bid unit prices or until when the calculation for all the bidders is finished, whichever satisfies earlier the price determination condition, and determines the bid unit price presented by the bidder that becomes the basis of the calculation when the price determination condition is satisfied, as the successful bid price.

Following explanation gives further details of one example of the price determination method (a stock number issuing system in the first embodiment). According to this apparatus, the calculation is carried out until when the cumulative number reaches the subscription total number or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

According to a next invention, there is provided a transaction information processing apparatus of the above invention, wherein when a subscription total amount is stored as a condition for inviting bids, the successful bid price determination unit calculates a cumulative amount of the bid total amount until when the cumulative amount reaches the subscription total amount in the order of bidders of high bid unit prices or until when the calculation for all the bidders is finished, whichever satisfies earlier the price determination condition, and determines the bid unit price presented by the bidder that becomes the basis of the calculation when the price determination condition is satisfied, as the successful bid price.

Following explanation gives further details of another example of the price determination method (a total amount issuing system in the first embodiment). According to this apparatus, the calculation is carried out until when the cumulative amount reaches the subscription total amount or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

Particularly, in this case, when the successful bid number of the bidder who has bid at a high bid unit price is larger, a higher successful bid price is settled as a successful bid price in total. Therefore, it is possible to set a high successful bid price. Consequently, when the transaction item is unlisted stocks, it is possible to set a high successful bid stock price, so that it is possible to reduce the total issue stock number. Further, in this case, it is also possible to restrict an increase in the number of shareholders.

According to a next invention, there is provided a transaction information processing apparatus of the above invention, wherein when a bid total amount is stored as a condition for inviting bids, the successful bid price determination unit recalculates a bid number of each bidder accumulated so far, based on the bid unit price presented by a bidder that becomes a new basis of calculation, each time when the cumulative number of the bid number is calculated.

Following explanation gives further details of still another example of the price determination method (a total amount bidding system in the first embodiment). According to this apparatus, a bid number of each bidder accumulated so far is recalculated, based on the bid unit price presented by a bidder that becomes a new basis of calculation, each time when the cumulative number of the bid number is calculated.

In this case, the bid number of the bidder who has bid at a high bid price increases along a fall in the successful bid price. Therefore, the bidder who has bid at a high bid unit price can purchase the transaction item under a more favorable condition. Further, according to this system, there is a tendency that the successful bid number of the bidder of a high bid total amount increases. Further, the successful bid price can be easily set at a high price. Therefore, when the transaction item is unlisted stocks, the issue enterprise can raise more funds while restricting an increase in the number of shareholders.

According to a next invention, there is provided a transaction information processing apparatus of the above invention, wherein when a cumulative number of a bid number by a bidder who presents a bid unit price equal to or higher than a successful bid price determined by the successful bid price determination unit does not exceed the subscription total number, the successful bid price determination unit determines the successful bid number of the bidder as the bid number of the bidder.

Following explanation gives further details of one example of the successful bid number determination method.

Particularly, this shows the successful bid number determination method when a cumulative number of a bid number by a bidder who presents a bid unit price equal to or higher than a successful bid price does not exceed the subscription total number. According to this apparatus, when a cumulative number of a bid number does not exceed the subscription total number, the bid number of the bidder becomes the successful bid number. Therefore, in this case, a desired quantity of the transaction item can be allocated to each bidder.

According to a next invention, there is provided a transaction information processing apparatus of the above invention, wherein when a cumulative number of a bid number by a bidder who presents a bid unit price equal to or higher than a successful bid price determined by the successful bid price determination unit exceeds the subscription total number, the successful bid number determination unit determines the successful bid number of the bidder as the bid number of the bidder until when the cumulative number exceeds the subscription total number in the order of high bid unit prices, and when the cumulative number exceeds the subscription total number, determines successful bid numbers of all the bidders who present the same bid price as that of the bidder that generates this excess, by proportionally allocating a remaining successful bid number at that time according to the respective bid numbers of the bidders.

Following explanation gives further details of one example of the successful bid number determination method. Particularly, this shows the successful bid number determination method when a cumulative number of a bid number by a bidder who presents a bid unit price equal to or higher than a successful bid price exceeds the subscription total number.

In this case, "until when the cumulative number exceeds the subscription total number" means a state immediate before this excess is generated. Specifically, in the process of accumulating the bid number of each bidder while determining the successful bid numbers of the bidders in the order of high bid unit prices, when this cumulative number exceeds the subscription total number due to the accumulation of a bid number of a certain bidder, the bidder who presented the bid number that causes this excess (and other bidders who presented the same bid price as this bidder) are excluded. The successful bid numbers are determined for only the bidders who presented a higher bid unit price than these bidders. For the bidder who presented the bid number that causes this excess (and other bidders who presented the same bid price as this bidder), their successful bid numbers are determined by proportionally allocating the remaining successful bid number as described above.

Therefore, according to the present apparatus, it is possible to allocate the successful bid numbers with priority in the order of the bids that presented high bid unit prices.

As a result, it is possible to give the incentive rationally to the bidders who present high bid unit prices. Further, as the successful bid numbers are determined based on the proportional allocation for the bidders who presented the bid numbers that caused the excess, the remaining successful bid numbers can also be determined rationally according to the bid numbers.

According to a next invention, there is provided a transaction information processing apparatus of the above invention, wherein the subscription information storage unit stores a unit number as a unit capable of allocating the transaction item to the bidders, and the successful bid number determination unit carries up or carries down a successful bid number into an integer times of the unit number when the determined successful bid number is not an integer times of the unit number.

According to this apparatus, when the successful bid number is not an integer times of the unit number, this successful bid number is carried up or carried down into an integer times of the unit number. Therefore, it is possible to automatically match the successful bid number with the condition of the unit number. Particularly, in the case of carrying out transactions of a transaction item like stocks that are set with unit numbers, it is possible to secure the validity of the transactions.

According to a next invention, there is provided a transaction information processing apparatus of the above invention, wherein the bid information storage unit stores a lowest permissible purchase number as a lower limit of the successful bid number, and the successful bid number determination unit sets the successful bid number to 0 when the determined successful bid number does not reach the lowest permissible purchase number.

According to this apparatus, when the successful bid number does not reach the lowest permissible purchase number, the successful bid number is set to 0. Therefore, it is possible to automatically match the successful bid number to the condition of the lowest permissible purchase number. Particularly, in the case of carrying out transactions of a transaction item like stocks that are set with the lowest permissible purchase number, it is possible to secure the validity of the transactions.

According to a next invention, there is provided a transaction information processing apparatus of the above invention, wherein the successful bid number determination unit selects successful bidders from a plurality of bidders by lot, when the plurality of bidders exist who present the same bid unit price that is equal to or higher than a successful bid price determined by the successful bid price determination unit and when it is not possible to determine the successful bid price based on the proportional allocation.

According to this apparatus, when there are a plurality of bidders who present the same bid unit price that is equal to or higher than a successful bid price, and when it is not possible to determine the successful bid price based on the proportional allocation, successful bidders are selected by lot from these plurality of bidders. Therefore, when the bid conditions presented by a plurality of bidders are the same, and also when it is not possible to give priority to them, it is possible to automatically process the successful bid. In this case, it is possible to quickly process the successful bid as compared with an artificial lot. Particularly, this system is effective in transactions like electronic transactions in which promptness is required. Further, as the lot is carried out automatically based on a predetermined condition, it is possible to secure objectiveness.

According to a tenth invention, there is provided a transaction information processing apparatus of the above invention, that further comprises a transaction item information storage unit (for example, an issue enterprise information DB, a successful bid information DB, or an IR information DB in the first embodiment) which stores information relating to the transaction item; and a transmitting unit (for example, a communication control IF of the server unit in the first embodiment) which transmits the information stored in the transaction item information storage unit to the client unit, based on a request made from the bidder via the client unit.

According to this apparatus, the information relating to the transaction item is transmitted to the client unit based on a request from the bidder via the client unit. Therefore, the bidder can confirm the own transaction by referring to the information relating to the transaction item to study the bid or by referring to the own information.

According to a next invention, there is provided a transaction information processing apparatus of the above invention, wherein the successful bid processing unit processes the successful bid items including the bid unit price and the bid number or the bid total amount posted from the bidder, based on a condition that the bidder has received the provision of the information relating to the transaction item.

This further clarifies one condition for the successful bid processing by the successful bid processing unit. According to this apparatus, when a bidder has not received a provision of the information relating to the transaction item, for example, a prospectus at the time of carrying out the transaction of unlisted stocks, a bid unit price and others posted from this bidder are not taken into account, and this bidder cannot carry out the bid. Therefore, it is possible to verify by estimate that the prospectus has been presented to the bidder prior to the bid. As a result, it is possible to satisfy the legal condition for the bid.

According to a next invention, there is provided a transaction information processing apparatus of the above invention, that further comprises a reference record storage unit (for example, a reference record information DB in the first embodiment) which stores information relating to a record of the provision of the information by the transmitting unit, wherein the successful bid processing unit decides whether the bidder has received the provision of the information relating to the transaction item, based on the information stored in the reference record storage unit.

Following explanation gives further details of a state that the successful bid processing unit decides a presence or absence of a provision of information to the bidder. According to this apparatus, the information of the record relating to the provision of the information is stored, and a decision is made about whether or not the information has been provided, based on this information. Therefore, it is possible to decide automatically and more securely whether the information has been provided to the bidder or not. As a result, this can satisfy the legal condition for the bid more easily and securely.

According to a next invention, there is provided a transaction information processing apparatus of the above invention, that further comprises a bidder information storage unit (for example, an investor information DB in the first embodiment) which stores information (for example, attribute information and investment information in the first embodiment) relating to the bidder; a reference information storage unit (for example, an issue enterprise information DB in the first embodiment) which stores information (for example, desired attribute information and business policy information in the first embodiment) that becomes a basis for selecting a bidder who can participate in the bidding for the transaction item; and a selecting unit (for example, a selection processing section in the first embodiment) which selects a bidder who can participate in the bidding for the transaction item, based on the information stored in the bidder information storage unit and the information stored in the reference information storage unit.

According to this apparatus, a bidder who can participate in the bidding for the transaction item is selected based on the information relating to the bidder and the basis for selecting a bidder. Therefore, it is possible to automatically select only bidders who have satisfied a constant condition, even when there are a large number of bidders.

Consequently, in the case of stock transactions, for example, an issue enterprise can prevent investors whom the enterprise does not want from participating in the bidding, based on a suitable setting of a condition. As a result, it is possible to establish a preferable capital relationship. Further, the bid information is presented to only the investors who satisfy the attributes and business policy of the issue enterprise. Therefore, the issue enterprise can avoid the fear of a hostile acquisition or a takeover. Further, it is possible to collect investors with whom a future business tie-up can be expected. As a result, this system is safe and highly reliable. Further, it is possible to carry out reliable transactions for a high-risk transaction item like unlisted stocks, by limiting the bidders to only those who have high ability of investment decision like institutional investors.

Further, investors can avoid unnecessary work of studying bids, as the investors are not invited to participate in bids offered by enterprises in which the investors have little possibility of making investment.

Further, managers of this apparatus can ask only the investors having high investment possibility to participate in the bidding. Therefore, it is possible to increase the bid rate of investors.

Particularly, it is possible to automatically limit the number of investors to a legal number of 49 or below. Therefore, it is possible to carry out a private placement as a simple mode of subscription.

Furthermore, the limiting of these investors is carried out without making the investors aware of this fact. Therefore, the investors are not made to feel the artificial sense or discomfort.

According to a next invention, there is provided a transaction information processing apparatus of the above invention, that further comprises a transaction amount calculating unit (for example, a bid processing section in the first embodiment) which calculates a transaction amount when the bidder has been successful in the bid for the transaction item, based on the bid unit price and the bid number posted from the bidder; and a communication unit (for example, the communication control IF of the server unit in the first embodiment) which transmits the transaction amount calculated by the transaction amount calculating unit, to the bidder via the client unit.

According to this apparatus, a transaction amount when the bidder has been successful in the bid for the transaction item is calculated based on the bid unit price and the bid number posted from the bidder. Then, this transaction amount is posted to the bidder. Therefore, in the case of transaction of stocks, for example, the bidder can know own successful bid amount, and can confirm the bid contents easily and securely.

According to a next invention, there is provided a transaction information processing apparatus of the above invention, wherein the transaction item is unlisted stocks issued by a joint-stock corporation, the subscription total number is a subscription stock number, the bid unit price is a bid stock price, the bid number is a bid stock number, the successful bid price is a successful bid stock price, and the successful bid number is a successful bid stock number.

Following explanation gives further details of an example of the transaction item. In other words, this apparatus can be used for transactions of unlisted stocks. In this case, the successful bid stock price and the successful bid stock number can be determined automatically based on the subscription stock number or the subscription total amount, and the bid stock price and the bid stock number or the bid total amount respectively. Therefore, it is possible to carry out objectively and rationally the transactions of unlisted stocks of which price it is difficult to determine because of no actual transaction so far. As a result, it is possible to build up a fair and highly reliable transaction system for unlisted stocks.

According to a next invention, there is provided a transaction information processing apparatus of the above invention, wherein the information relating to the transaction item is the information relating to at least one of a prospectus relating to the issue of the unlisted stocks and IR presented by the joint-stock corporation.

Following explanation gives further details of the contents of the information presented to bidders. According to this apparatus, it is possible to automatically satisfy the legal request relating to the stock transaction, by presenting the prospect us to the bidders. Alternatively, an issue enterprise that issues stocks can positively disclose information to investors as bidders, by presenting IR (Investor Relations).

According to a next invention, there is provided a transaction information processing apparatus of the above invention, wherein the information relating to the transaction item is the information relevant to an investment record of the bidder.

Following explanation gives further details of the contents of the information presented to bidders. According to this apparatus, it is possible to assist the investment management of investors, by presenting the investment record to the investors.

According to a next invention, there is provided a transaction terminal unit (for example, the client unit in the first embodiment) which transmits/receives information relating to a predetermined transaction item to/from a predetermined transaction information processing apparatus (for example, the server unit in the first embodiment) connected via a network. This transaction terminal unit comprises an input interface (for example, each input column of a bid screen in the first embodiment) which selectively inputs either a bid unit price and a bid number, or a bid unit price and a bid total amount, as the bid contents to the transaction item; and a transmitting unit (for example, a communication IF of the client unit in the first embodiment) which transmits either the bid unit price and the bid number, or the bid unit price and the bid total amount that have been input to the input interface, to the transaction information processing apparatus via the network.

According to this apparatus, it is possible to selectively input either a bid unit price and a bid number, or a bid unit price and a bid total amount, and transmit either the bid unit price and the bid number, or the bid unit price and the bid total amount that have been input to the input interface, to the transaction information processing apparatus. Therefore, it is possible to carry out the bid based on the stock number bidding system, by inputting the bid unit price and the bid number. Alternatively, it is possible to carry out the bid based on the total amount bidding system, by inputting the bid unit price and the bid total amount. In other words, a bidder can select either the stock number bidding system or the total amount bidding system, according to the own desire. As a result, the bidder can bid based on the bidding system that is most suitable to satisfy the own needs.

According to a next invention, there is provided a transaction terminal unit of the above invention, wherein the transaction item is unlisted stocks issued by a joint-stock corporation, the bid unit price is a bid stock price, and the bid number is a bid stock number.

Following explanation gives further details of an example of the transaction item. In other words, this apparatus can be used for transactions of unlisted stocks.

In this case, it is possible to selectively input either a bid stock price and a bid number, or a bid stock price and a bid total amount, thereby to bid to the unlisted stocks.

According to a next invention, there is provided a transaction information processing method, executed on a predetermined transaction information processing apparatus, of processing information relating to a predetermined transaction item. This transaction information processing method includes a subscription condition storage step of storing a subscription total number or a subscription total amount as a condition for inviting bids for the transaction item; a bid condition storage step of receiving a bid unit price and a bid number or a bid total amount via the network, and storing the received information; and a successful bid processing step of carrying out a successful bid processing of the transaction item, based on the subscription total number or the subscription total amount stored at the subscription condition storage step, and the bid unit price and the bid number or the bid total amount stored at the bid condition storage step. The successful bid processing step includes a successful bid price determination step of determining the same successful bid price to all the successful bidders; and a successful bid number determination step of determining successful bid numbers to all the successful bidders.

According to the present method, the same successful bid price to all the successful bidders is automatically determined, and successful bid numbers to all the successful bidders are automatically determined, based on the subscription total number or the subscription total amount, and the bid unit price and the bid number or the bid total amount, respectively. Therefore, the successful bid price and the successful bid numbers are automatically determined according to a constant rule that is fair to all the investors. As the stock price of a transaction item is determined based on only the bid unit price and the bid number that are bid by the bidder, it is possible to form the price objectively and rationally by eliminating the arbitrariness.

According to a next invention, there is provided a transaction information processing method of the above invention, wherein, at the successful bid price determination step, when a subscription total number is stored as a condition for inviting bids, a cumulative number of the bid is calculated until when the cumulative number reaches the subscription total number in the order of bidders of high bid unit prices or until when the calculation for all the bidders is finished, whichever satisfies earlier the price determination condition, and the bid unit price presented by the bidder that becomes the basis of the calculation when the price determination condition is satisfied, is determined as the successful bid price.

Following explanation gives further details of one example of the price determination method (the stock number issuing system in the first embodiment). According to this method, the calculation is carried out until when the cumulative number reaches the subscription total number or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

According to a next invention, there is provided a transaction information processing method of the above invention, wherein, at the successful bid price determination step, when a subscription total amount is stored as a condition for inviting bids, a cumulative amount of the bid total amount is calculated until when the cumulative amount reaches the subscription total amount in the order of bidders of high bid unit prices or until when the calculation for all the bidders is finished, whichever satisfies earlier the price determination condition, and the bid unit price presented by the bidder that becomes the basis of the calculation when this condition is satisfied, is determined as the successful bid price.

Following explanation gives further details of another example of the price determination method (the total amount issuing system in the first embodiment). According to this method, the calculation is carried out until when the cumulative amount reaches the subscription total amount or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

Particularly, in this case, when the successful bid number of the bidder who has bid at a high bid unit price is larger, a higher successful bid price is settled as a successful bid price in total. Therefore, it is possible to set a high successful bid price. Consequently, when the transaction item is unlisted stocks, it is possible to set a high successful bid stock price, so that it is possible to reduce the total issue stock number. Further, in this case, it is also possible to restrict an increase in the number of shareholders.

According to a next invention, there is provided a transaction information processing method of the above invention, wherein, at the successful bid price determination step, when a bid total amount is stored as a condition for inviting bids, a bid number of each bidder accumulated so far is recalculated based on the bid unit price presented by a bidder that becomes a new basis of calculation, each time when the cumulative number of the bid number is calculated.

Following explanation gives further details of still another example of the price determination method (the total amount bidding system in the first embodiment). According to this method, the calculation is carried out until when the cumulative amount reaches the subscription total amount or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

Particularly, in this case, the bid number of the bidder who has bid at a high bid price increases along a fall in the successful bid price. Therefore, the bidder who has bid at a high bid unit price can purchase the transaction item under a more favorable condition. Further, according to this method, there is a tendency that the successful bid number of the bidder of a high bid total amount increases. Further, the successful bid price can be easily set at a high price. Therefore, when the transaction item is unlisted stocks, the issue enterprise can raise more funds while restricting an increase in the number of shareholders.

According to a next invention, there is provided a transaction information processing method of the above invention, wherein, at the successful bid price determination step, when a cumulative number of a bid number by a bidder who presents a bid unit price equal to or higher than a successful bid price determined at the successful bid price determination step does not exceed the subscription total number, the successful bid number of the bidder is determined as the bid number of the bidder.

Following explanation gives further details of one example of the successful bid number determination method. Particularly, this shows the successful bid number determination method when a cumulative number of a bid number by a bidder who presents a bid unit price equal to or higher than a successful bid price does not exceed the subscription total number. According to this method, when a cumulative number of a bid number does not exceed the subscription total number, the bid number of the bidder becomes the successful bid number. Therefore, in this case, a desired quantity of the transaction item can be allocated to each bidder.

According to a next invention, there is provided a transaction information processing method of the above invention, wherein at the successful bid number determination step, when a cumulative number of a bid number by a bidder who presents a bid unit price equal to or higher than a successful bid price determined at the successful bid price determination step exceeds the subscription total number, the successful bid number of the bidder is determined as the bid number of the bidder until when the cumulative number exceeds the subscription total number in the order of high bid unit prices, and when the cumulative number exceeds the subscription total number, successful bid numbers of all the bidders who present the same bid price as that of the bidder that generates this excess, are determined by proportionally allocating a remaining successful bid number at that time according to the respective bid numbers of the bidders.

Following explanation gives further details of one example of the successful bid number determination method. Particularly, this shows the successful bid number determination method when a cumulative number of a bid number by a bidder who presents a bid unit price equal to or higher than a successful bid price exceeds the subscription total number.

In this case, the meaning of the "until when the cumulative number exceeds the subscription total number" is the same as that explained for the transaction information processing apparatus of the above invention.

Therefore, according to the present method, it is possible to allocate the successful bid numbers with priority in the order of the bids that presented high bid unit prices. As a result, it is possible to give the incentive rationally to the bidders who present high bid unit prices. Further, as the successful bid numbers are determined based on the proportional allocation for the bidders who presented the bid numbers that caused the excess, the remaining successful bid numbers can also be determined rationally according to the bid numbers.

According to a next invention, there is provided a transaction information processing method of the above invention, wherein, at the successful bid processing step, the successful bid processing including the bid unit price and the bid number or the bid total amount posted from the bidder are processed based on a condition that the bidder has received the provision of the information relating to the transaction item.

This further clarifies one condition for the successful bid processing step. According to this method, when a bidder has not received a provision of a prospectus, a bid unit price and others posted from this bidder are not taken into account, and this bidder cannot carry out the bid. Therefore, it is possible to verify by estimate that the prospectus has been presented to the bidder prior to the bid. As a result, it is possible to satisfy the legal condition for the bid.

According to a next invention, there is provided a transaction information processing method of the above invention, that further comprises a bidder information setting step of setting information relating to the bidder; a reference information setting step of setting information that becomes a basis for selecting a bidder who can participate in the bidding for the transaction item; and a selection step of selecting a bidder who can participate in the bidding for the transaction item, based on the information set at the bidder information setting step and the information set at the reference information setting step.

According to this method, a bidder who can participate in the bidding for the transaction item is selected based on the information relating to the bidder and the basis for selecting a bidder. Therefore, it is possible to automatically select only bidders who have satisfied a constant condition, even when there are a large number of bidders.

Consequently, in the case of stock transactions, for example, an issue enterprise can prevent investors whom the enterprise does not want from participating in the bidding, based on a suitable setting of a condition. As a result, it is possible to establish a preferable capital relationship. Further, the bid information is presented to only the investors who satisfy the attributes and business policy of the issue enterprise. Therefore, the issue enterprise can avoid the fear of a hostile acquisition or a takeover. Further, it is possible to collect investors with whom a future business tie-up can be expected. As a result, the system is safe and highly reliable. Further, investors can avoid unnecessary work of studying bids, as the investors are not invited to participate in bids offered by enterprises in which the investors have little possibility of making investment.

Further, managers of this apparatus can ask only the investors having high investment possibility to participate in the bidding. Therefore, it is possible to increase the bid rate of investors.

Particularly, it is possible to automatically limit the number of investors to a legal number of 49 or below. Therefore, it is possible to carry out a private placement as a simple mode of subscription.

Furthermore, the limiting of these investors is carried out without making the investors aware of this fact. Therefore, the investors are not made to feel the artificial sense or discomfort.

According to a next invention, there is provided a transaction information processing method of the above invention, wherein the transaction item is unlisted stocks issued by a joint-stock corporation, the subscription total number is a subscription stock number, the bid unit price is a bid stock price, the bid number is a bid stock number, the successful bid price is a successful bid stock price, and the successful bid number is a successful bid stock number.

Following explanation gives further details of an example of the transaction item. In other words, this method can be used for transactions of unlisted stocks. In this case, the successful bid stock price and the successful bid stock number can be determined automatically based on the subscription stock number or the subscription total amount, and the bid stock price and the bid stock number or the bid total amount respectively. Therefore, it is possible to carry out objectively and rationally the transactions of unlisted stocks of which price it is difficult to determine because of no actual transaction so far. As a result, it is possible to build up a fair and highly reliable transaction system for unlisted stocks.

According to a next invention, there is provided a recording medium recorded with a program for making a computer execute the transaction information processing method of the present invention.

According to this recording medium, it is possible to realize the transaction information processing methods of the present invention using a computer, by making the computer read and execute a program recorded on the recording medium. Based on this method, it is possible obtain similar effects to those of the methods.

In this case, a "computer-readable recording medium" includes an optional "portable physical medium" like a floppy disk, an optical magnetic disk, a ROM, an EPROM, an EEPROM, a CD-ROM, and a DVD, an optional "fixed physical medium" like a ROM, a RAM, and an HD incorporated in various kinds of computers, and a "communication medium" for holding a program during a short period of time like a communication line and a carrier wave for transmitting a program via a network as represented by a LAN, a WAN, and the Internet.

Further, the "program" is a data processing method described in an optional language or description method, regardless of a format of a source code or a binary code. The "program" is not necessarily structured as a single unit, and includes a program that is decentralized into a plurality of modules and libraries, and a program that co-operates with a separate program as, represented by an OS (Operating System) thereby to achieve the function thereof. In each unit shown in the embodiments, known structures and procedures can be used as a structure for reading the recording medium, a reading procedure, and an installation procedure after the reading.

BRIEF DESCRIPTION OF THE DRAWINGS

FIG. 4 is a diagram showing an example of a structure of information stored in an issue enterprise information DB;
FIG. 5 is a diagram showing an example of a structure of information stored in an investor information DB;
FIG. 6 is a diagram showing an example of a structure of information stored in subscription information DB;
FIG. 7 is a diagram showing an example of a structure of information stored in a selection information DB;
FIG. 8 is a diagram showing an example of a structure of information stored in a reference record information DB;
FIG. 9 is a diagram showing an example of a structure of information stored in an bid information DB;
FIG. 10 is a diagram showing an example of a structure of information stored in a successful bid information DB;
FIG. 26 is a diagram showing numerical data of a case 1;
FIG. 27 is a diagram showing numerical data of a case 2;
FIG. 28 is a diagram showing numerical data of a case 3;
FIG. 29 is a diagram showing numerical data of a case 4;
FIG. 30 is a diagram showing numerical data of a case 5;
FIG. 31 is a diagram showing numerical data of a case 6;
FIG. 32 is a diagram showing numerical data of a case 7;
FIG. 33 is a diagram showing numerical data of a case 8;
FIG. 34 is a diagram showing numerical data of a case 9;
FIG. 35 is a diagram showing numerical data of a case 10;
FIG. 36 is a diagram showing numerical data of a case 11;
FIG. 37 is a diagram showing numerical data of a case 12;
FIG. 38 is a diagram showing numerical data of a case 13;
FIG. 39 is a diagram showing numerical data of a case 14;
FIG. 40 is a diagram showing numerical data of a case 15;
FIG. 41 is a diagram showing numerical data of a case 16;
FIG. 42 is a diagram showing numerical data of a case 17;
FIG. 43 is a diagram showing numerical data of a case 18;
FIG. 44 is a diagram showing numerical data of a case 19;
FIG. 45 is a diagram showing an example of a structure of an enterprise list reading screen;

FIG. 47 is a diagram showing an example of a structure of a bid screen;

FIG. 48 is a diagram showing an example of a structure of a confirmation screen;

FIG. 52 is an example of a log-in screen displayed on a computer terminal of an investor;

FIG. 54 is an example of a homepage displayed on a computer terminal of an investor;

FIG. 55 is an example of a list of issue enterprises displayed on a computer terminal of an investor;

FIG. 56 is a diagram for explaining a special case of an auction method; and

FIG. 57 is a diagram for explaining a total flow of a transaction in the present stock transaction system.

BEST MODE FOR CARRYING OUT THE INVENTION

First and second embodiments of a transaction information processing apparatus (hereinafter to be referred to as the present apparatus), a transaction terminal unit, a transaction information processing method (hereinafter, the present method), and a recording medium (hereinafter, the present recording medium) relating to the present invention will be explained in detail with reference to the drawings. The first and second embodiments do not limit the present invention.

Particularly, the first and second embodiments show examples of the present invention for the case where investors (bidders) like institutional investors carry out transactions of unlisted stocks (a transaction item) issued by an issue enterprise. Contents of information presented in relation to bidders, transaction items and accompanying information are not limited to those shown in the present embodiments. These contents can be changed optionally.

FIRST EMBODIMENT (General Outline)

A first embodiment of the present invention will be explained below.

Figure 1:
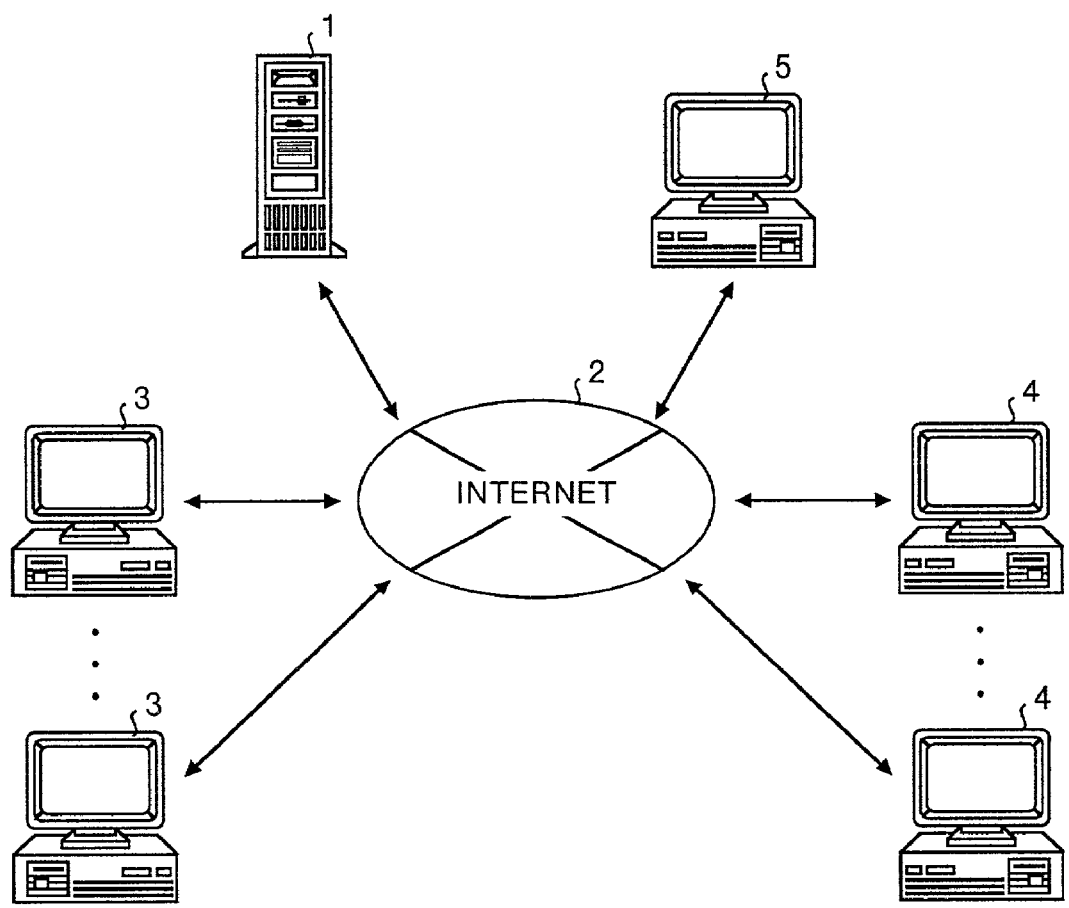
FIG. 1 is a total structure diagram of the present system according to a first embodiment of the present invention.

First, a general outline of a transaction system (hereinafter, the present system) using the present apparatus will be explained. FIG. 1 is a total structure diagram of the present system. As shown in FIG. 1, the present system is comprised of the server unit 1 connected to the client units 3 used by a plurality of investors, client units 4 used by a plurality of issue enterprises, and client unit 5 used by a manager of the present system, so that they can communicate.

The server unit 1 stores various kinds of information based on the operation of the manager of the present system. A virtual transaction market is formed as a Web site of the WWW (World Wide Web) using these kinds of information. In outline, this transaction market is a market for carrying out transactions of unlisted stocks issued by issue enterprises in a bidding system. Investors, issue enterprises, and the manager can make access to this Web site as the transaction market, via the client units 3 to 6 respectively.

The server unit 1 also stores subscription conditions for the issue enterprises to carry out bid for unlisted stocks. An issue enterprise can select either a stock number issuing system or a total amount issuing system as a subscription condition. Contents of these systems will be described later.

When a predetermined condition is satisfied, an investor can read the subscription conditions and various kinds of information relating to issue enterprises that are scheduled to issue unlisted stocks. Further, the investor can optionally participate in the bidding for the unlisted stocks. In this bid, the investor can select either a stock number bidding system or a total amount bidding system. Contents of these systems will be described later.

A plurality of conditions are set for each investor to participate in the bidding. One of these conditions is that the investor has been registered as a person (hereinafter, a member) who has a right of receiving a provision of services presented from the manager (a membership condition). In this system, a person who can become this member is limited to an institutional investor. Another condition is that the investor has been selected as a person who can participate in the bidding for unlisted stocks of the issue enterprise (a selection condition). This selection is carried out automatically by the present system for each issue enterprise. Still another condition is that the investor has already read a predetermined document which the investor is legally obliged to do as the responsibility of the investor before participating in the bidding for unlisted stocks of the issue enterprise (a document reading condition). This document (a prospectus in the case of Japan) is the document that must be directly delivered to the investor from the issue enterprise that issues stocks (Japan Securities Transaction Law, Article 15 and others).

(System Structure—Server Unit 1)

The structure of the system will be explained next.

Figure 2:
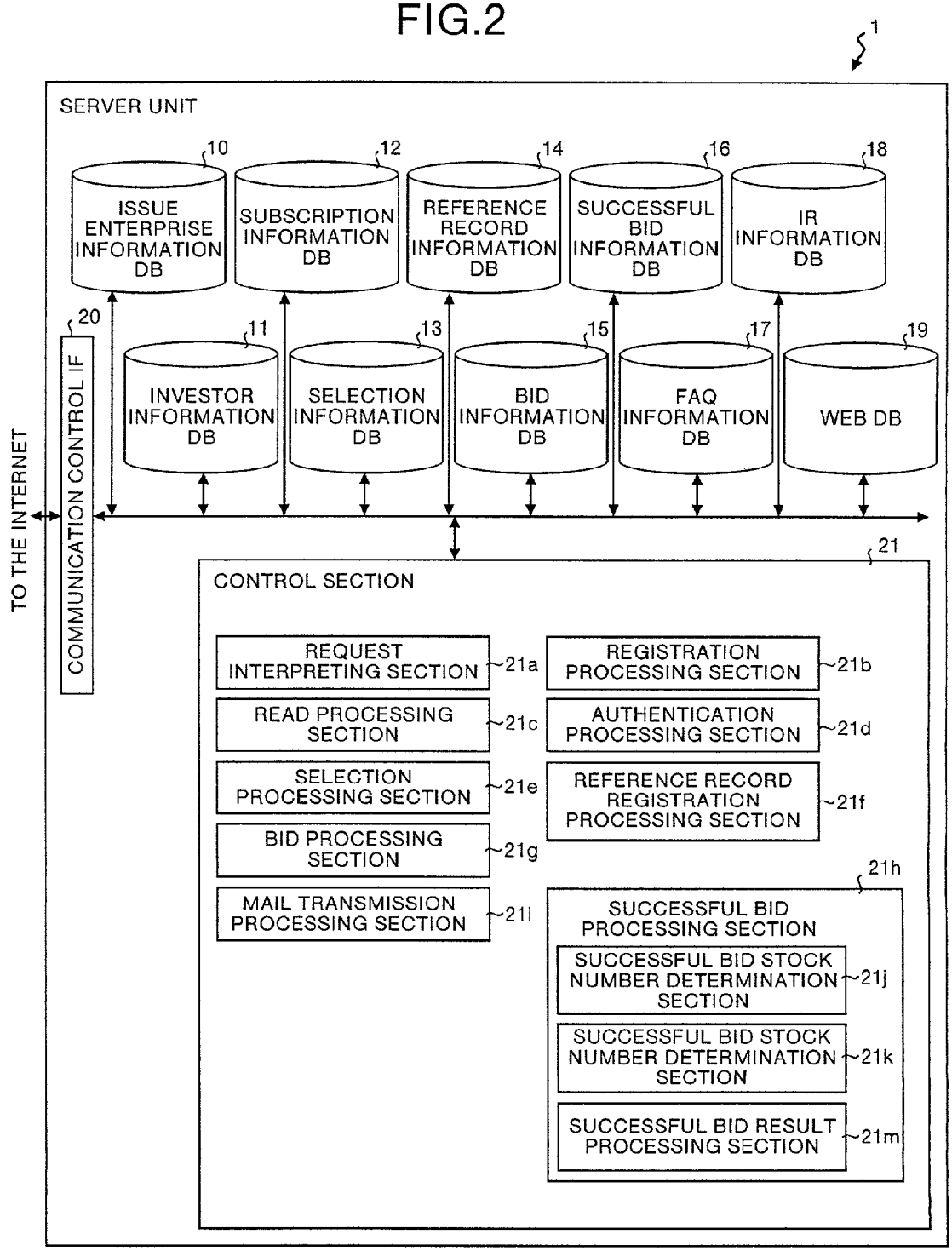
FIG. 2 is a block diagram of a server unit.

First, the structure of the server unit 1 will be explained. FIG. 2 shows a block diagram of the server unit 1. As shown in FIG. 2, in outline, the server unit 1 consists of an issue enterprise information DB (DB=database) 10, an investor information DB 11, a subscription information DB 12, a selection information DB 13, a reference record information DB 14, a bid information DB 15, a successful bid information DB 16, an FAQ information DB 17, an IR information DB 18, a Web DB 19, a communication control IF (IF=interface) 20, and a control section 21. These sections are connected to each other via a predetermined communication path so that they can communicate with each other. Further, the server unit 1 is connected to the Internet 2 via a communication apparatus and an exclusive line like a router not shown so that the server unit 1 can communicate.

(System Structure—Server Unit 1—Issue Enterprise Information DB 10)

Among these sections, the issue enterprise information DB 10 is issue enterprise an information storage unit which stores information (issue enterprise information) relating to an issue enterprise that issues unlisted stocks. In broad terms, the issue enterprise information is the information relating to unlisted stocks as the transaction item. Therefore, this issue enterprise information DB 10 also functions as a transaction item information storage unit which stores information relating to the transaction item.

As shown in FIG. 4, the issue enterprise information includes for example, an issue enterprise ID for uniquely identifying an issue enterprise, a password for authenticating the issue enterprise, a company name of the issue enterprise, an address of the issue enterprise, an e-mail address, enterprise basic information (or a file name that specifies a recording area of the enterprise basic information), prospectus data (or a file name that specifies a recording area of the prospectus data), desired attribute information, and business policy information. These items are stored by being related to each other.

Among the above information, as the enterprise basic information, it is possible to store optional information relating to the issue enterprise that should be basically presented to investors.

This information includes actual information that is presented from the issue enterprise itself, advertising and sales information that is presented from the issue enterprise itself, and information that is presented from a third party other than the issue enterprise.

The actual information presented from the issue enterprise itself includes, for example, a history of the issue enterprise, contents of a business model in the issue enterprise, contents of products and services that are relevant to the issue enterprise, a current capital structure of the issue enterprise, past and present financial statements of the issue enterprise, and contents of research and development plans and facility investment plans of the issue enterprise.

The advertising and sales information presented from the issue enterprise itself includes a company guidance of the issue enterprise, a business policy of a representative of the issue enterprise, and purposes of fund procurement based on the issue of the unlisted stocks.

The information presented from a third party other than the issue enterprise includes an evaluation report and a research result of the issue enterprise by analysts, paper articles and investors announced information relating to the issue enterprise.

In the present embodiment, the prospectus data and the IR information explained later are described as independent information without being included in the enterprise basic information. This is the description for the sake of convenience of the explanation, and therefore, the prospectus data can be included in the actual information presented from the enterprise itself, and the IR information can be included in the advertising and sales information presented from the enterprise itself.

The data format of the enterprise basic information is optional. For example, this can be stored in a text file described in the HTML (HyperText Markup Language) or the XML (Extensible Markup Language). Alternatively, a business policy may be recorded in the voice of the representative and stored in the voice file of the WAVE format or the AIFF format. Further, a still image and a dynamic image of a company guidance may be stored in the image file in the JPEG format or the MPEG2 format.

As the prospectus data, it is possible to store information of the prospectus that is presented to investors. This prospectus is the document legally prescribed as described above, and the contents of this document are formed according to the law. The storing format of the prospectus data is optional. For example, the prospectus data may be stored in the format of the PDF (Portable Document Format).

The desired attribute information is the information that can become a reference for selecting investors who should participate in the bidding for unlisted stocks. This is optional information for the issue enterprise to specify characteristics and property of investors whom the issue enterprise wants to become shareholders.

In the present embodiment, as the desired attribute information, there are stored a type of an investor (a distinction between a city bank, a local bank, a trust and banking company, a life insurance company, an indemnity insurance company, a venture capital, and a business corporation), an investor capital relationship (a name of a zaibatsu, or a financial clique, when there is a financial relationship with them), and a characteristic of a fund of an investor (whether it is possible to expect a long-term holding or not). This desired attribute information is recorded as text data.

The business policy information is the information that can become a reference for reference for selecting investors who should participate in the bidding for unlisted stocks. This is optional information for specifying the business policy of the issue enterprise.

In the present embodiment, as the business policy information, there are stored a form of business, a type of industry, or a business model of the issue enterprise, an establishment stage of the issue enterprise, a scale or a financial state, and business policy and business philosophy of the originator of the issue enterprise. This business policy information is recorded as text data.

(System Structure—Server Unit 1—Investor Information DB 11)

Next, the investor information DB 11 shown in FIG. 2 will be explained. This investor information DB 11 is investor an information storage unit which stores information (investor information) relating to investors who are the members of the present system.

As shown in FIG. 5, this investor information includes, for example, an investor ID for uniquely identifying each investor, a password for authenticating the investor, a company name of the investor, an address of the investor, an e-mail address of the investor, attribute information of the investor, and investment policy information of the investor. These items are stored by being related to each other.

The attribute information of the investor is the information that can become a reference for selecting investors who should participate in the bidding for unlisted stocks. This is optional information for specifying characteristics and property of each investor.

In the present embodiment, as the attribute information, there are stored a type of an investor (a distinction between a city bank, a local bank, a trust and banking company, a life insurance company, an indemnity insurance company, a venture capital, and a business corporation), an investor capital relationship (a name of a zaibatsu, or a financial clique, when there is a financial relationship with them), a characteristic of a fund of an investor (whether it is possible to expect a long-term holding or not), a business scale (capital, etc.) of the issue enterprise for which the investor wants to bid, nationality (Japan, USA, Japan and USA, etc.) of the issue enterprise for which the investor wants to bid, and an area of the existence (Kanto area of Japan, Kansai area of Japan, etc.) of the issue enterprise for which the investor wants to bid. This attribute information is recorded as text data. It is preferable that the items of this attribute information correspond to the items of the desired attribute information to be stored in the issue enterprise information DB 10.

The investment policy information of the investor is the information that can become a reference for selecting investors who should participate in the bidding for unlisted stocks. This is optional information for each investor to specify an issue enterprise for which the investor considers suitable to bid.

In the present embodiment, as the investment policy information, there are stored a form of business, a type of industry, or a business model of the issue enterprise for which the investor wants to bid, an establishment stage, a scale or a financial state of the issue enterprise for which the investor wants to bid, and business policy and business philosophy of the originator of the issue enterprise for which the investor wants to bid. This investment policy information is recorded as text data. It is preferable that the items of this information correspond to the items of the business policy information to be stored in the issue enterprise information DB 10.

(System Structure—Server Unit 1—Subscription Information DB 12)

The subscription information DB 12 shown in FIG. 2 is a subscription information storage unit which stores information (subscription information) relating to the bid subscription of unlisted stocks.

As shown in FIG. 6, this subscription information includes an issue enterprise ID of the issue enterprise and a subscription condition. These sections are stored by being related to each other.

The subscription condition is the condition to be disclosed to investors at the time of inviting bids for unlisted stocks. For example, this information includes an information provision starting date that specifies a date of starting the provision of information relating to the unlisted stocks, an issuing system, a subscription stock number or a subscription total amount, a lowest bid stock price, a lowest bid stock number or a lowest bid stock total amount, a unit stock number, a bid period, a successful bid processing scheduled date, and the term for payment. These items are stored by being related to each other.

As the issuing system, either the stock number issuing system or the total amount issuing system is selected as described above. The subscription stock number is an upper limit value of the number of unlisted stocks that are issued. The subscription total number is an upper limit value of the amount of money to be procured based on the issue of the unlisted stocks. When the issue enterprise selects the stock number issuing system as the issuing system, the subscription stock number is set. When the issue enterprise selects the total amount issuing system as the issuing system, the subscription total amount is set.

The lowest bid stock price is a lower limit value of the bid stock price that the investor can bid.

The lowest bid stock number is a lower limit value of a total number of unlisted stocks. When this lowest bid stock number has been set, the successful bid condition is that the stocks of the number equal to or more than of the lowest bid stock number are settled as a successful bid. The successful bid means that as a result of the bid, the purchase of the transaction item becomes possible.

The lowest bid total amount is a lower limit value of a total amount of the bid. When this lowest bid total amount has been set, the successful bid condition is that the stocks of the amount equal to or more than the lowest bid total amount are settled as a successful bid.

When the issue enterprise selects the stock number issuing system as the issuing system, the lowest bid stock number is set. When the issue enterprise selects the total amount issuing system as the issuing system, the lowest bid stock amount is set.

The unit stock number is a minimum unit of the number of stocks allocated to each investor. When the issue enterprise has set this unit stock number, the successful bid condition is that the number of stocks that are an integer times of this unit stock number are settled as a successful bid. However, when this unit stock number has not been set, the unit stock number becomes equal to 1 (it is possible to allocate starting from one stock).

The bid period is a period during which the bid can be carried out. The successful bid processing scheduled date is a date when the successful bid is settled. The term of payment is a limit date when each investor who has bid must pay the amount of money to be paid (contract amount)

In addition to the above subscription condition, it is also possible to set a bid unit, a highest bid stock number or a highest bid total amount, according to the needs.

The bid unit is a reference unit of a bid stock number by which each investor can bid. When this bid unit has been set, the successful bid condition is that the bid stock number that is an integer times of this bid unit is bid.

The highest bid stock number is an upper limit value of a total successful bid stock number. When this highest bid stock number has been set, the successful bid condition is that the stock number equal to or less than this highest bid stock number is settled as a successful bid.

The highest bid total amount is an upper limit value of a bid total amount. When this highest bid total amount has been set, the successful bid condition is that stocks of the amount corresponding to this highest bid total amount or less are settled as a successful bid.

(System Structure—Server Unit 1—Selection Information DB 13)

The selection information DB 13 shown in FIG. 2 is selection an information storage unit which stores information (selection information) for selecting investors who satisfy the above selection conditions.

As shown in FIG. 7, this selection information includes, for example, an issue enterprise ID of the issue enterprise, and an investor ID of the investor who satisfies the selection condition. These items are stored by being related to each other.

(System Structure—Server Unit 1—Reference Record Information DB 14)

The reference record information DB 14 shown in FIG. 2 is reference record an information storage unit which stores information (reference record information) relating to the reference record of the prospectus data of an investor.

As shown in FIG. 8, this reference record information includes, for example, an issue enterprise ID of the issue enterprise, and an investor ID of an investor who has so far downloaded the prospectus data of the issue enterprise. These items are stored by being related to each other.

(System Structure—Server Unit 1—Bid Information DB 15)

The bid information DB 15 shown in FIG. 2 is a bid information storage unit which stores information (bid information) that shows the contents of bid from the investor for unlisted stocks.

As shown in FIG. 9, this bid information includes, for example, an issue enterprise ID of an issue enterprise that issues unlisted stocks as the bid item, an investor ID of an investor who bid, a bid stock price of the investor, a bid total number or a bid total amount of the investor, and a lowest permissible purchase stock number. These items are stored by being related to each other.

When the investor has selected the stock number bidding system, the bid stock number is set. When the investor has selected the total amount bidding system, the bid total amount is set.

The lowest permissible purchase stock number is a lower limit value of a bid stock number. When the investor has set this lowest permissible purchase stock number, the successful bid condition for this investor is that the successful bid stock number is equal to or more than this lowest permissible purchase stock number.

(System Structure—Server Unit 1—Successful Bid Information DB 16)

The successful bid information DB 16 shown in FIG. 2 is successful a bid information storage unit which stores information (successful bid information) that shows a result of the successful bid for the unlisted stocks.

As shown in FIG. 10, this successful bid information includes, for example, an issue enterprise ID of an issue enterprise that issues unlisted stocks as the bid item, an investor ID of an investor who has bid, a successful bid stock price of the investor, a successful bid stock number of the investor, and a contract amount. These items are stored by being related to each other. In broad terms, the information relating to the investment record like the successful bid stock price and the successful bid stock number can also be regarded as the information relating to the unlisted stocks. Therefore, the successful bid information DB 16 also functions as the a transaction item information storage unit which stores information relating to the transaction item.

(System Structure—Server Unit 1—Faq Information Db 17)

The FAQ information DB 17 shown in FIG. 2 is FAQ an information storage unit which stores information (FAQ information) on the FAQ (Frequently Asked Question) relating to transactions of unlisted stocks.

(System Structure—Server Unit 1—IR Information Db 18)

The IR information DB 18 shown in FIG. 2 is IR an information storage unit which stores information (IR information) relating to the IR (Investor Relations) that is transmitted from the issue enterprise. In broad terms, this IR information can also be regarded as the information relating to unlisted stocks as the transaction item. Therefore, the IR information DB 18 also functions as the a transaction item information storage unit which stores information relating to the transaction item.

This IR information includes an issue enterprise ID and optional data like a transition of the financial state presented from the issue enterprise as the IR. These items are stored by being related to each other.

(System Structure—Server Unit 1—Web DB 19)

The Web DB 19 shown in FIG. 2 stores various Web data for transmission to the client units 3 to 5. This Web DB includes data for displaying an enterprise list reading screen G3 and a successful bid result reading screen G4 to be explained later. These data are formed as a text file described in the HTML or the XML, for example. In addition, the Web DB 19 can also store a sound for transmission to the client units 3 to 5 in a sound file in the WAVE format or the AIFF format, or can store still images and moving dynamic images in an image file in the JPEG format or the MPEG format, according to the needs.

In FIG. 1, the communication control IF 20 carries out a communication control between the server unit 1 and the Internet 2 (or the communication unit like the router or the like).

In FIG. 2, based on the concept of functions, the control section 21 consists of a request interpreting section 21a, a registration processing section 21b, a read processing section 21c, an authentication processing section 21d, a selection processing section 21e, a reference record registration processing section 21f, a bid processing section 21g, a successful bid processing section 21h, and a mail transmission processing section 21l.

Of the above, the request interpreting section 21a is a request interpreting unit which interprets the request contents from the client units 3 to 5, and delivering the processing to other sections of the control section 21 according to a result of this interpretation.

The registration processing section 21b is a register processing unit which receives a register request of various information from the client unit 5, and carrying out the information registration into each DB.

The read processing section 21c is a read processing unit which receives a read request of various screens from the client units 3 to 5, and generating and transmitting Web data of these screens.

The authentication processing section 21d is an authentication processing unit which receives an authentication request from the client units 3 to 5, and making a decision on this authentication.

The selection processing section 21e is a selection processing unit which receives a an investor selection request from the client unit 5, and carrying out a selection of an investor.

The reference record registration processing section 21f is a reference record register processing unit which registers a record of the prospectus data when this data has been read via the client unit 3.

The bid processing section 21g is a bid processing unit which receives a bid request from the client unit 3, and carrying out a predetermined bid processing.

The successful bid processing section 21h is successful bid processing unit which processes the successful bid. Further, based on the concept of sub-module functions, this successful bid processing section 21h consists of a successful bid stock price determination section 21j, a successful bid stock number determination section 21k, and a successful bid result processing section 21m.

Of the above, the successful bid stock price determination section 21j is a successful bid stock price determination unit which determines the successful bid stock price. The successful bid stock number determination section 21k is a successful bid stock number determination unit which determines the successful bid stock number. The successful bid result processing section 21m is a successful bid result processing unit which processes the information relating to a result of the successful bid.

The mail transmission processing section 21l is a mail transmission processing unit which generates an e-mail, and transmitting the e-mail to the client units 3 to 5.

Details of the processing carried out by these sections will be explained later.

The structure of the server unit 1 has been explained above. However, each constituent element shown in the drawing are based on the concept of functions, and it is not always necessary to have a physical structure as shown in the drawing.

For example, the CPU (Central Processing Unit) and a program that is interpreted and executed by this CPU may realize the whole or an optional part of the processing functions of severs of the server unit 1, particularly the processing functions achieved by the control section 21. Alternately, it is also possible to realize these functions by hardware based on a wired logic. The program is stored in the present recording medium not shown, and is mechanically read by the server unit 1 according to the needs.

The detailed mode of disintegration and integration of the server unit 1 are not limited to that shown in the drawing. It is also possible to structure the whole or a part of the server unit 1 by disintegrating or integrating either functionally or mechanically in an optional unit based on various loads. For example, the Web DB 19 may be independently structured as a Web server unit. Alternately, the bid information DB 15 and the successful bid information DB 16 may be integrated into one DB. As the actual structural function of the server unit 1, it is possible to add functions of a firewall server and a DNS (Domain Name System) server. Known structures can be applied for these. Therefore, their explanation will be omitted.

(System Structure—Client Unit 3 of the Investor)

Figure 3:
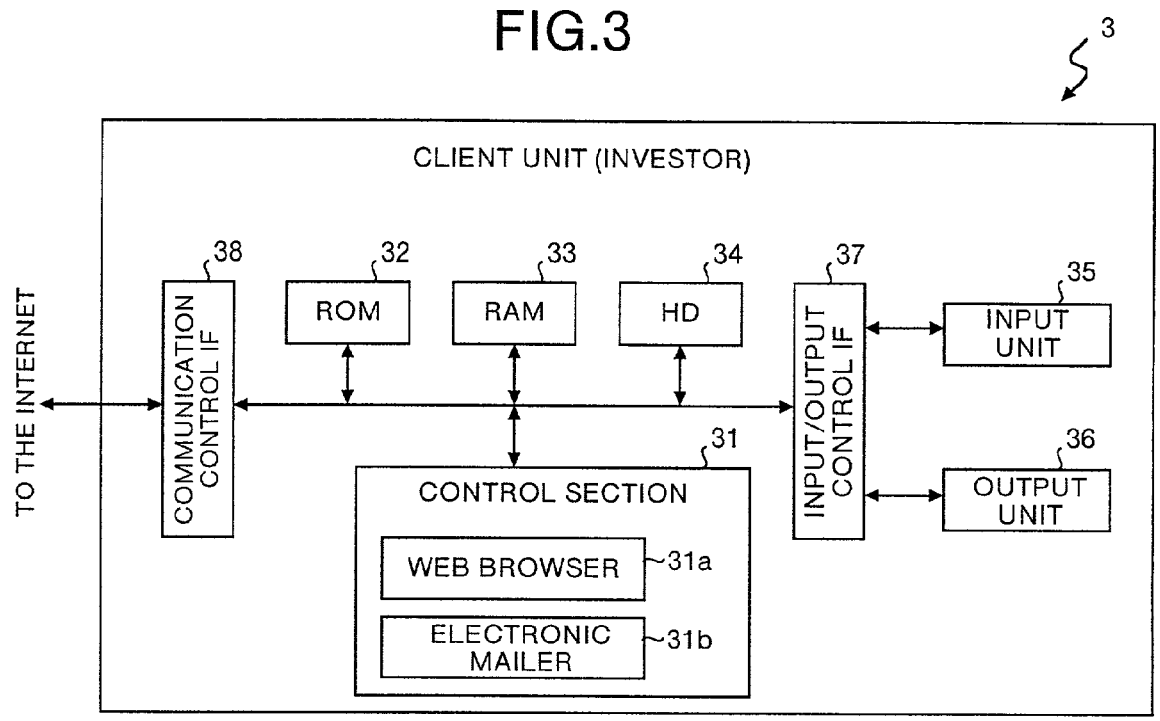
FIG. 3 is a block diagram of a client unit.

Next, the structure of the client unit 3 of the investor will be explained. FIG. 3 shows a block diagram of the client unit 3. As shown in FIG. 3, in outline, the client unit 3 consists of the control section 31, ROM 32, RAM 33, HD 34, input unit 35, output unit 36, input/output control IF 37, and communication control IF 38. These sections are connected to each other via a bus so as to be able to carry out data communications.

This client unit 3 can be realized by, for example, a personal computer, a workstation, a home game machine, an Internet TV, a PDA (Personal Digital Assistant), or a mobile communication terminal like a portable telephone and a PHS (Personal Phone System).

The control section 31 of this client unit 3 consists of a Web browser 31*a*, and an electronic mailer 31*b*. Of the above, the Web browser 31*a* basically interprets Web data, and carries out a display control (a brows processing) for making display to a monitor 36 to be explained later. The electronic mailer 31*b* transmits/receives e-mails according to a predetermined communication rule (for example, the Simple Mail Transfer Protocol).

The CPU and a program that is interpreted and executed by this CPU may realize the whole or an optional part of the control section 31. In other words, the ROM 32 or the HD 34 is recorded with a computer program for giving an instruction to the CPU and making the CPU execute various kinds of processing in co-operation with the OS (Operating System). This computer program is loaded on the RAM 33 and is executed, and constitutes the control section 31 in co-operation with the CPU.

However, this computer program may also be stored in an optional application program server that is connected to the client unit 3 via the Internet 2. It is also possible to download the whole or a part of this computer program according to the needs. It is also possible to realize the whole or an optional part of this control section 31 by hardware like the wired logic.

A keyboard, a mouse and a microphone can be used for the input unit 35. A monitor 36 to be explained later also realizes a pointing device function in co-operation with the mouse.

In addition to a monitor (including a home television), a speaker can be used for the output unit 36 (hereinafter, the output unit 36 will be described as the monitor 36).

The client unit 3 having the above-described structure is connected to the Internet 2 via the communication unit like a modem, a TA, and a router, and a telephone line, or via an exclusive line. Thus, the client unit 3 can make access to the server unit 1 according to a predetermined communication rule (for example, the TCP/IP Internet protocol).

(System Structure—Client Units 4 and 5)

The client unit 4 of the issue enterprise and the client unit 5 of the manager can be structured in a similar manner to the client unit 3 of the investor. Therefore, this will be explained to avoid the duplicated explanation.

(Network)

As the network for connecting between the server unit 1 and the client units 3 to 5, an optional network can be utilized without limiting to the above-described Internet 2. For example, it is possible to build up the present system using a LAN, a WAN or a personal computer communication network within a limited area. In addition, it is also possible to transmit/receive various kinds of data using a ground wave, a CATV, a CS, a BS, or the ISDB (Integrated Services Digital Broadcasting). In other words, the network can include not only a wired network but also a radio communication network.

(Transaction Information Processing)

There will be explained below details of the transaction information processing as the present method that is executed using the present system of the above-described structure.

(Transaction Information Processing—Registration of Various Kinds of Information)

An investor who bids for unlisted stocks in the present system is registered as a member of the present system. The own investor information is stored in the investor information DB 11. Also, the investor is provided with an investor ID and a password. In this case, a method of examining a member, a method of obtaining investor information, and a method of providing an ID and a password are optional.

For example, an investor who desires to become a member of the present system presents a document recorded with investor information to the manager. The manager examines the investor based on this document. When the investor has passed the examination, an investor ID and a password are issued to this investor. The investor ID, the password, and the investor information are registered into the investor information DB 11 via the client unit 5. The manager issues the investor ID and the password based on an optional method, and posts them to the investor based on an optional method like a postal mail or an e-mail.

Similarly, the manager obtains issue enterprise information and subscription information from the issue enterprise based on an optional method. When the issue enterprise determines a subscription condition, the issue enterprise selects either the stock number issuing system or the total amount issuing system. When the issue enterprise selects the stock number issuing system, the issue enterprise determines the subscription stock number and the lowest bid stock number. When the issue enterprise selects the total amount issuing system, the issue enterprise determines the subscription total amount and the lowest bid amount.

Then, the manager issues the investor ID and the password based on an optional method, and registers the investor ID, the password, and the obtained issue enterprise information into the issue enterprise information DB 10. At the same time, manager stores the subscription information into the subscription information DB 12. Then, the manager posts the issue enterprise ID and the password that have been issued, to the issue enterprise based on an optional method like a postal mail or an e-mail.

The manager can register each information to the server unit 1 using an information upload screen to be explained later, or based a data transmission according to the FTP (File Transfer Protocol), or other optional method. The information to be registered is delivered from the request interpreting section 21a to the registration processing section 21b. Then, this registration processing section 21b makes access to each DB, and registers the information.

(Transaction Information Processing—Initial Screen Display)

Figure 11:
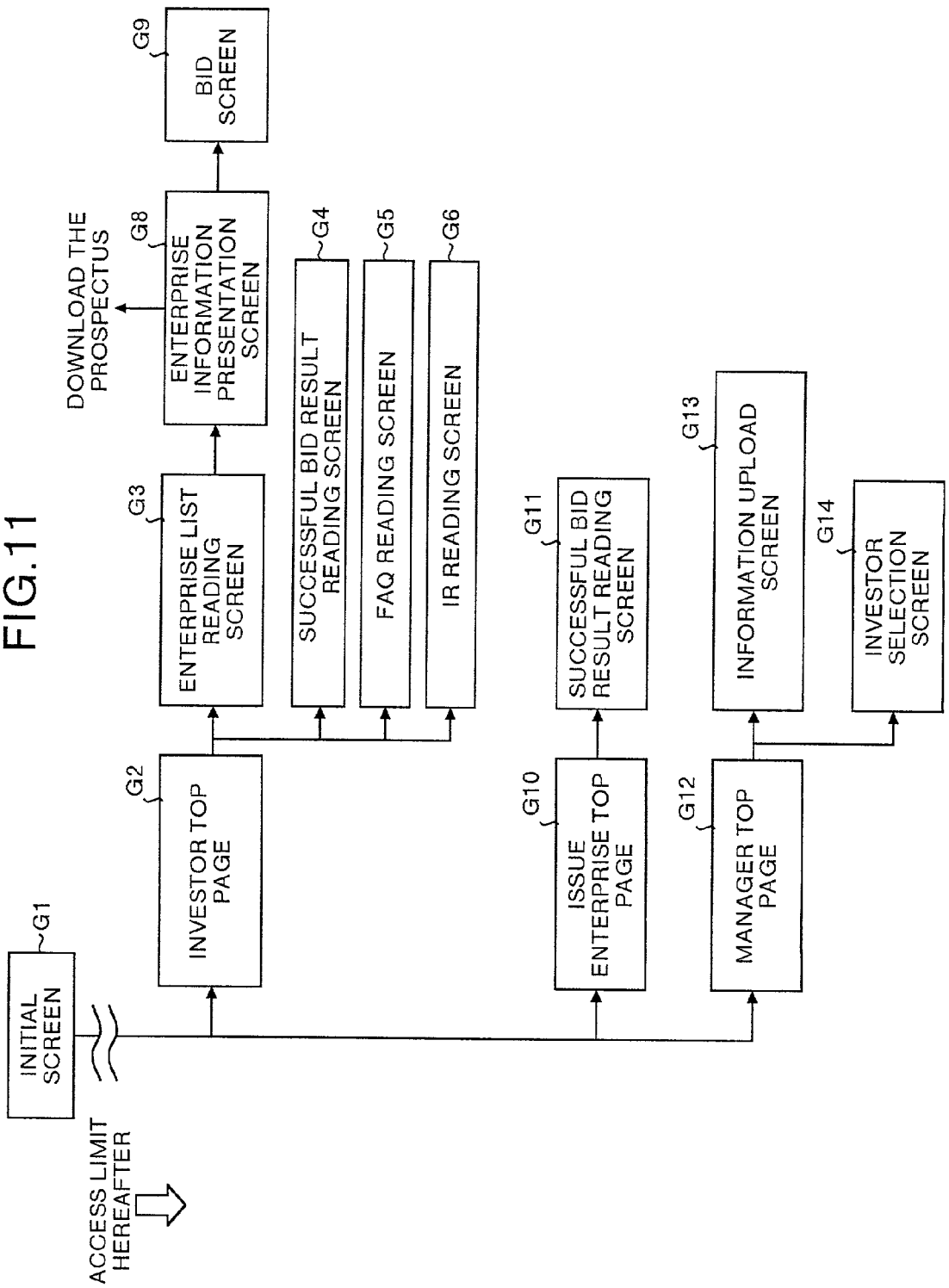
FIG. 11 is a screen transition diagram of a Web site formed in the present system.

Next, the outline of the process of utilizing the present system will be explained. FIG. 11 is a screen transition diagram of a Web site as a virtual transaction market of unlisted stocks formed in the present system. As shown in FIG. 11, the investor, the issue enterprise (in actual practice, a person in charge in the issue enterprise), and the manager can shift to each screen starting from an initial screen G1 as a starting point.

Specifically, the investor logs in from the initial screen G1, and shifts to an investor top page G2. The investor can further shift to an enterprise list reading screen G3 for reading the bid subscription information of the issue enterprise, a successful bid result reading screen G4 for reading a result of a successful bid, an FAQ reading screen G5 for reading the FAQ, and an IR reading screen G6 for reading the IR issued from the issue enterprise. The investor can further shift from the enterprise list reading screen G3 to an enterprise information presentation screen G8 for reading the enterprise basic information of the issue enterprise, and a bid screen G9 for carrying out the bid.

The issue enterprise can log in from the initial screen G1 to shift to an issue enterprise top page G10, and to a successful bid result reading screen G11 for reading a result of a successful bid.

The manager can log in from the initial screen G1 to shift to a manager top page G12, then to an information upload screen G13 for uploading various kinds of information to be stored into the server unit 1, and an investor selection screen G14 for indicating a selection of an investor.

Further, in place of these screens, or in addition to these screens, it is possible to provide other optional screens. For example, in actual practice, a log-on screen for carrying out a log-on to shift to each top page, and an error screen that is displayed at a predetermined time are provided. It is also possible to optionally modify the mutual transition relationship of the screens. For example, it is possible to directly shift from the investor top page G2 to the bid screen G9. This shift method is also optional. It is possible to switch between screens by having the screens structured in a tab system. Display contents of these screens will be described later.

(Transaction Information Processing—Initial Screen Display)

The investor, the issue enterprise, and the manager can read the initial screen G1 as the starting point, by using the Web browser 31a of the client units 3 to 5 respectively. Specifically, a predetermined URL corresponding to the initial screen G1 is input to a predetermined input column of the Web browser 31a. Based on the routine of this URL, a transmission request of the initial screen G1 is made to the server unit 1.

On the other hand, the request interpreting section 21a of the server unit 1 monitors the request contents transmitted from the client units 3 to 5. When there has been this transmission request, the request interpreting section 21a carries out a processing corresponding to this transmission request. In this case, the request interpreting section 21a delivers the request to the read processing section 21c. Then, the read processing section 21c obtains the Web data of the initial screen G1 from the Web DB 19, and transmits this Web data to the client units 3 to 5.

The client units 3 to 5 receive the Web data from the server unit 1, and interprets the Web data in the Web browser 31a. Then, the initial screen G1 is displayed on the monitor 36. (Hereinafter, a transmission request from the client units 3 to 5 to the server unit 1, an obtaining of Web data in the server unit 1, a transmission to the client units 3 to 5, and a handling of Web data in the client units 3 to 5, are similar except where a special remark is made.)

(Transaction Information Processing—Initial Screen Display—Authentication)

The initial screen G1 displayed in this way is provided with a link button in the Hyper Text for shifting to each top page. When any one link button is selected via the input unit 35, a transmission request is transmitted to the server unit 1 according to the link button. The server unit 1 transmits the Web data for the authentication screen. This screen is displayed on the monitor 36 of the client units 3 to 5 respectively.

When the investor has selected a link button to the investor top page G2, for example, the investor inputs the own investor ID and the password into the authentication screen, and transmits them. Then the investor ID and the password are delivered to the authentication processing section 21d of the server unit 1. The authentication processing section 21d refers to the investor information DB 11 using the transmitted investor ID and password as keys. Then the authentication processing section 21d makes a decision about whether or not the transmitted investor ID and password coincide with any one of the investor IDs and passwords respectively stored in the investor information DB1, thereby to carry out the authentication of the investor. When the investor cannot be authenticated, the authentication processing section 21d transmits Web data of a predetermined error screen to the client unit 3. Then, this screen is displayed on the monitor 36.

When the issue enterprise has selected a link button to the issue enterprise top page G10, a similar operation is carried out. The authentication processing section 21d refers to the issue enterprise information DB 10 using the issue enterprise ID and the password input by the issue enterprise as keys, thereby to carry out the authentication of the issue enterprise. When the issue enterprise can be authenticated, the issue enterprise top page G10 is displayed on the monitor 36.

When the manager has selected a link button to the manager top page G12, the authentication processing section 21d refers to the manager ID and the password stored in the manager information area not shown of the server unit 1 using the manager ID and the password input by the manager as keys, thereby to carry out the authentication of the manager. When the manager can be authenticated, the manager top page G12 is displayed on the monitor 36.

In the present system, it is possible to shift to each screen after the initial screen, only when the authentication has been carried out as described above. Therefore, it is possible to avoid the risk that information is leaked to an illegal third party.

Particularly, according to the bid format in the present system, when the bid record of each investor is made known to other investors, there is a high risk that the bid stock price is manipulated to carry out the bid illegally. Therefore, based on the use of the above-described authentication system, only the corresponding investor can know the own bid information and reference record, and the information is not opened to other investors. As a result, it is possible to secure the fairness and reliability of the bid.

(Transaction Information Processing—Selection of an Investor)

Next, an investor selection processing that is carried out using the manager top page G12 as a starting point will be explained. After the issue enterprise information, the subscription information, and the investor information have been stored as described above, and at least before the bid as presented in the corresponding subscription information has been started, the manager selects investors who can participate in the bidding. Specifically, the manager selects a link button of the investor selection screen provided on the manager top page G12 using the client unit 5. Then, this investor selection screen is displayed.

This investor selection screen is provided with an input column for inputting information (the issue enterprise ID in this case) for specifying the issue enterprise. The manager inputs the issue enterprise ID into this input column, and indicates a selection of the investor according to a predetermined method. Then, this issue enterprise ID and a selection request for selecting an investor are delivered to the selection processing section 21e of the server unit 1, so that the selection processing is started.

Figure 12:
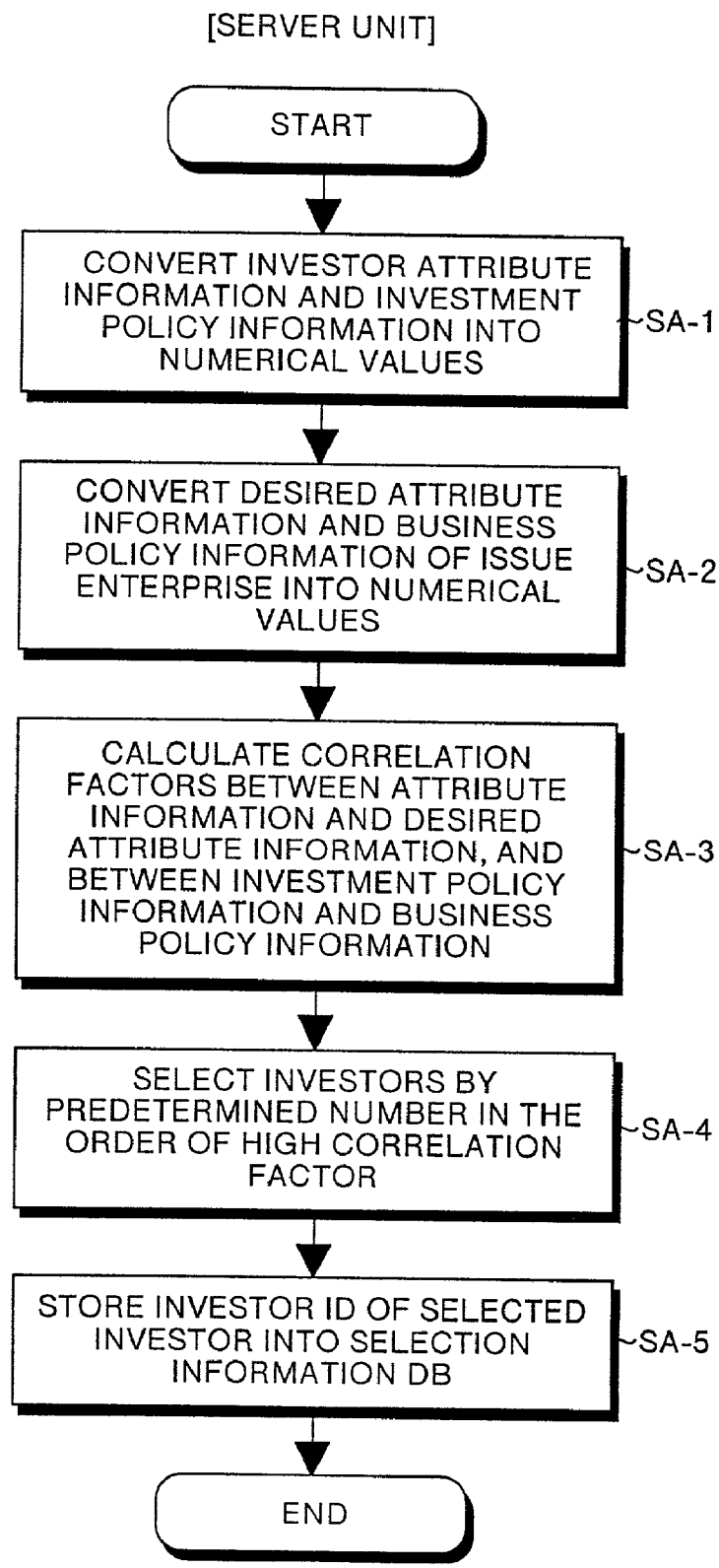
FIG. 12 is a flowchart of a selection processing.

FIG. 12 shows a flowchart of this selection processing. As shown in FIG. 12, the selection processing section 21e first refers to the investor information DB 11, and calls the attribute information and the investor policy information of all the investors stored at this time in the investor information DB 11. Then, the selection processing section 21e expresses in numerical values the contents of each item included in the attribute information and the investor policy information of each investor (step SA-1).

This numerical expression is carried out to classify the contents of the attribute information and the investment policy information. This is carried out based on an optional method. For example, the server unit 1 is recorded with a numerical value table that relates the attribute information and the investment policy information to the numerical values (a form of business of the investor=city bank=1, a form of business of the investor=local bank=2, ---, etc.) The selection processing section 21e numerically expresses the attribute information and the investment policy information by referring to this numerical value table.

The selection processing section 21e refers to the enterprise information DB using the enterprise information ID transmitted from the client unit 5 as a key, and calls the desired attribute information and the business policy information of the issue enterprise corresponding to the enterprise information ID. Then, the selection processing section 21e numerically expresses the contents of each item included in the desired attribute information and the business policy information (step SA-2). This numerical expression can be carried out in a similar manner to that explained above.

Then, using a known correlation function, the selection processing section 21e calculates a correlation factor between the numerical value of the attribute information of each investor and the numerical value of the desired attribute information, and between the numerical value of the investment policy information of each investor and the numerical value of the business policy information (step SA-3).

Next, the selection processing section 21e selects investors by a predetermined number in the order of high correlation factors (step SA-4). This predetermined number can be optionally determined according to a bid mode. In the present embodiment, this predetermined number is set to 49 as a limit number of an easy subscription (private placement) of selling and purchase of stocks as prescribed in the securities transaction law of Japan.

Then, the selection processing section 21e stores the enterprise information ID transmitted from client unit 5 and the investor ID of the selected investor into the selection information DB 13 by relating to each other (step SA-5). Then, the selection processing finishes. Advantages of this selection will be explained later. As a matter of fact, it is also possible to select investors based on the manager's own experience, and can manually register the selected investors.

(Transaction Information Processing—Display of Enterprise List Reading Screen)

Next, a display processing of the enterprise list reading screen G3 will be explained. The investor top page G2 displayed in the manner as described above includes link buttons for shifting to the screens G2 to G6.

Figure 13:
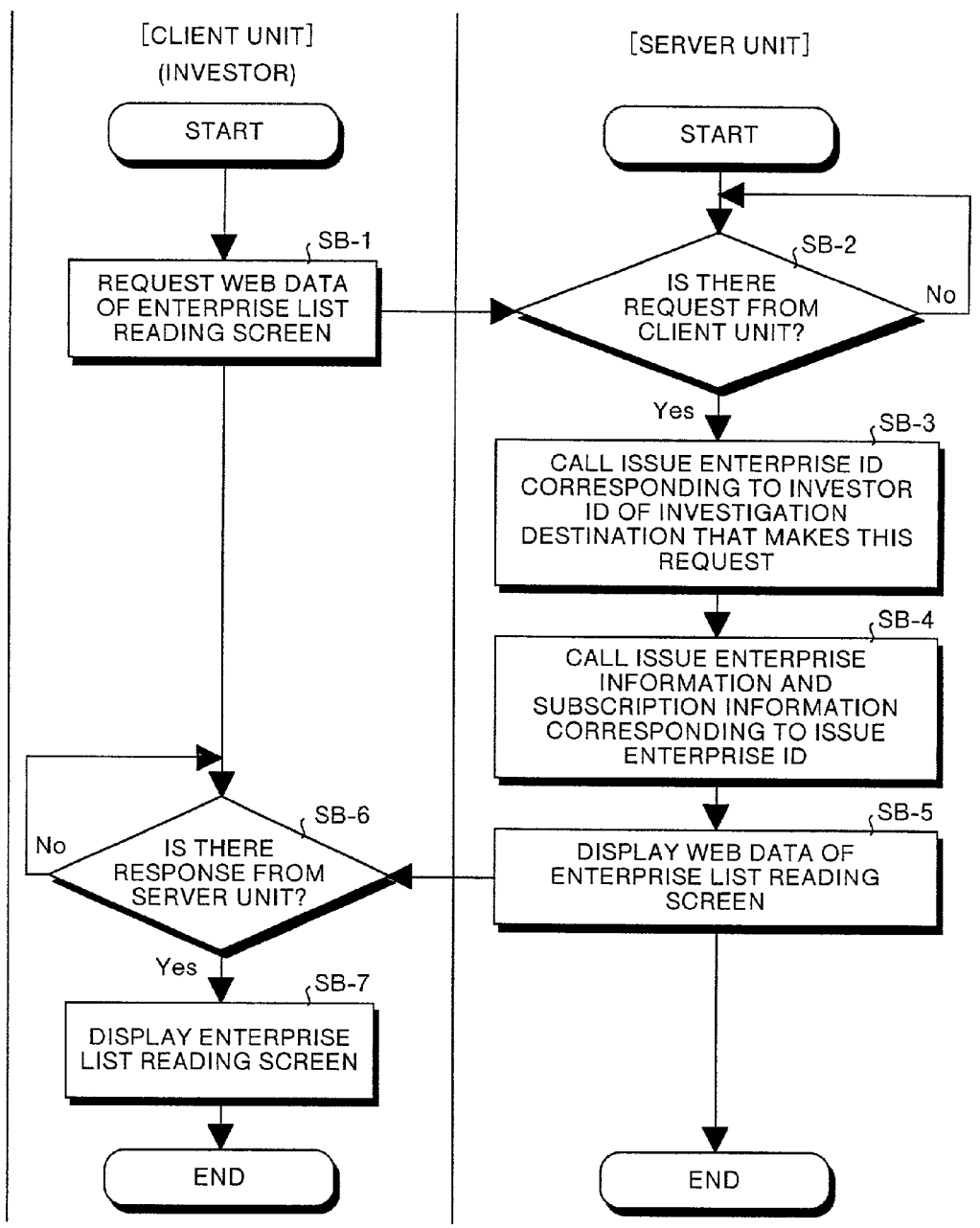
FIG. 13 is a flowchart of a processing for displaying an enterprise list reading screen.

When the investor has selected a predetermined link button, a processing for displaying the enterprise list reading screen G3 is carried out. FIG. 13 shows a flowchart of this processing. In FIG. 13, when the investor has requested Web data of the enterprise list reading screen G3 (step SB-1), the server unit 1 refers to the selection information DB 13 using the investor ID of the investor who has made this request, and calls an issue enterprise ID stored relating to this investor ID (steps SB-2 and SB-3).

The server unit 1 refers to the issue enterprise information DB 10 using this issue enterprise ID as a key, and calls a company name and an address of this issue enterprise stored relating to this issue enterprise (step SB-4). At the same time, the server unit 1 refers to the subscription information DB 12 using the issue enterprise ID as a key, and calls a subscription condition of the issue enterprise stored relating to this issue enterprise ID (the same step SB-4).

Next, the server unit 1 generates Web data of the enterprise list reading screen G3 using the called information, and transmits this Web data to the client unit 3 (step SB-5). Then, this enterprise list reading screen G3 is displayed on the monitor 36 of the client unit 3 (steps SB-6 and SB-7). The display processing of the enterprise list reading screen G3 finishes there.

FIG. 45 shows an example of a structure of this screen G3. As shown in FIG. 45, on the screen G3, there are displayed issue enterprise company name and address G3-1, and a subscription condition G3-2.

The Web data can be dynamically generated using the CGI (Common Gateway Interface), for example (hereinafter the same for the generation of the Web data).

The investor can know that the bid for the unlisted stocks is open, by reading the screen G3 displayed in this way. Further, the investor can understand the subscription condition.

Particularly, various information of the issue enterprise displayed on the screen G3 are called based on the information obtained from the selection information DB 13. This display is made to only the investors (investors who satisfy the selection condition) who have been selected as bids of the issue enterprise.

According to this processing, it is possible to match the image of investors desired by the issue enterprise with the image of the issue enterprise desired by the investor, and select investors in the order of high coincidence of these images. Therefore, the issue enterprise can prevent the participation of investors not desired by the own company from participating in the bidding, so that the investor can establish a preferable capital relationship. Further, as the bid information is presented to only the investors whose desired attributes and the business policy of the issue enterprise coincide with those of the issue enterprise, the issue enterprise can avoid the fear of a hostile acquisition or a takeover. Further, it is possible to collect investors with whom a future business tie-up can be expected. Therefore, this method is safe and highly reliable.

Further, investors can avoid unnecessary work of studying bids, as the investors are not invited to participate in bids offered by the issue enterprises in which the investors have little possibility of making investment.

Further, managers can ask only the investors having high investment possibility to participate in the bidding. Therefore, it is possible to increase the bid rate of investors.

Particularly, as the number of investors can be limited to the legal number of 49 or below, it is possible to carry out a private placement as a simple mode of subscription.

Furthermore, the limiting of these investors is carried out without making the investors aware of this fact.

Therefore, the investors are not made to feel the artificial sense or discomfort.

(Transaction Information Processing—Display of Enterprise Information Presentation Screen)

Next, a display processing of the enterprise information presentation screen G8 will be explained.

Thereafter, the investor can shift from the enterprise list reading screen G3 to the enterprise information presentation screen G8. Specifically, the issue enterprise company name G3-1 displayed on the enterprise list reading screen G3 is structured as link buttons for shifting to the enterprise information presentation screen G8 of each issue enterprise. When the investor has selected this link button, a processing for displaying the enterprise information presentation screen G8 is carried out. In this processing, the issue enterprise basic information of the issue enterprise corresponding to the link button is read from the issue enterprise information DB 10. Then, the Web data of the enterprise information presentation screen G8 is generated using the issue enterprise basic information, and this Web data is transmitted to the client unit 3.

Figure 46:
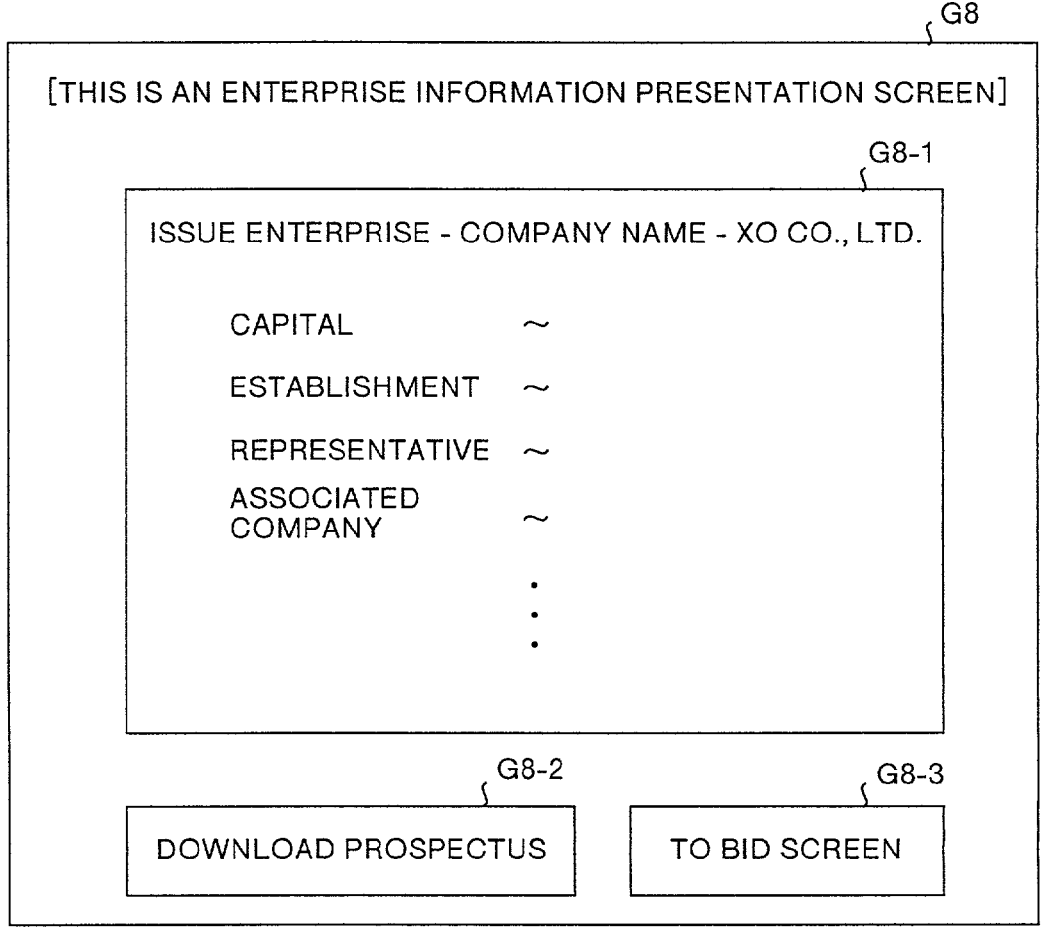
FIG. 46 is a diagram showing an example of a structure of an enterprise information presentation screen.

Then this enterprise information presentation screen G8 is displayed on the monitor 36 of the client unit 3. FIG. 46 shows an example of a structure of this screen G8. As shown in FIG. 46, this screen G8 is provided with a display area G8-1 for displaying the issue enterprise basic information. By reading this screen, the investor can obtain detailed information on the issue enterprise, and can decide whether to participate in the bidding or not, and study the bid contents when the investor decides to participate in the bidding.

(Transaction Information Processing—Download of Prospectus Data)

Figure 14:
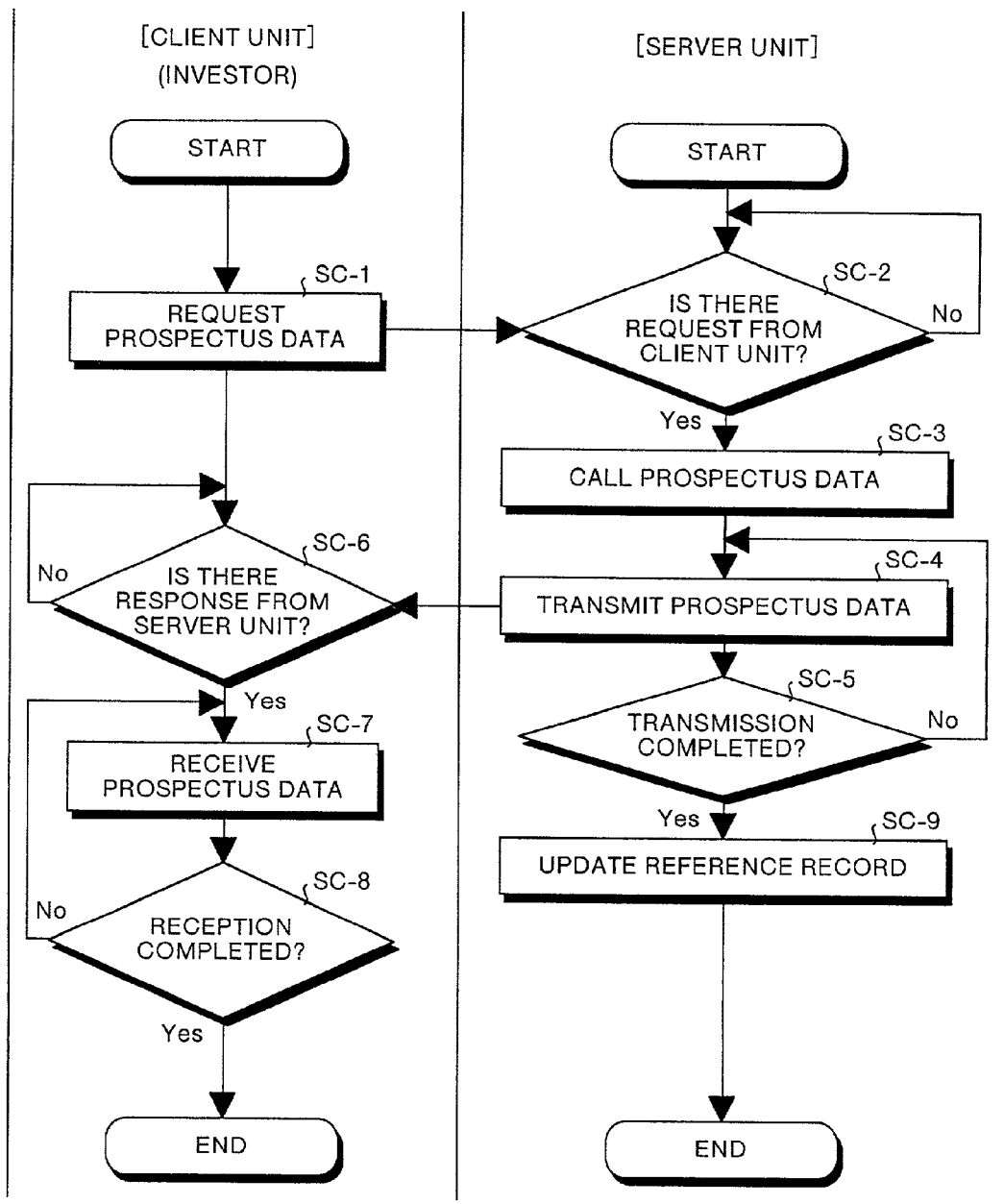
FIG. 14 is a flowchart of a prospectus data download processing.

Thereafter, the investor can request a download of the prospectus data from the enterprise information presentation screen G8. Specifically, the screen G8 is provided with a prospectus data download button G8-2 as shown in FIG. 46. When the investor has selected this download button G8-2, the download processing of the prospectus data is carried out. FIG. 14 shows a flowchart of this processing.

As shown in FIG. 14, when there has been a request for the prospectus data from the client unit 3 (step SC-1), the server unit 1 calls the prospectus data (PDF format) of the issue enterprise corresponding to the download button G8-2 from the issue enterprise information DB 10 (steps SC-2 and SC-3), and transmits this prospectus data to the client unit 3 (steps SC-4 to SC-8). Then, after completing the reception, the investor can read this prospectus data.

Particularly, as the prospectus data can be downloaded in the PDF format as described above, the investor can read the prospectus data in the text at an optional timing. Then, the investor can study the contents of the issue enterprise in detail.

After completing the transmission, this fact is delivered to the reference record registration processing section 21*f* of the server unit 1. Then, the reference record registration processing section 21*f* updates the reference record information DB 14 (step SC-9). In other words, the investor ID of the investor who has downloaded the prospectus data is stored linked to the issue enterprise ID of the issue enterprise corresponding to the prospectus data of the issue enterprise information DB 14. The record obtained in this way is utilized for making a decision about whether the investor has satisfied the document read condition, in the bid processing to be described later.

(Transaction Information Processing—Bid)

Figure 15:
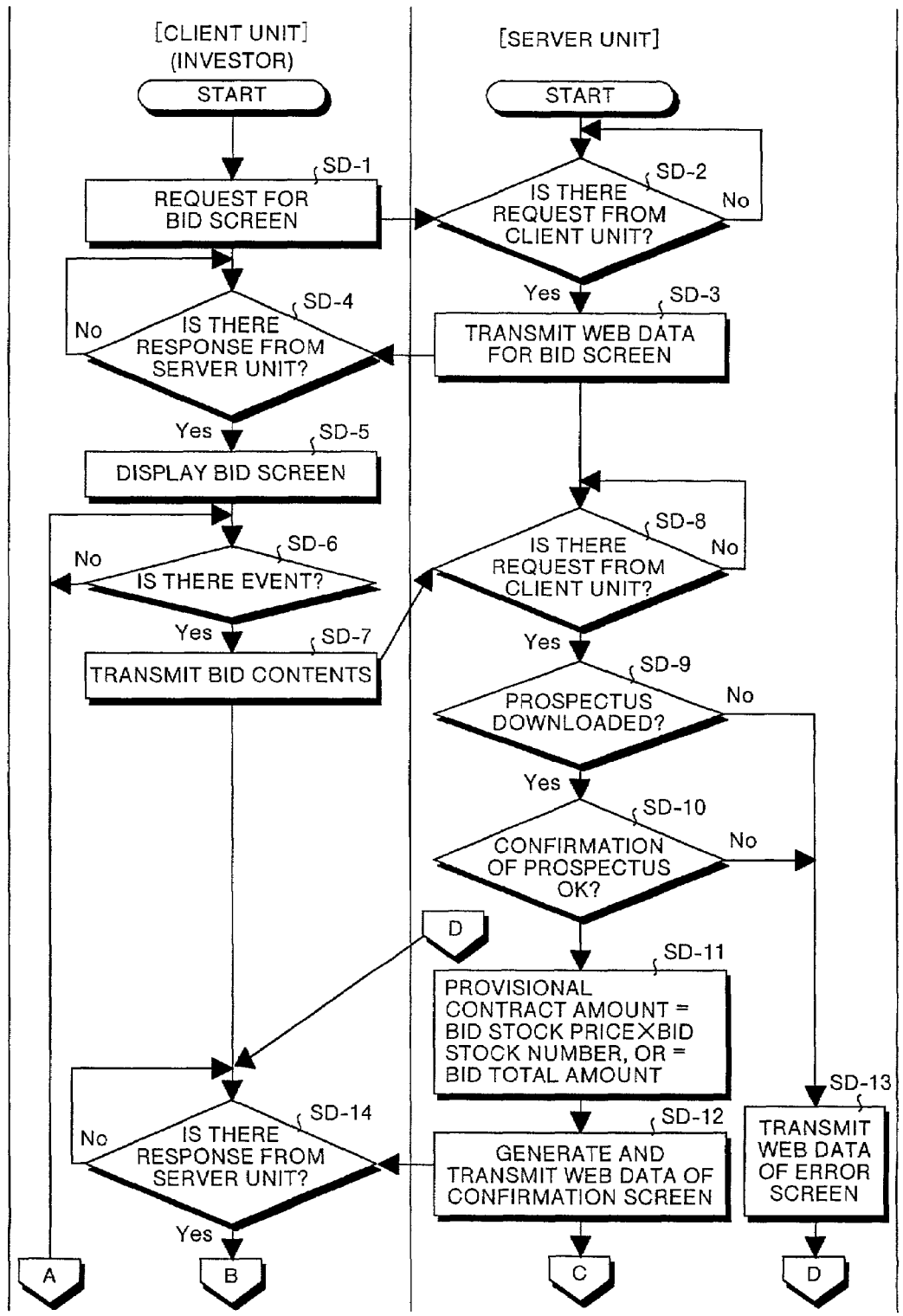
FIG. 15 is a flowchart of a bid processing.
Figure 16:
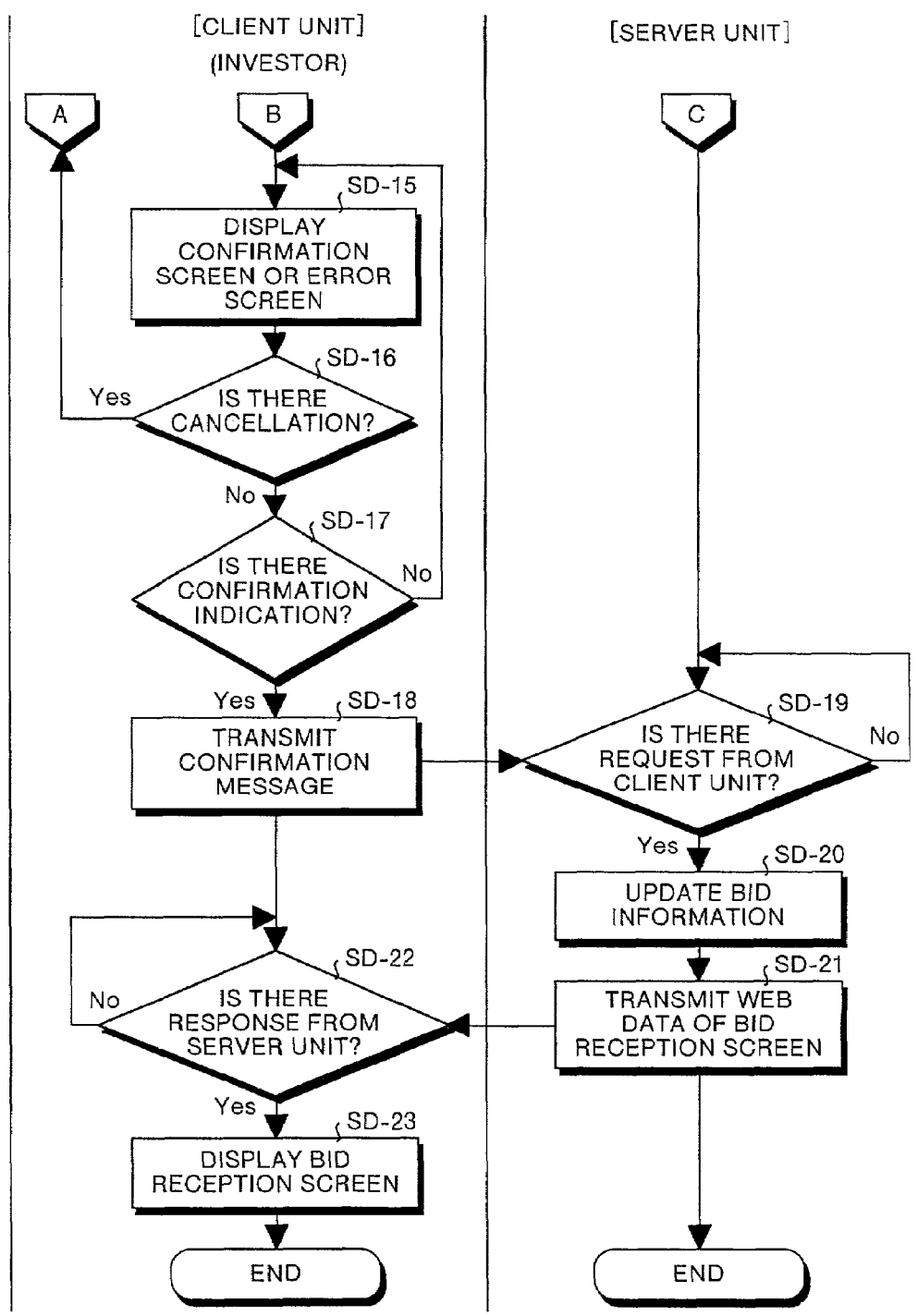
FIG. 16 is a flowchart of a bid processing.

Thereafter, the investor moves from the enterprise information presentation screen G8 to the bid screen G9. The investor can bid on the screen G9. Specifically, as shown in FIG. 46, the enterprise information presentation screen G8 is provided with a link button G8-3 for shifting to the bid screen G9. When the investor has selected this link button G8-3, the bid processing section 21*g* of the server unit 1 starts a bid processing. FIG. 15 and FIG. 16 show flowcharts of this processing. As shown in FIG. 15, when the bid screen request has been transmitted from the client unit 3 to the server unit 1 (step SD-1), the Web data of the bid screen G9 is transmitted to the client unit 3 (steps SD-2 and SD-3). Then, this screen G9 is displayed on the monitor 36 (steps SD-4 and SD-5).

FIG. 47 shows an example of a structure of this screen G9. As shown in FIG. 47, the screen G9 consists of an input column G9-1 for inputting a bid stock price and an input column G9-2 for inputting a unit stock number when the stock number bidding system is selected, an input column G9-3 for inputting a bid stock price and an input column G9-4 for inputting a bid total amount when the total amount bidding system is selected, an input column G9-6 for inputting a lowest permissible stock purchase number, radio buttons G9-6 and G9-7 for inputting whether the investor has confirmed the contents of the prospect us or not, and a indication button G9-8 for indicating the bid.

Then, the investor inputs necessary information into the input columns G9-1 to G9-5, selects one of the radio buttons G9-6 and G9-7, and selects the indication button G9-8. Then, the input information is transmitted to the server unit 1 (steps SD-6 and SD-7).

Upon receiving the above information, the server unit 1 makes a decision about whether the investor has downloaded the prospectus data or not (steps SD-8 and SD-9). Specifically, the server unit 1 refers to the reference record information DB 14 using the investor ID of this investor and the issue enterprise ID of the issue enterprise of the bid as keys, and makes a decision about whether these items have been stored linked to each other.

When these items have been stored linked to each other, the server unit 1 makes a decision that the investor has downloaded the prospectus data, and confirms the information about whether the investor has confirmed the contents of the prospectus (step SD-10).

When the information that the investor has confirmed the contents of the prospectus has been transmitted, the server unit 1 calculates a provisional amount (a provisional contract amount) that is the estimated amount that the investor should pay at this point of time (step SD-11). This calculation can be carried out as the bid stock price×the bid stock number transmitted from the client unit 3. Then, the server unit 1 generates the Web data of the confirmation screen including the display of this provisional contract amount, and transmits this amount to the client unit 3 (step SD-12).

On the other hand, when it has been decided at step SD-9 that the prospectus data has not been downloaded, the server unit 1 decides that the investor does not satisfy the condition (document read condition) for carrying out the bid. When the information that the investor has not confirmed the contents of the prospectus has been transmitted, the server unit 1 also decides that the investor does not satisfy the condition (document read condition) for carrying out the bid. In these cases, the server unit 1 transmits the Web data of a predetermined error screen to the client unit 3 (step SD-13).

Then, the confirmation screen or the error screen is displayed on the monitor 36 of the client unit 3 (steps SD-14 and SD-15). FIG. 48 shows an example of a structure of this confirmation screen G16. As shown in FIG. 48, the screen G16 consists of a display area G16-1 of a provisional contract amount, a cancel button G16-2 for indicating the bid cancellation, and an indication button G16-3 for finally indicating the bid.

When the investor has selected the cancel button G16-2, the process proceeds to step SD-6 and can return to the bid screen G9 (step SD-16). In this case, the final indication of the bid is not transmitted to the server unit 1. Therefore, the investor can start the bid procedure from the beginning again.

When the investor has selected the indication button G16-3, the bid indication is transmitted to the server unit 1 (steps SD-17 and SD-18). Upon receiving this bid indication, the server unit 1 updates the bid information of the bid information DB 15 (steps SD-19 and SD-20). Specifically, the server unit 1 stores the bid stock price and the bid stock number or the bid total amount received at step SD-8, together with the investor ID of the bid investor, in relation to the issue ID of the issue enterprise of this bid.

The server unit 1 transmits to the client unit 3 the Web data of the bid reception screen that includes a message that the reception of the bid has been completed and a message that gives thanks to the investor for the utilization of the service (step SD-21). When this screen is displayed on the monitor 36 (steps SD-22 and SD-23), the investor can confirm that the own bid has been received. Thus, the bid completes.

In the above bid processing, it is also possible to decide other bid conditions according to the needs. For example, when the bid unit has been set, the server unit 1 can make a decision about whether the bid stock number transmitted from the investor is an integer times of the bid unit or not. It is possible to receive the bid as described above only when the bid stock number is an integer times of the bid unit, and to display an error screen on the monitor 36 showing that the bid is invalid when the bid stock number is not an integer times of the bid unit.

(Successful Bid Processing)

Figure 17:
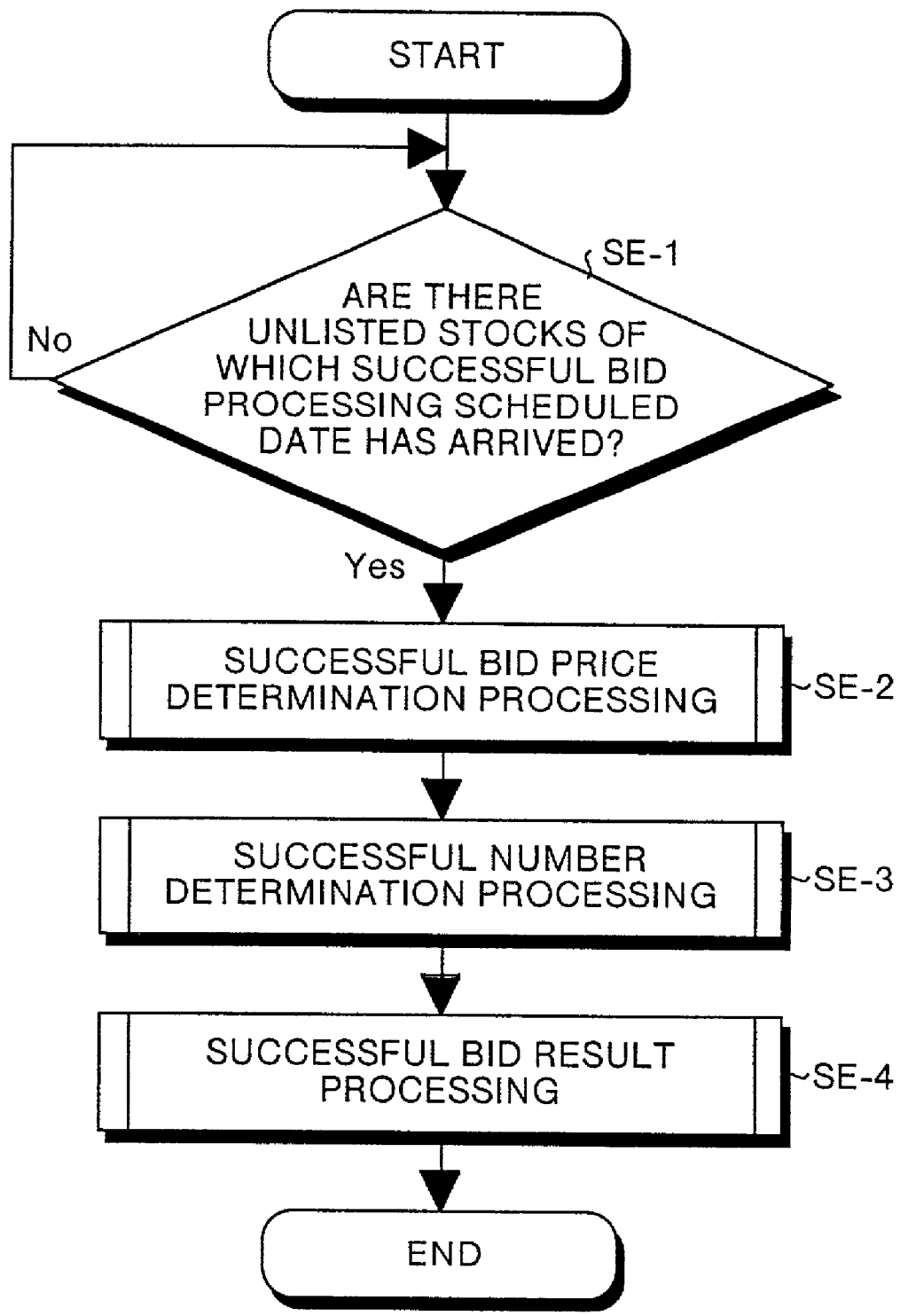
FIG. 17 is a flowchart of a successful bid processing.

A successful bid processing will be explained next. FIG. 17 shows a flowchart of this processing. In FIG. 17, the successful bid processing section 21h of the server unit 1 automatically refers to the successful bid processing scheduled date stored in the subscription information DB 12 at a predetermined time interval or at a predetermined time. Alternatively, the successful bid processing section 21h refers to this successful bid processing scheduled date when there has been a predetermined indication from the manager. At the same time, the successful bid processing section 21h refers to the current date obtained based on a predetermined method, and decides whether there are unlisted stocks of which successful bid processing scheduled date has arrived or not (step SE-1).

When there are unlisted stocks of which successful bid processing scheduled date has arrived, the successful bid processing section 21h reads the subscription information for which the successful bid processing scheduled date has arrived, from the subscription information DB 12. At the same time, the successful bid processing section 21h reads the bid information corresponding to this, from the bid information DB 15. Then, the successful bid stock price determination processing section 21j carries out a successful bid stock price determination processing using the subscription information and the bid information, thereby to determine a successful bid stock price (step SE-2). The successful bid stock number determination processing section 21k carries out a successful bid stock number determination processing, thereby to determine a subscription stock number to each investor (step SE-3). Thereafter, the successful bid result processing section 21m carries out a successful bid result processing, and posts a result of the successful bid. Then, the successful bid processing finishes (step SE-4).

First, the successful bid stock price determination processing and the successful bid stock number determination processing will be explained. Before explaining the detailed contents of the successful bid stock price determination processing and the successful bid stock number determination processing, the basic concepts and advantages of these processing will be explained.

As described above, the issue enterprise can select either the stock number issuing system or the total amount issuing system as the subscription condition. The investor can select either the stock number bidding system or the total amount bidding system as the bidding system.

Depending on the combination of the subscription condition and the bidding system, the successful bid stock price determination processing and the successful bid stock number determination processing are different respectively. In other words, the successful bid processing section 21h identifies the kind of the issuing system and the kind of the bidding system respectively based on the subscription condition and the bid information that have been read, and carries out the corresponding processing.

(Basic Concept of Successful Bid Processing—Stock Number Issuing System/Stock Number Bidding System)

First, the successful bid processing will be explained for the case where the stock number issuing system has been selected as the subscription condition and the stock number bidding system has been selected as the bidding system. First, the basic concept of this processing will be explained. Exceptional processing that can occur at the time of the successful bid processing will be explained later. (Basic concept of successful bid processing—stock number issuing system/stock number bidding system—successful bid stock price determination processing)

Figure 18:
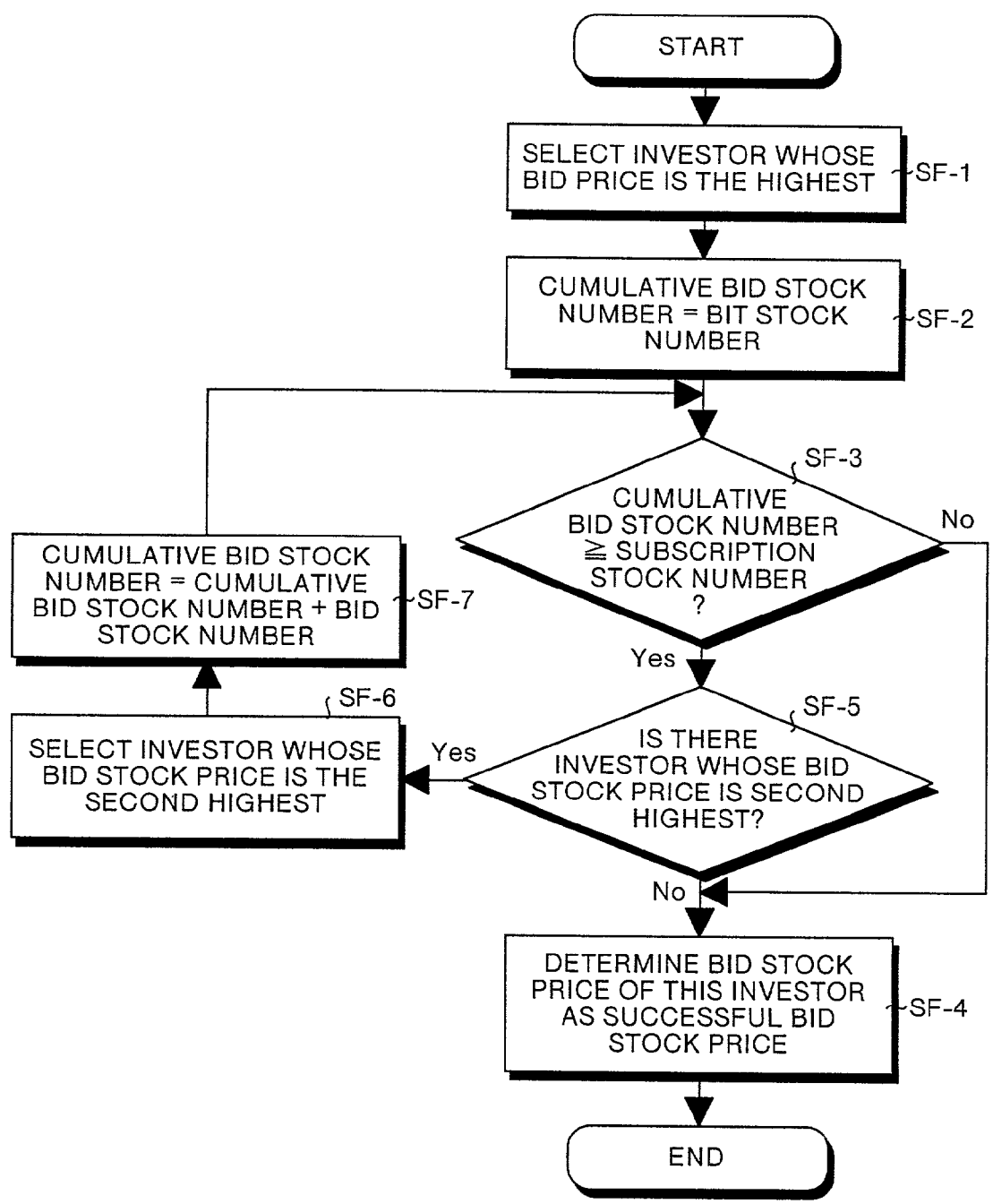
FIG. 18 is a flowchart of a basic concept of a successful bid stock price determination processing.

FIG. 18 shows a flowchart of the basic concept of the successful bid stock price determination processing. As shown in FIG. 18, in the successful bid stock price determination processing, an investor is selected who has bid a highest bid stock price among bid stock prices presented by investors (step SF-1). The bid stock number bid by this investor is set as a cumulative stock number (step SF-2) Then, a decision is made about whether this cumulative stock number has reached the subscription stock number or not (step SF-3). When the cumulative stock number has reached the subscription stock number, the bid stock price bid by this selected investor is determined as the same successful bid stock price to all the successful bidders (step SF-4).

On the other hand, when it has been decided at step SF-3 that the cumulative stock number has not reached the subscription stock number (step SF-5), an investor who has bid a next highest bid stock price is selected (step SF-6) The bid stock number bid by this investor is added to the cumulative stock number (step SF-7). Thereafter, the selection of an investor and the accumulation of the bid stock number are repeated until when the cumulative stock number reaches the subscription stock number. Then, the bid stock price bid by the investor selected at the time when the cumulative stock number reached the subscription stock number is determined as the same successful bid stock price to all the successful bidders (step SF-4 again). Then, the successful bid stock price determination processing finishes.

When the number of investors or the bid number is small, there is a case where the cumulative stock number does not reach the subscription stock number, even if all the bid numbers are accumulated. In this case, at a point of time when all the bid numbers are accumulated, the bid stock price bid by an investor selected last is determined as the same successful bid stock price to all the successful bidders. Then, the successful bid stock price determination processing finishes.

(Basic Concept of Successful Bid Processing—Stock Number Issuing System/Stock Number Bidding System—Successful Bid Stock Number Determination Processing)

Figure 19:
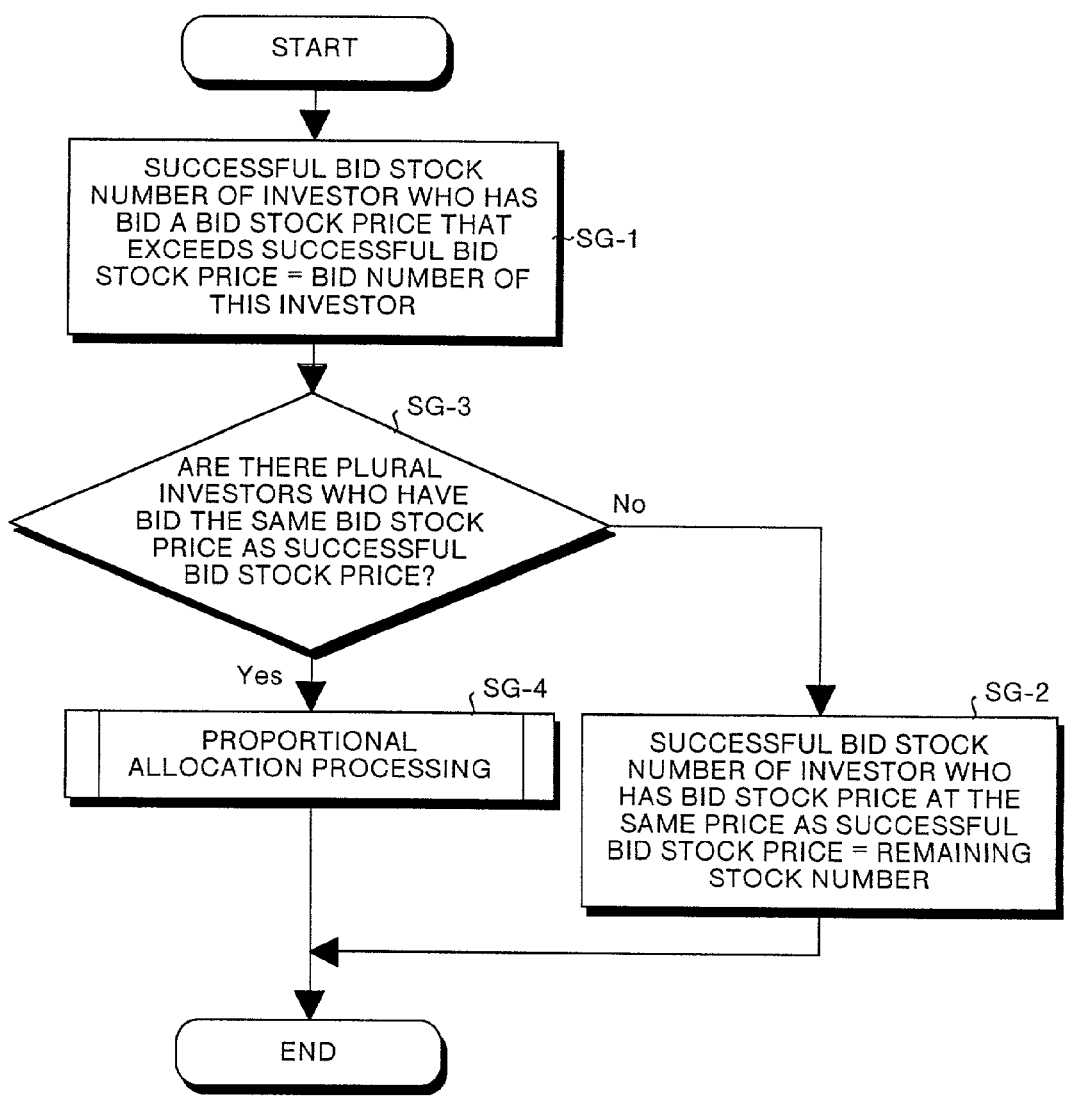
FIG. 19 is a flowchart of a basic concept of a successful bid stock number determination processing.

Next, the successful bid stock number determination processing is carried out. FIG. 19 shows a flowchart of the basic concept of this successful bid stock number determination processing. As shown in FIG. 19, in the successful bid stock number determination processing, the successful bid stock number of bidders who have bid a bid stock price equal to or higher than the successful bid stock price is determined as the bid stock number bid by these bidders (step SG-1). Particularly, when the cumulative stock number of the bid stock numbers of the bidders who have presented the bid stock price equal to or higher than the successful bid stock price has not exceeded the subscription stock number, the successful bid stock numbers of all the successful bidders can be set as the bid stock number. The successful bid stock number determination processing finishes at this step SG-1.

On the other hand, when the cumulative stock number of the bid stock numbers of the bidders who have presented the bid stock price equal to or higher than the successful bid stock price has not exceeded the subscription stock number, the following steps are necessary.

First, the successful bid stock number of the bidder who has bid the same bid stock price as the successful bid stock price is determined as a remaining stock number (remaining stock number) that has not been determined as the successful bid stock number at this point of time (step SG-2).

However, in this case, when there are a plurality of bidders who have bid the same bid stock price (step SG-3), the successful bid stock numbers of these bidders are determined based on the proportional allocation processing (step SG-4).

Figure 20:
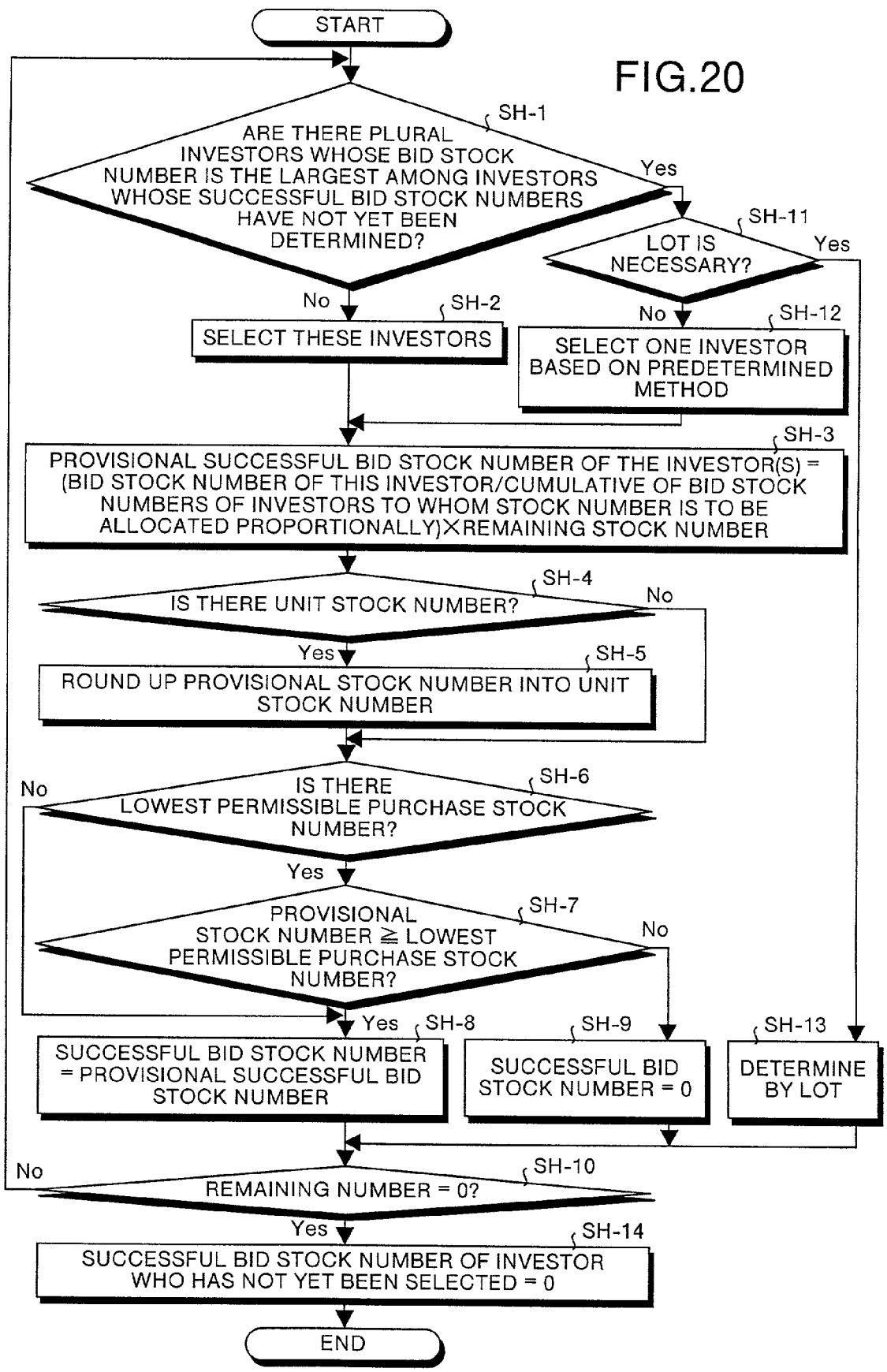
FIG. 20 is a flowchart of a basic concept of a proportional allocation processing.

The proportional allocation processing is the processing for allocating the successful bid stock numbers to the bidders by allocating the remaining stock number at this time according to the bid stock numbers of these bidders. FIG. 20 shows a flowchart of the basic concept of this proportional allocation processing. As shown in FIG. 20, in the proportional allocation processing, it is decided whether there are a plurality of investors whose bid stock number is largest among investors to whom the successful bid stock numbers are to be allocated proportionally (step SH-1). In other words, it is decided whether there are a plurality of investors who have bid the same bid stock number or not. When there are not a plurality of investors (that is, when there is only one investor), this one investor is selected as a basis of calculation (step SH-2). Then, a provisional successful bid stock number (provisional successful bid stock number) of this investor is calculated (step SH-3). This calculation is carried out as the provisional successful bid stock number=(the successful bid stock number of the investor/the total of the bid stock numbers of the investors to whom the successful bid stock numbers are to be allocated proportionally)×the remaining stock number.

Thereafter, it is decided whether there is a unit stock number as the subscription condition or not (step SH-4). When there is a unit stock number, the provisional stock number is rounded up or down into the unit stock number (step SH-5).

Next, it is decided whether the investor as the basis of the calculation has set a lowest permissible purchase number or not (step SH-6). When the investor has set a lowest permissible purchase number, it is decided whether the provisional successful bid stock number is equal to or above the lowest permissible purchase number or not (step SH-7).

When the investor has not set a lowest permissible purchase number, or when the provisional successful bid stock number is equal to or above the lowest permissible purchase number even when the investor has set a lowest permissible purchase number, the provisional successful bid stock number is determined as the successful bid stock number of this investor (step SH-8). On the other hand, when the investor has set a lowest permissible purchase number and when the provisional successful bid stock number is not equal to or above the lowest permissible purchase number, it is not possible to allocate the successful bid stock number to this investor. Therefore, the successful bid stock number is determined as 0 (steps SH-9). Thereafter, this step is repeated until when the remaining stock number becomes 0 (step SH-10).

When it has been decided at step SH1 that there are a plurality of investors whose bid stock number is largest, it is decided whether it is necessary to carry out a lot or not (step SH-11). It is necessary to carry out a lot when there are a plurality of investors whose bid conditions are the same so that it is not possible to give priority to them. Specifically, this is the case where the investors bid the same bid stock number, and further the lowest permissible purchase stock numbers are the same.

When it is not necessary to carry out a lot, one investor is selected according to a predetermined method (for example, a random selection) (step SH-12). This investor is selected, and the process proceeds to step SH-3. On the other hand, when it is necessary to carry out a lot, one investor is selected according to a predetermined method (step SH-13). The successful bid stock number of this investor is determined as the remaining stock number at this point of time.

For this lot method, it is possible to employ an optional method capable of selecting one investor. For example, a random lot may be used. The lot does not need to be carried out automatically. For example, a lot meeting may be opened for carrying out a manual lot based on the participation of investors at a later date. In this case, the allotted stock number of the investors for the lot can be suspended and the proportional allocation processing can be finished.

Last, the successful bid stock numbers of all the investors not selected by this processing are determined as 0 (step SH-14). The proportional allocation processing finishes there, and the successful bid stock number determination processing in FIG. 17 finishes.

(Basic Concept of Successful Bid Processing—Stock Number Issuing System/Stock Number Bidding System—Case 1)

The successful bid processing that is carried out according to the above-described concept will be explained using detailed numerical data for cases 1 to 6.

First, the case 1 will be explained. FIG. 26 shows numerical data of this case 1. As shown in FIG. 26 (*a*), in the case 1, the subscription condition is that "the issuing system the stock number issuing system", "the subscription stock number=1,000 stocks", and "the unit stock number=none".

As shown in FIG. 26 (*b*), investors A to D have bid. The bid condition of the investor A is "the bid stock price=500,000 yen" and "the bid stock number=700 stocks". The bid condition of the investor B is "the bid stock price=400,000 yen" and "the bid stock number=200 stocks". The bid condition of the investor C is "the bid stock price=300,000 yen" and "the bid stock number=100 stocks". The bid condition of the investor D is "the bid stock price=200,000 yen" and "the bid stock number=500 stocks". All these investors select "the bidding system=the stock number bidding system", and "the lowest permissible purchase stock number"=none".

First, in the successful bid stock price determination processing, the investor A who presents the highest bid stock price 500,000 yen is selected, as shown in FIG. 6 (*c*). Then, the cumulative bid stock number is calculated as the cumulative bid stock number=the cumulative bid stock number 0 stock at this point of time+the bid stock number 700 stocks of the selected investor A=700 stocks. At this point of time, the cumulative bid stock number of 700 stocks do not reach the subscription stock number 1,000. Therefore, a next investor is selected. Namely, the investor B who presents 400,000 yen as the next highest bid price is selected. Then, the cumulative bid stock number is calculated as the cumulative bid stock number=700 stocks+the bid stock number 200 stocks of the investor B=900 stocks.

At this point of time, the cumulative bid stock number of 900 stocks do not yet reach the subscription stock number 1,000. Therefore, the next investor C is selected as shown in FIG. 26 (*d*). Then, the cumulative bid stock number is calculated as the cumulative bid stock number=900 stocks+the bid stock number 100 stocks of the investor C=1,000 stocks. The bid stock price 300,000 yen of the investor C selected at this point of time is determined as the successful bid stock price. Then, the successful bid stock price determination processing finishes.

Further, in the successful bid stock number determination processing, as shown in FIG. 26 (*e*), the successful bid stock numbers of the bidders A and B who first bid the bid stock prices 500,000 yen and 400,000 yen respectively that are higher than the successful bid stock price 300,000 yen are determined as the bid stock numbers 700 stocks and 200 stocks of the bidders A and B respectively. There is only one investor C as the investor who bid the same bid stock price 300,000 yen as the successful bid stock price 300,000 yen. Therefore, the successful bid stock number of this investor C is determined as the remaining stock number 100 stocks at this point of time. Then, the successful bid stock price determination processing finishes.

(Basic Concept of Successful Bid Processing—Stock Number Issuing System/Stock Number Bidding System—Case 2)

Next, the case 2 will be explained. The case 2 assumes that the cumulative bid stock number calculated last exceeds the subscription stock number, unlike the case 1, in the successful bid stock price determination processing.

FIG. 27 shows numerical data of this case 2. As shown in FIG. 27 (*a*), the subscription condition and the bid condition of the case 2 are substantially the same as those of the case 1. However, the case 2 is different from the case 1 in that the bid condition of the investor C is "the bid stock price=300,000 yen" and "300 stocks", and the bid condition of the investor D is "the bid stock price 300,000 yen" and "200 stocks".

First, in the successful bid stock price determination processing, the investor A and the investor B are determined sequentially as shown in FIG. 27 (*c*) and FIG. 27(*d*) in a similar manner to that of the case 1. Then, the cumulative bid stock number is calculated as the cumulative bid stock number=the bid stock number 700 stocks of the investor A+the bid stock number 200 stocks of the investor B=900 stocks. Thereafter, the investors C and D are selected. Then, the cumulative bid stock number is calculated as the cumulative bid stock number=900 stocks+the bid stock number 300 stocks of the investor C+the bid stock number 200 stocks of the investor D=1,400 stocks. At this point of time, the cumulative bid stock number 1,400 stocks already reaches the subscription stock number 1,000 stocks. Therefore, the bid stock price 300,000 yen of the investors C and D selected at this point time is determined as the successful bid stock price. Then, the successful bid stock price determination processing finishes.

In the successful bid stock number determination processing, the successful bid stock numbers of the investors A and B are determined as 700 stocks and 200 stocks respectively as shown in FIG. 27 (*e*) in a similar manner to that of the case 1. Next, there are a plurality of investors C and D as the investors who bid the same bid stock price 300,000 yen as the successful bid stock number 300,000 yen. Therefore, the remaining stock number of 100 stocks are proportionally allocated to the investors C and D according to the respective bid stock numbers. In this processing, the investor C whose bid stock number is large is selected for the proportional distribution calculation. The calculation is carried out as the provisional successful bid stock number of the investor C=(the bid stock number 300 stocks of the investor C/the total 500 stocks of the bid stock numbers of the investors C and D as the investors for the proportional allocation)×the remaining stock number 100 stocks=60 stocks. In the case 2, there is no unit stock number. Further, the investor C has not set a lowest permissible purchase stock number. Therefore, the provisional successful bid stock number of 60 stocks are determined as the successful bid stock number of the investor C. As there are 40 stocks as the remaining stock number, the investor D is selected, and the processing at steps SH-2 to SH-8 is carried out. Then, the successful bid stock number of the investor D is determined as 40 stocks. As a result, the remaining stock number becomes 0. Then, the proportional allocation processing finishes, and the successful bid stock number determination processing finishes.

(Basic Concept of Successful Bid Processing—Stock Number Issuing System/Stock Number Bidding System—Case 3)

Next, the case 3 will be explained. The case 3 assumes that a unit stock number and a lowest permissible purchase stock number have been set.

FIG. 28 shows numerical data of this case 3. As shown in FIG. 28, the subscription condition of the case 2 is substantially the same as that of the case 2. However, as the subscription condition, "the unit stock number=100 stocks" has been set. Further, the investors C and D have set "the lowest permissible purchase stock number=100 stocks".

First, in the successful bid stock price determination processing, the successful bid stock price=300,000 yen is determined as shown in FIG. 28 (c) and FIG. 28 (d), in a similar manner to that of the case 2.

Further, in the successful bid stock number determination processing, stock numbers 700 stocks and 200 stocks are sequentially allocated to the investors A and B, in a similar manner to that of the case 2. Thereafter, the stock number of 60 stocks are determined for the investor C in the proportional allocation processing. This stock number of 60 stocks do not satisfy the unit stock number 100 stocks. Therefore, this stock number cannot be allocated straight to the investor C. Then, at step SH-5, this stock number of 60 stocks are rounded up to the unit stock number of 100 stocks. The 100 stocks are not less than the lowest permissible purchase stock number 100 stocks of the investor C. Therefore, this is determined as the successful bid stock number of the investor C. There is no more remaining stock number. Therefore, the proportional allocation processing finishes, and the successful bid stock number determination processing finishes.

(Basic Concept of Successful Bid Processing—Stock Number Issuing System/Stock Number Bidding System—Case 4)

Next, the case 4 will be explained. The case 4 assumes that a lot is carried out.

FIG. 29 shows numerical data of this case 4. As shown in FIG. 29 (a), the subscription condition of the case 4 is "the unit stock number=100 stocks". Further, as shown in FIG. 29 (b), the investors A to E have bid. The bid condition of the investor A is "the bid stock price=500,000 yen" and "the bid stock number=500 stocks". The bid condition of the investor B is "the bid stock price=400,000 yen" and "the bid stock number=300 stocks". The bid condition of the investor C is "the bid stock price=300,000 yen" and "the bid stock number=300 stocks". The bid conditions of the investors D and E are "the bid stock price=300,000 yen" and "the bid stock number=100 stocks" respectively. All these investors select "the lowest permissible purchase stock number"=none".

First, in the successful bid stock price determination processing, the successful bid stock price=300,000 yen is determined as shown in FIG. 29 (c) and FIG. 29 (d), in a similar manner to that of the case 3.

Then, in the successful bid stock number determination processing, the stock numbers 500 stocks and 300 stocks are allocated sequentially to the investors A and B in a similar manner to that of the case 3. In the proportional allocation processing, the successful bid stock number of the investor C is determined as 100 stocks. Thereafter, the conditions of the bid stock number and the lowest permissible purchase stock number are the same for the investors C and D to whom the successful bid stock numbers are to be allocated proportionally. Therefore, it is necessary to carry out a lot, and the process proceeds from step SH-11 to SH-13. Either the investor D or E is selected by lot. The successful bid stock number of the selected investor is determined as the remaining stock number of 100 stocks. There is no more remaining stock number. Therefore, the proportional allocation processing finishes, and the successful bid stock number determination processing finishes.

(Basic Concept of Successful Bid Processing—Stock Number Issuing System/Stock Number Bidding System—Case 5)

Next, the case 5 will be explained. The case 5 assumes that among a plurality of investors who present the same bid stock price, the successful bid stock number of the investor having a large bid stock number is smaller than the successful bid stock number of the investor having a small bid stock number.

FIG. 30 shows numerical data of this case 5. As shown in FIG. 30 (a), the subscription condition of the case 5 is substantially the same as that of the case 4. However, as the subscription condition, "the unit stock number=100 stocks" has been set. Further, the investor C has set "the lowest permissible purchase stock number=200 stocks".

First, in the successful bid stock price determination processing, the successful bid stock price=300,000 yen is determined as shown in FIG. 30 (c) and FIG. 28 (d), in a similar manner to that of the case 4.

Further, in the successful bid stock number determination processing, stock numbers 500 stocks and 300 stocks are sequentially allocated to the investors A and B, in a similar manner to that of the case 4. Thereafter, the stock number of 120 stocks are determined for the investor C in the proportional allocation processing. However, the stock number of 120 stocks do not coincide with the unit stock number 100 stocks. Therefore, at step SH-5, this stock number is rounded down to the unit stock number of 100 stocks. The 100 stocks are not equal to or higher than the lowest permissible purchase stock number 200 stocks of the investor C. Therefore, at step SH-9, the successful bid stock number of this investor C is determined as 0 stock. Thereafter, the processing at steps SH-2 to SH-8 is carried out. At these steps, the remaining stock number of 200 stocks are allocated to the investors D and E so that 100 stocks become the successful bid stock number of each investor. Thus, the proportional allocation processing finishes, and the successful bid stock number determination processing finishes.

(Basic Concept of Successful Bid Processing—Stock Number Issuing System/Stock Number Bidding System—Case 6)

Next, the case 6 will be explained. The case 6 assumes that the successful bid stock numbers of three investors are determined by lot.

FIG. 31 shows numerical data of this case 5. As shown in FIG. 31 (a) and FIG. 31 (b), the subscription condition and the bid condition of the case 5 are substantially the same as those of the case 4. However, the bid condition of the investor B is "the bid stock price=400,000 yen" and "the bid stock number=400 stocks". The bid condition of the investor C is "the bid stock price=300,000 yen" and "the bid stock number=100 stocks".

First, in the successful bid stock price determination processing, the successful bid stock price=300,000 yen is determined as shown in FIG. 31 (c) and FIG. 29 (d), in a similar manner to that of the case 4.

Then, in the successful bid stock number determination processing, the stock numbers 500 stocks and 400 stocks are allocated sequentially to the investors A and B in a similar manner to that of the case 4. Thereafter, the successful bid stock numbers to the investors C to E are determined in the proportional allocation processing. The conditions of the bid stock number and the lowest permissible purchase stock number are the same for the investors C and E to whom the successful bid stock numbers are to be allocated proportionally. Therefore, it is necessary to carry out a lot. At step SH-13, one of the investors C to E is selected by lot. The successful bid stock number of the selected investor is determined as the remaining stock number of 100 stocks. There is no more remaining stock number. Therefore, the proportional allocation processing finishes, and the successful bid stock number determination processing finishes.

The concept of the successful bid processing for the case where the stock number issuing system and the stock number bidding system are selected has been explained above based on detailed numerical data. These systems have the following advantages.

When investors have bid, a successful bid price and successful bid stock numbers are determined automatically according to a constant rule fair to the investors. Therefore, the stock price of the unlisted stocks is determined based on only the bid stock prices and the bid stock numbers bid by the investors. As a result, it is possible to form the stock price objectively and rationally by eliminating the arbitrariness of a security company.

(Basic Concept of Successful Bid Processing—Total Amount Bidding System)

Next, the basic concept of the successful bid processing when the total amount bidding system has been selected as the bidding system will be explained. In order to facilitate the comparison with the above examples, the stock number issuing system will be used as the issuing system.

In this total amount bidding system, basically the calculation of the successful bid stock price and the successful bid stock number is carried out in a similar manner to that of the stock number issuing system. However, this total amount bidding system is basically different from the stock number issuing system in the following points.

First, in the total amount bidding system, investors bid both a bid stock price and a bid total amount. Therefore, the bid stock number of each investor is obtained by calculating the bid total amount/the bid stock price.

Further, in the bid stock price determination processing, investors are selected sequentially from an investor of a high bid stock price to an investor of a low bid stock price. For calculating the cumulative stock number of bid stock numbers, the bid stock numbers so far included in the calculation of the cumulative stock number is recalculated according to a lowered bid stock price.

(Basic Concept of Successful Bid Processing—Total Amount Bidding System—Case 7)

The successful bid processing that is carried out according to the above-described concept will be explained using detailed numerical data as case 7. FIG. 32 shows numerical data of this case 7. As shown in FIG. 32 (*a*), in the case 7, the subscription condition is that "the issuing system=the stock number issuing system", "the subscription stock number=1,000 stocks", and "the unit stock number=none". As shown in FIG. 32 (*b*), investors A to C have bid. The bid condition of the investor A is "the bid stock price=500,000 yen" and "the bid total amount=150,000,000 yen". The bid condition of the investor B is "the bid stock price=400,000 yen" and "the bid total amount=120,000,000 yen". The bid condition of the investor C is "the bid stock price=300,000 yen" and "the bid total amount=90,000,000 yen". All these investors select "the bidding system=the total amount bidding system", and "the lowest permissible purchase stock number"=none".

First, in the successful bid stock price determination processing, the investor A who presents the highest bid stock price is selected as shown in FIG. 32 (*c*), in a similar manner to that of the stock number bidding system. Then, the cumulative bid stock number=300 stocks is calculated. As explained, for investors who have selected the total amount bidding system, the bid stock number is calculated provisionally based on the bid total amount and the bid stock price like the bid total amount 150,000,000/the bid stock price 500,000. The cumulative bid stock number of 300 stocks do not reach the subscription stock number of 1,000 stocks. Therefore, the investor B is selected next, and the cumulative bid stock number is calculated.

In this cumulative bid stock number calculation, the bid stock number of the investor A who has been selected before the investor B is calculated again, using the bid stock price 400,000 of the investor B who has been newly selected, as shown in FIG. 32 (*d*). This recalculation is carried out as (the bid total amount 150,000,000 yen of the investor A/the bid stock price 400,000 yen of the investor B newly selected) =375 stocks. In other words, when the investor B has been newly selected, the bid stock price becomes lower. By this lowered portion, the bid stock number of the investor A selected before increases.

Then, the cumulative bid stock number is calculated using the recalculated bid stock number 375 stocks and the bid stock number 300 of the investor B. In other words, the cumulative bid stock number=375 stocks+300 stocks=675 stocks. In this case, the 675 stocks do not yet reach the subscription stock number 1,000 stocks. Therefore, the investor C is selected, and the cumulative bid stock number is calculated in a similar manner as shown in FIG. 32 (*e*). The cumulative bid stock number becomes 500 stocks+400 stocks+300 stocks=1,200 stocks. This number has reached the subscription stock number 1,000 stocks. Therefore, the successful bid stock price is determined as 300,000 yen. Then, the successful bid stock price determination processing finishes.

The successful bid stock number determination processing is carried out exactly in the similar manner to that of the stock number bidding system, using the successful bid stock numbers of the investors that have been accumulated at the time of finishing the successful bid stock price determination processing. In this case 7, the successful bid stock numbers of the investors A to C are determined as 500 stocks, 400 stocks, and 100 stocks respectively. Then, the successful bid stock number determination processing finishes.

The basic concept of the successful bid processing when the total amount bidding system is selected has been explained above based on detailed numerical values. This system has the following advantages.

First, when the bid is carried out based on the stock number bidding system, for most of the investors, the successful bid stock price becomes lower than their bid stock prices. Therefore, there is a case that the actual investment amount becomes lower than the scheduled investment amount. Alternatively, for an investor who has been successful at the bid price, when there are a plurality of investors who bid at the same price, the remaining stock number is allocated proportionally. Therefore, the successful bid stock number of this investor becomes smaller than the bid stock number. This means that a small amount is invested to a large number of stock items. In an extreme case, there is a case where the successful bid stock number becomes one stock. Therefore, for the investors, this system is inconvenient in the business procedure, and it is necessary to review the investment plan.

On the other hand, when the total amount bidding system is employed, the bid stock number of the investor who has bid at a high bid stock price increases along the fall of the successful bid stock price. Therefore, the investor who has bid at a high bid price can purchase the stocks of an unlisted enterprise under a more advantageous condition. Further, when the total amount bidding system is employed, there is a tendency that the successful bid stock number of the investor whose bid total amount is high becomes large. Further, the successful bid stock price tends to be set at a high price. Therefore, for the issue enterprise, it is possible to suppress an increase in the number of shareholders, and it becomes easy to raise more funds.

(Basic Concept of Successful Bid Processing—total amount Issuing system)

Next, the basic concept of the successful bid processing when the total amount issuing system has been selected as the subscription condition will be explained. In order to facilitate the comparison with the above examples, the stock number issuing system will be used as the issuing system.

In this total amount issuing system, it is possible to explain by reading the "stock number" in the explanation of the stock number issuing system as the "stock price" and reading the "subscription stock number" as the "subscription total amount". In other words, in the total amount issuing system, the accumulation of the bid stock price is obtained in place of the bid stock number. The bid stock price at the point of time when the accumulation of the bid stock price has reached the subscription total amount is determined as a uniform successful bid stock price to all the successful bidders.

(Basic Concept of Successful Bid Processing—Total Amount Issuing System—Case 8)

The successful bid processing that is carried out according to the above-described concept will be explained using detailed numerical data as case 8. FIG. 33 shows numerical data of this case 8. As shown in FIG. 33 (a), in the case 8, the subscription condition is that "the issuing system=the total amount issuing system", "the subscription total amount=100,000,000 yen", and "the unit stock number=none". As shown in FIG. 33(b), investors A to C have bid. The bid condition of the investor A is "the bid stock price=200,000 yen" and "the bid stock number=300 stocks". The bid condition of the investor B is "the bid stock price=150,000 yen" and "the bid stock number=500 stocks". The bid condition of the investor C is "the bid stock price=150,000 yen" and "the bid stock number=300 stocks". All these investors select "the bidding system=the stock number bidding system", and "the lowest permissible purchase stock number"=none".

First, in the successful bid stock price determination processing, the investor A who presents the highest bid stock price is selected as shown in FIG. 33 (c). Then, the cumulative bid total amount is calculated as the cumulative bid total amount=the bid total amount 60,000,000 yen of the investor A. At this time, for the investor who employs the stock number bidding system, the bid total amount=the bid stock price×the bid stock number is calculated. However, for the investor who employs the total amount bidding system, the bid total amount can be used straight as it is.

At this point of time, the cumulative bid total amount 60,000,000 yen has not yet reached the subscription total amount 100,000,000. Therefore, as shown in FIG. 33 (d), the investor B is selected, and the calculation of the cumulative amount is carried out in a similar manner. At this point of time, the cumulative amount=60,000,000 yen+75,000,000 yen=135,000,000 yen, which satisfies the subscription total amount 100,000,000 yen. Therefore, 150,000 yen that has been bid by the investor B is determined as the successful bid stock price. Then, the successful bid stock price determination processing finishes.

Next, in the successful bid stock number determination processing, the successful bid stock number of the investor A who presented the highest bid stock price is determined as 300 stocks. Then, for the investors B and C who bid the same stock price as the successful bid stock price, remaining stock number is allocated proportionally according to the bid stock numbers. However, the remaining stock number in this case is the stock number that corresponds to the amount (remaining amount) obtained by subtracting the bid total amount of the investor A whose successful bid stock number has been determined so far, from the subscription total amount. Then, the successful bid stock number determination processing finishes.

In this case, the remaining amount=the subscription total amount 100,000,000 yen−the bid total amount 60,000,000 yen of the investor A=40,000,000 yen. Therefore, the remaining stock number=the remaining amount 40,000,000 yen/the successful bid stock price 150,000 yen≈266 stocks. As explained above, in the total amount issuing system, the remaining total amount is divided by the successful bid stock price, thereby to obtain the successful bid stock number. Therefore, the successful bid stock number of the investor B=266 stocks×(500/(500+300))≈166 stocks, and the successful bid stock number of the investor C=266 stocks×(300/(500+300))≈100 stocks.

In this case, the cumulative amount of the bid total amount becomes 99,900,000 yen. Therefore, the issue enterprise can raise funds at the amount approximately close to the desired subscription total amount 100,000,000 yen.

The basic concept of the successful bid processing when the total amount issuing system is selected has been explained above using detailed numerical values. This system has the following advantages.

First, when the stock number issuing system is employed, there is a case where the issue enterprise cannot raise funds as originally intended, when the successful bid price becomes low.

On the other hand, according to the total amount issuing system, a high successful bid price is obtained in total when there is a large successful bid stock number of the investor who bid at a high bid stock price. Therefore, it is possible to set a high successful bid stock price. Further, the total issue stock number becomes small when the successful bid stock price is high. Therefore, it is also possible to suppress an increase in the number of shareholders.

(Actual Successful Bid Processing)

The basic concept of the successful bid processing has been explained above. In the actual successful bid processing, there are investors who bid based on the stock number bidding system and investors who bid based on the total amount bidding system in the same bid of unlisted stocks (this bid is called a mixed bid). Further, there is also a case where it is necessary to carry out an exceptional processing that is not explained in the basic concept.

Taking the above points into account, the contents of the actual successful bid processing that is carried out in the present system will be explained based on examples of detailed numerical data.

(Actual Successful Bid Processing—Stock Number Issuing System/Mixed Bid)

Figure 21:
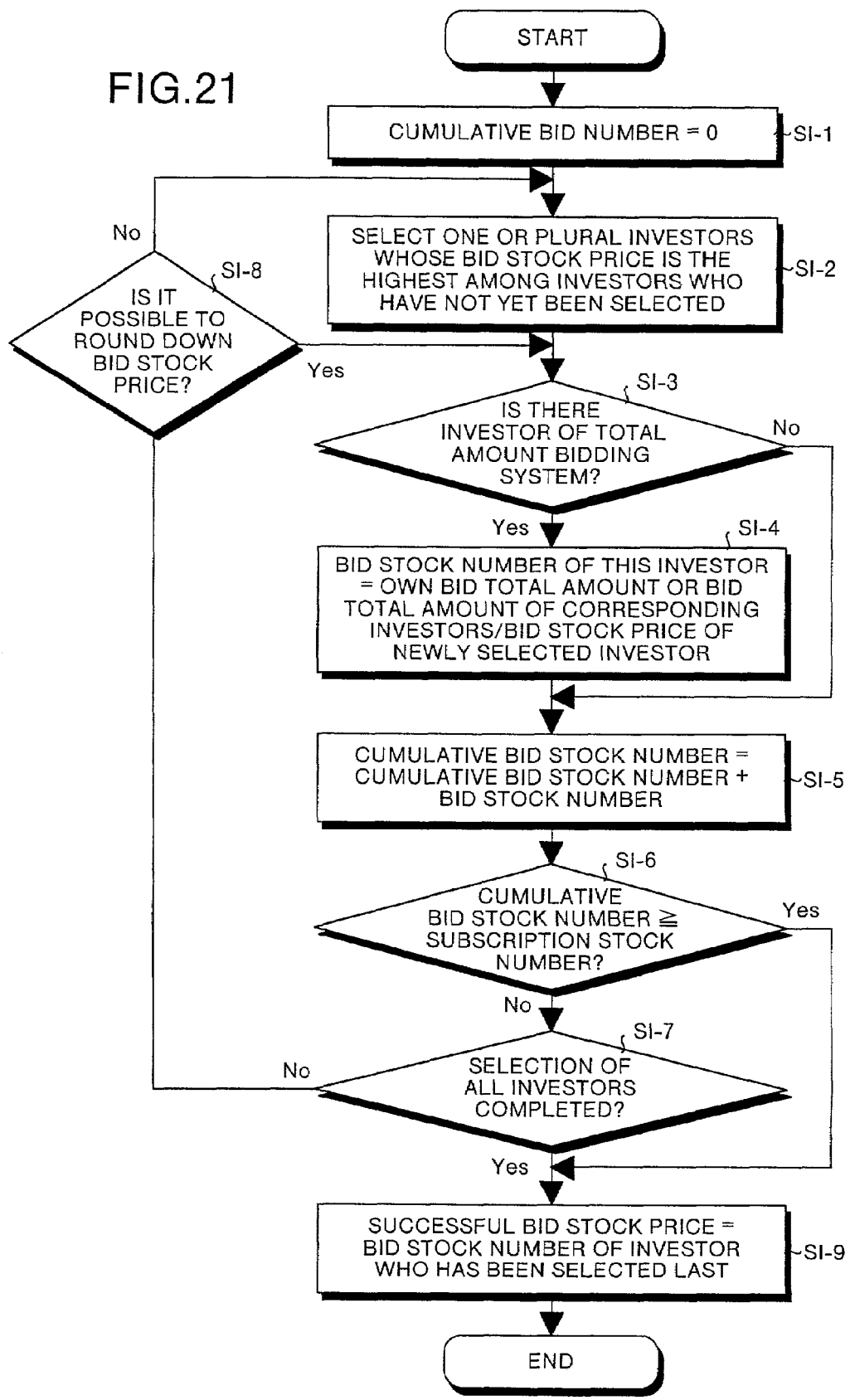
FIG. 21 is a flowchart of an actual successful bid stock price determination processing when a stock number issuing system has been selected.
Figure 22:
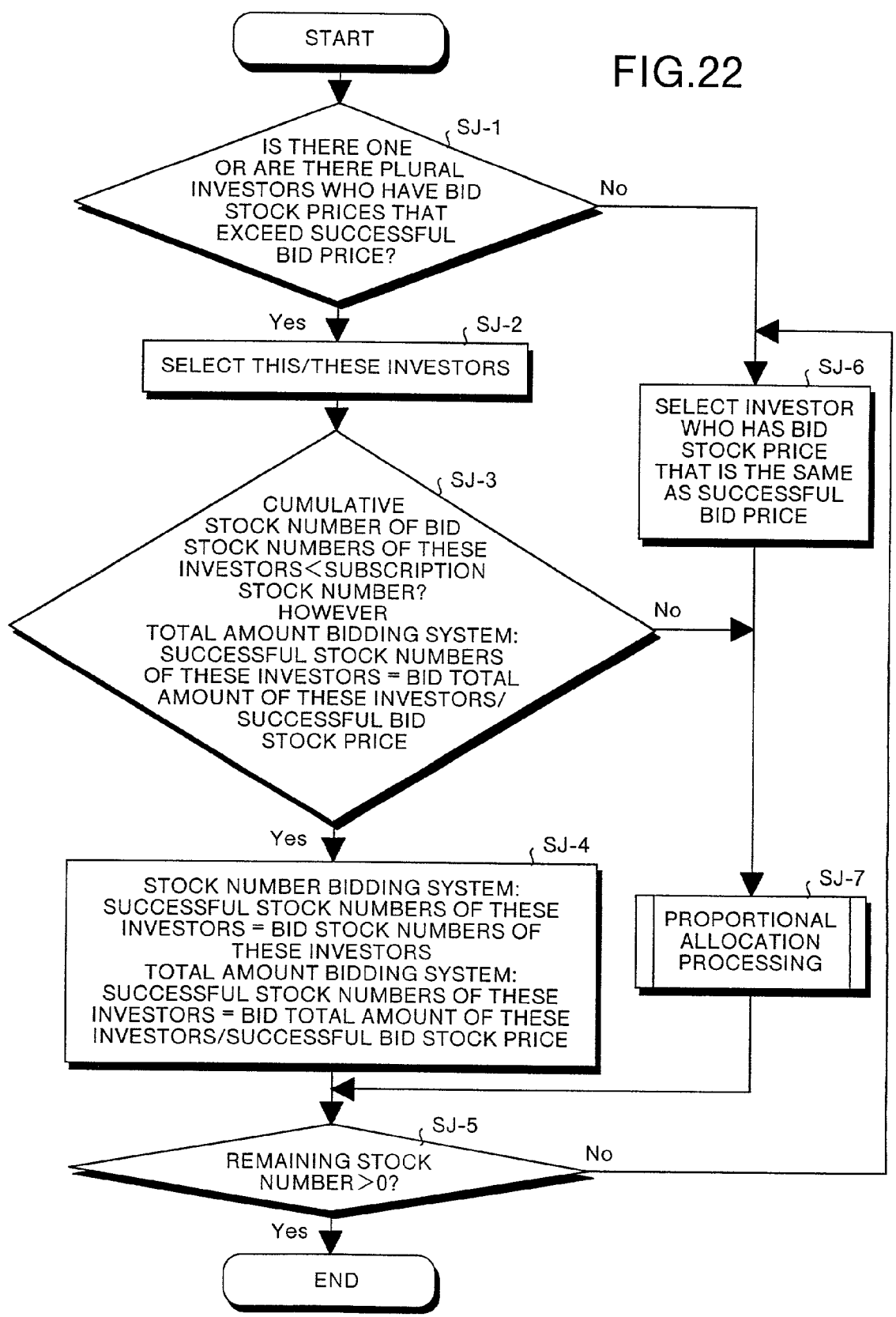
FIG. 22 is a flowchart of an actual successful bid stock number determination processing when the stock number issuing system has been selected.

First, the case that the issue enterprise has selected the stock number issuing system and a plurality of investors have carried out the mixed bid will be explained as cases 9 to 14. FIG. 21 shows a flowchart of the actual successful bid stock price determination processing, and FIG. 22 shows a flowchart of the actual successful bid stock number determination processing. The proportional allocation processing is similar to that of FIG. 20.

(Actual Successful Bid Processing—Stock Number Issuing System/Mixed Bid—Case 9)

First, the case 9 will be explained. FIG. 34 shows numerical data of this case 9. As shown in FIG. 34 (*a*), the subscription condition of the case 9 is that "the issuing system the stock number issuing system", "the subscription stock number=1,000 stocks", and "the unit stock number=100,000 yen".

As shown in FIG. 34 (*b*), investors A to C have bid.

The bid condition of the investor A is "the bidding system=the total amount bidding system", "the bid stock price=200,000 yen", and "the bid total amount=70,000,000 yen". The bid condition of the investor B is "the bidding system=the stock number bidding system", "the bid stock price=200,000 yen", and "the bid stock number=500 stocks". The bid condition of the investor C is "the bidding system=the stock number bidding system", "the bid stock price=150,000 yen", and "the bid stock number=300 stocks". All these investors select "the lowest permissible purchase stock number"=none".

First, in the successful bid stock price determination processing, the system is initialized based on the cumulative bid stock number=0 (steps SI-1). As shown in FIG. 34 (*c*), the investors A and B who present the highest bid stock price of 200,000 yen are selected (step SI-2). Then, the cumulative bid stock number is calculated as 850 stocks (steps SI-3 to SI-5). In this case, it is necessary to calculate a bid number for an investor of the total amount bidding system (step SI-4). However, in the case 9, this is not necessary. Therefore, the process proceeds from step SI-3 to SI-5.

At this point of time, the cumulative bid stock number of 850 stocks do not yet reach the subscription stock number 1,000 stocks (step SI-6). Further, the selection of all the investors A to C has not yet been finished (step SI-7). Then, the processing continues.

Before selecting the next investor, when it is possible to reduce the bid stock prices of the investors so far selected by a predetermined amount, this reduction is carried out, and the cumulative bid stock number is calculated again (step SI-8). In this case, the bid stock prices can be reduced by a predetermined amount when the bid stock prices after the reduction exceed the bid stock price of the investor to be selected next. This predetermined amount is an optional amount. In the present embodiment, this reduction is assumed as 10,000 yen.

In the case 9, the bid stock price after the reduction=200,000 yen−the predetermined amount 10,000 yen=190,000 yen. As this amount exceeds the bid stock price 150,000 yen of the investor C to be selected next, the process proceeds to step SI-3. Then, the cumulative bid stock number is calculated again at step SI-5. In this recalculation, the bid stock number of the investor A who has selected the total amount bidding system is calculated again using the bid stock price after the reduction (step SI-4). In other words, the bid stock number of the investor A=70,000,000 yen/190,000 yen≈368 stocks. Further, the bid stock number of the investor B who has selected the stock number bidding system is constant at 500 stocks. Therefore, the cumulative bid stock number=368 stocks+500 stocks=868 stocks.

Thereafter, the reduction is carried out until when the bid stock price becomes equal to 160,000 yen. Even at this point of time, the cumulative bid stock number does not reach 1,000 stocks. Therefore, at the next step SI8, the process proceeds to step SI-2, and the investor C is selected, and the cumulative bid stock number is calculated using the bid stock price=150,000 yen. Then, at the next steps SI-6, it is decided that the cumulative bid stock number of 1,266 stocks have reached the subscription stock number 1,000 stocks. Thus, the successful bid stock price=150,000 yen is determined (step SI-9). Then, the successful bid stock price determination processing finishes.

Next, in the successful bid stock number determination processing, there are the investors A and B who have bid at the price exceeding the successful bid stock price=150,000 yen (step SJ-1). Therefore, these investors A and B are selected (step SJ-2). It is decided whether the cumulative stock number of the investors A and B has exceeded the subscription stock number 1,000 stocks or not (step SJ-3).

In this case, the bid stock number of the investor A who has selected the total amount bidding system is determined as the own bid total amount 70,000,000 yen/the successful bid stock price 150,000 yen=≈466 stocks. In this case, the cumulative stock number is the bid stock number 466 stocks of the investor A+the bid stock number 500 stocks of the investor B=966 stocks. This stock number does not exceed the subscription stock number 1,000 stocks. Therefore, the successful bid stock numbers for the investors A and B are determined as shown in FIG. 34 (*f*) (step SJ-4).

At this point of time, the remaining stock number is 1,000 stocks−966 stocks=34 stocks. As there is the remaining stock number, the process proceeds to step SJ-6. At step SJ-6, the investor C who has bid at the same price as the successful bid stock price 150,000 yen is selected. A proportional allocation processing can be carried out for this investor C. In this case, the remaining stock number of 34 stocks is allocated to the investor C. Thus, the remaining stock number becomes 0. Then, the successful bid stock number determination processing finishes.

(Actual Successful Bid Processing—Stock Number Issuing System/Mixed Bid—Case 10)

Next, the case 10 will be explained. FIG. 35 shows numerical data of this case 10. As shown in FIG. 35 (*a*), in the case 10, the subscription condition and the bid condition are substantially the same as those of the case 9. However, the case 10 is different from the case 9 in that the investor B bids "the bid stock price=200,000 yen" and "the bid stock number=600 stocks".

First, in the successful bid stock price determination processing, as shown in FIG. 35 (*e*), the cumulative bid stock number 1,011 reaches the subscription stock number 1,000 stocks at a point of time when the successful bid stock price is lowered to 170,000 yen at step SI-8. Therefore, the successful bid stock price is determined as 170,000 yen. Then, the successful bid stock price determination processing finishes.

Next, in the successful bid stock number determination processing, the process proceeds from step SJ-6 to SJ-7, where a proportional allocation processing for the investors A and B is carried out. In this processing, the subscription stock number of 1,000 stocks are proportionally allocated based on the successful bid stock number 411 stocks of the investor A and the successful bid stock number 600 stocks of the investor B. As a result, the successful bid stock numbers are determined as shown in FIG. 35 (*f*). Then, the successful bid stock number determination processing finishes.

(Actual Successful Bid Processing—Stock Number Issuing System/Mixed Bid—Case 11)

Next, the case 11 will be explained. FIG. 36 shows numerical data of this case 11. As shown in FIG. 36 (*a*), the subscription condition and the bid condition of the case 11 are substantially the same as those of the case 10. However, the case 11 is different from the case 10 in that the investor C bids "the bid stock price=170,000 yen" and "the bid stock number=300 stocks".

First, in the successful bid stock price determination processing, the investors A and B are selected at step SI-2 as shown in FIG. 36 (*c*). Then, the successful bid stock price is gradually lowered as shown in FIG. 36 (*d*). Thereafter, the investor C is selected at step SI-2 as shown in FIG. 36 (*e*) again. At step SI-6, it is decided that the cumulative bid stock number 1,311 has reached the subscription stock number 1,000 stocks. Therefore, the successful bid stock price is determined as 170,000 yen. Then, the successful bid stock price determination processing finishes.

Next, in the successful bid stock number determination processing, the successful bid stock numbers of the investors A and B are determined at step SJ-4 as shown in FIG. 36 (*f*). At this point of time, the remaining stock number becomes 0. Therefore, the successful bid stock number of the investor C becomes 0. Then, the successful bid stock number determination processing finishes.

(Actual Successful Bid Processing—Stock Number Issuing System/Mixed Bid—Case 12)

Next, the case 12 will be explained. FIG. 37 shows numerical data of this case 12. As shown in FIG. 37 (*a*) and FIG. 37 (*b*), the subscription condition and the bid condition of the case 12 are substantially the same as those of the case 11. However, the case 12 is different from the case 11 in that the investor B bids "the bid stock price=150,000 yen" and "the bid stock number=600 stocks" and the investor C bids "the bid stock price=150,000 yen" and "the bid stock number=300 stocks".

First, in the successful bid stock price determination processing, the investors A and B are selected at step SI-2 as shown in FIG. 37 (*c*) to FIG. 37 (*e*). Then, at step SI-6, it is decided that the cumulative bid stock number 1,366 has reached the subscription stock number 1,000 stocks. Therefore, the successful bid stock price is determined as 150,000 yen. Then, the successful bid stock price determination processing finishes.

Next, in the successful bid stock number determination processing, the successful bid stock number of the investor A is determined at step SJ-4 as shown in FIG. 37 (*f*). Then, at step SJ-7, the remaining stock number of 544 stocks is proportionally allocated to the investors B and C. As a result, the successful bid stock numbers of the investors B and C are determined as shown in FIG. 37 (*f*). Then, the successful bid stock number determination processing finishes.

(Actual Successful Bid Processing—Stock Number Issuing System/Mixed Bid—Case 13)

Next, the case 13 will be explained. FIG. 38 shows numerical data of this case 13. As shown in FIG. 38 (*a*) and FIG. 38 (*b*), the subscription condition and the bid condition of the case 13 are substantially the same as those of the case 12. However, the case 13 is different from the case 12 in that the investor A bids "the bid stock price=150,000 yen" and "the bid total amount=70,000,000 yen".

First, in the successful bid stock price determination processing, the investors A to C are selected at step SI-2 as shown in FIG. 38 (*c*). Then, at step SI-6, it is decided that the cumulative bid stock number 1,366 has reached the subscription stock number 1,000 stocks. Therefore, the successful bid stock price is determined as 150,000 yen. Then, the successful bid stock price determination processing finishes.

Next, in the successful bid stock number determination processing, at step SJ-7, the subscription stock number of 1,000 stocks are proportionally allocated to the investors A to C. As a result, the successful bid stock numbers of the investors A to C are determined as shown in FIG. 37 (*f*) Then, the successful bid stock number determination processing finishes.

(Actual Successful Bid Processing—Stock Number Issuing System/Mixed Bid—Case 14)

Next, the case 14 will be explained. FIG. 39 shows numerical data of this case 14. As shown in FIG. 39 (*a*) and FIG. 39 (*b*), the subscription condition and the bid condition of the case 14 are substantially the same as those of the case 13. However, the case 14 is different from the case 13 in that the investor B bids "the bid stock price=160,000 yen" and "the bid stock number=600 stocks".

First, in the successful bid stock price determination processing, the investor B is selected at step SI-2 as shown in FIG. 39 (*c*). Then, at step SI-2, the investors A and C are selected. At step SI-6, it is decided that the cumulative bid stock number 1,366 has reached the subscription stock number 1,000 stocks. Therefore, the successful bid stock price is determined as 150,000 yen. Then, the successful bid stock price determination processing finishes.

Next, in the successful bid stock number determination processing, the successful bid stock number of the investor B is determined as 600 stocks at step SJ-4 as shown in FIG. 39 (*e*). Then, at step SJ-7, the remaining stock number of 400 stocks is proportionally allocated to the investors A and C. As a result, the successful bid stock numbers of the investors A and C are determined as shown in FIG. 39 (*e*). Then, the successful bid stock number determination processing finishes.

(Actual Successful Bid Processing—Total Amount Issuing System/Mixed Bid)

Figure 23:
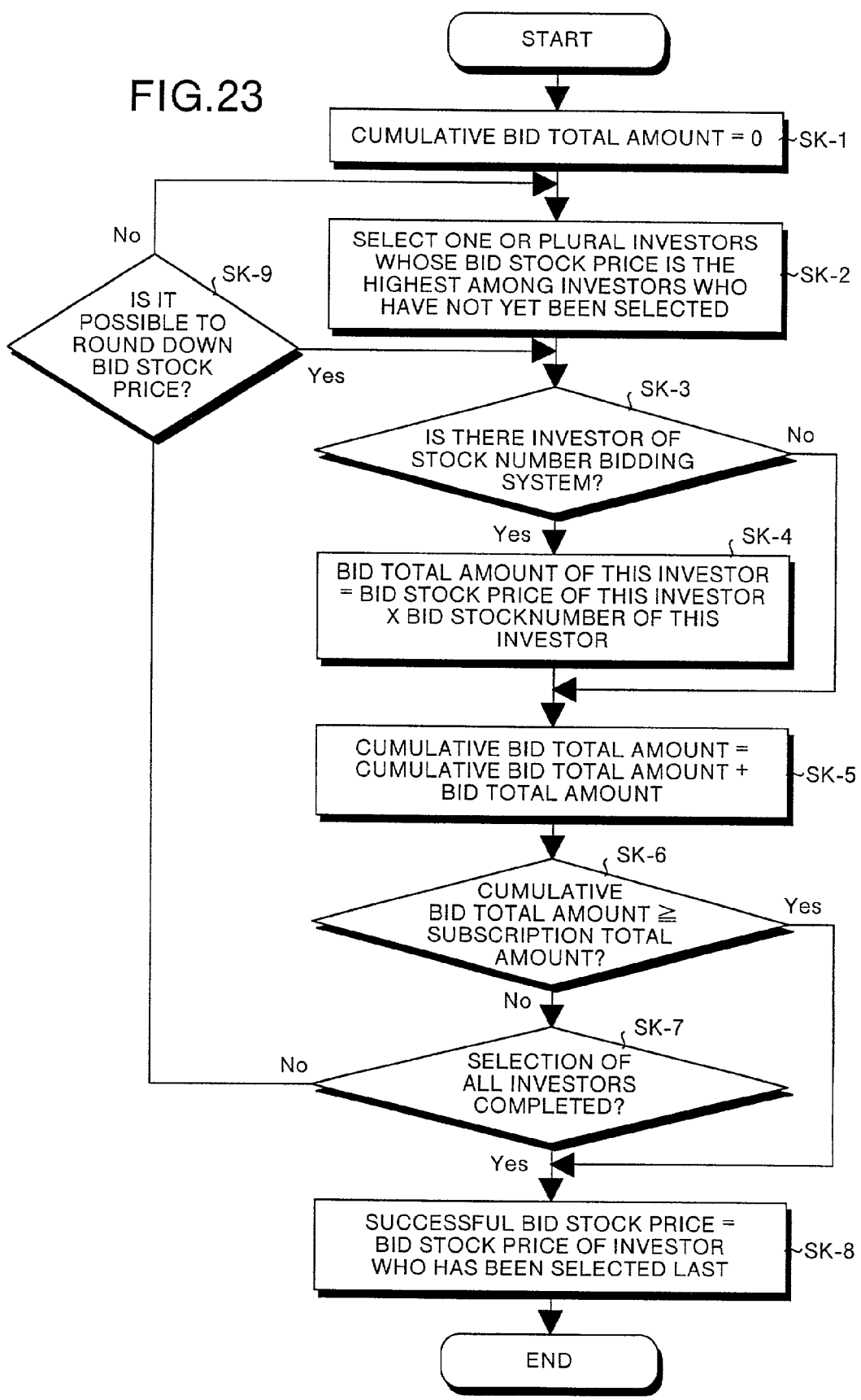
FIG. 23 is a flowchart of an actual successful bid stock price determination processing when a total amount issuing system has been selected.
Figure 24:
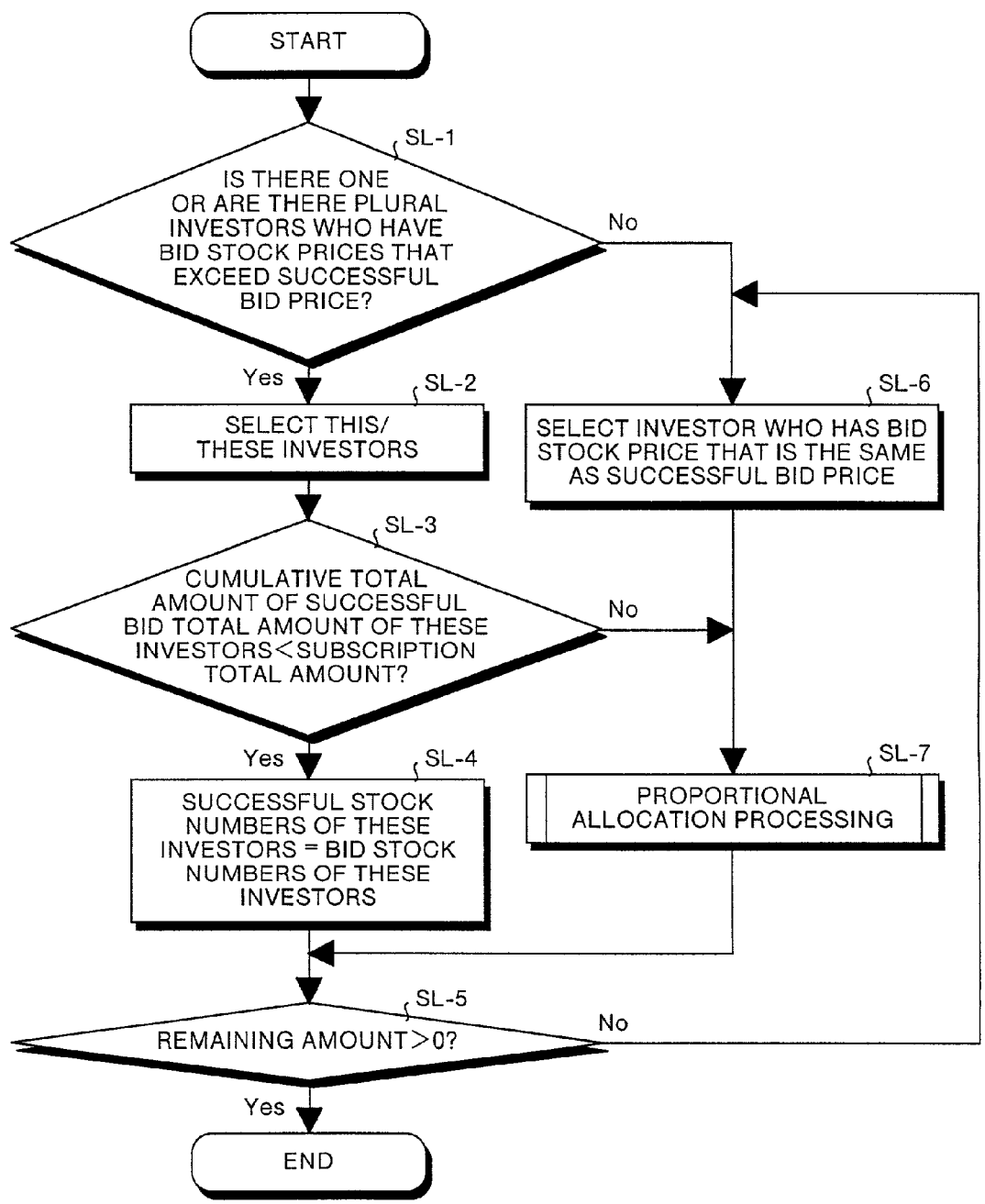
FIG. 24 is a flowchart of an actual successful bid stock number determination processing when the total amount issuing system has been selected.

Next, the case that the issue enterprise has selected the total amount issuing system and a plurality of investors have carried out the mixed bid will be explained as cases 15 to 19. FIG. 23 shows a flowchart of the actual successful bid stock price determination processing in this case, and FIG. 24 shows a flowchart of the actual successful bid stock number determination processing. The proportional allocation processing is similar to that of FIG. 20.

(Actual Successful Bid Processing—Total Amount Issuing System/Mixed Bid—Case 15)

First, the case 15 will be explained. FIG. 40 shows numerical data of this case 15. As shown in FIG. 40 (*a*), the subscription condition of the case 15 is that "the issuing system=the total amount issuing system", "the subscription total amount 100,000,000 yen", and "the lowest bid stock price=100,000 yen".

As shown in FIG. 40 (b), investors A to C have bid. The bid condition of the investor A is "the bidding system=the total amount bidding system", "the bid stock price=200,000 yen", and "the bid total amount=70,000,000 yen". The bid condition of the investor B is "the bidding system=the stock number bidding system", "the bid stock price=200,000 yen", and "the bid stock number=150 stocks". The bid condition of the investor C is "the bidding system=the stock number bidding system", "the bid stock price=150,000 yen", and "the bid stock number=300 stocks". All these investors select "the lowest permissible purchase stock number"=none".

First, in the successful bid stock price determination processing, the system is initialized based on the cumulative bid total amount=0 (steps SK-1). As shown in FIG. 40 (c) the investors A and B who present the highest bid stock price of 200,000 yen are selected (step SK-2). Then, the cumulative bid total amount is calculated as 100,000,000 yen (steps SK-3 to SK-5). In this case, it is necessary to calculate a bid total amount for the investor B of the stock number bidding system (step SK-4). Therefore, the bid stock price×the successful bid stock number 150 stocks=30,000,000 yen is calculated. At this point of time, the cumulative bid total amount has reached the subscription total amount 100,000,000 yen (steps SK-5 and SK-6) Therefore, the successful bid stock price=200,000 yen is determined (step SK-8). Then, the successful bid stock price determination processing finishes.

Next, in the successful bid stock number determination processing, there is no investor who has bid at a price higher than the successful bid stock price=200,000 yen (step SL-1). Therefore, the investors A and B who bid the same bid stock price as the successful bid stock price=200,000 yen are selected (steps SL-6). The subscription total amount 100,000,000 is proportionally allocated to the investors A and B, and the successful bid stock numbers are determined as shown in FIG. 40 (d). Then, the successful bid stock number determination processing finishes.

(Actual Successful Bid Processing—Total Amount Issuing System/Mixed Bid—Case 16)

Next, the case 16 will be explained. FIG. 41 shows numerical data of this case 16. As shown in FIG. 41 (a) and FIG. 41 (b), the subscription condition and the bid condition of the case 16 are substantially the same as those of the case 15. However, the case 16 is different from the case 15 in that the bid condition of the investor B is "the bid stock price=190,000 yen" and "the bid stock number=500 stocks".

First, in the successful bid stock price determination processing, the investor A is selected first as shown in FIG. 41 (c). Then, the investor B is selected at step SK-2 as shown in FIG. 41 (d). At this point of time, the cumulative bid total amount 164,920,000 yen reaches the subscription total amount 100,000,00 yen. Therefore, the successful bid stock price is determined as 190,000 yen. Then, the successful bid stock price determination processing finishes.

Next, in the successful bid stock number determination processing, the successful bid stock number of the investor A is determined at step SL-4 as shown in FIG. 41 (e). Thereafter, the successful bid stock number of the investor B is determined at step SL-7. In this case, the successful bid stock number is determined as (100,000,000 yen−70,000,000 yen)/190,000 yen=158 stocks (a fractional stock is rounded up within the range of the upper limit of the subscription total amount). Then, the successful bid stock number determination processing finishes.

(Actual Successful Bid Processing—Total Amount Issuing System/Mixed Bid—Case 17)

Next, the case 17 will be explained. FIG. 42 shows numerical data of this case 17. As shown in FIG. 42 (a) and FIG. 42 (b), the subscription condition and the bid condition of the case 17 are substantially the same as those of the case 16. However, the case 17 is different from the case 16 in that the bid condition of the investor B is "the bid stock price=200,000 yen" and "the bid stock number=500 stocks".

First, in the successful bid stock price determination processing, the investor A and the investor B are selected at step SK-2 as shown in FIG. 42 (c). At this point of time, the cumulative bid total amount 170,000,000 yen reaches the subscription total amount 100,000,00 yen. Therefore, the successful bid stock price is determined as 200,000 yen. Then, the successful bid stock price determination processing finishes.

Next, in the successful bid stock number determination processing, the investors A and B who bid the same bid stock price as the successful bid stock price=200,000 yen are selected ate step SL-6. The subscription total amount 100,000,000 is proportionally allocated to these investors A and B. Then, the successful bid stock numbers are determined as shown in FIG. 42 (d). Then, the successful bid stock number determination processing finishes.

(Actual Successful Bid Processing—Total Amount Issuing System/Mixed Bid—Case 18)

Next, the case 18 will be explained. FIG. 43 shows numerical data of this case 18. As shown in FIG. 43 (a) and FIG. 43 (b), the subscription condition and the bid condition of the case 18 are substantially the same as those of the case 17. However, the case 18 is different from the case 17 in that the bid condition of the investor B is "the bid stock price=150,000 yen" and "the bid stock number=600 stocks".

First, in the successful bid stock price determination processing, the investor A is selected at step SK-2 as shown in FIG. 43 (c). Thereafter, the successful bid stock price is gradually lowered as shown in FIG. 43 (d). Then, the investors B and C are selected at step SK-2 again as shown in FIG. 43 (e). At this point of time, the cumulative bid total amount 204,900,000 yen reaches the subscription total amount 100,000,00 yen. Therefore, the successful bid stock price is determined as 150,000 yen. Then, the successful bid stock price determination processing finishes.

Next, in the successful bid stock number determination processing, the successful bid stock number of the investor A is determined at step SL-4 as shown in FIG. 43 (f). Thereafter, the remaining amount 30,100,000 yen is proportionally allocated to the investors B and C at step SL-7. As a result, the successful bid stock numbers of the investors B and C are determined as shown in FIG. 42 (f). Then, the successful bid stock number determination processing finishes.

(Actual Successful Bid Processing—Total Amount Issuing System/Mixed Bid Case 19)

Last, the case 19 will be explained. FIG. 44 shows numerical data of this case 19. As shown in FIG. 44 (a) and FIG. 44 (b), the subscription condition and the bid condition of the case 19 are substantially the same as those of the case 18. However, the case 19 is different from the case 18 in that the bid condition of the investor B is "the bid stock price=150,000 yen" and "the bid stock number=100 stocks", and the bid condition of the investor B is "the bid stock price=100,000 yen" and "the bid stock number=300 stocks"

First, in the successful bid stock price determination processing, the investor A is selected at step SK-2 as shown in FIG. 44 (c) and FIG. 44 (d). Thereafter, the successful bid stock price is gradually lowered. Then, the investors B is selected at step SK-2 again as shown in FIG. 44 (e). Further, the investors C is selected at step SK-2 as shown in FIG. 44 (f). At this point of time, the cumulative bid total amount 110,000,000 yen reaches the subscription total amount 100,000,00 yen. Therefore, the successful bid stock price is determined as 100,000 yen. Then, the successful bid stock price determination processing finishes.

Next, in the successful bid stock number determination processing, the successful bid stock numbers of the investors A and B are determined at step SL-4 as shown in FIG. 44 (g) Thereafter, the remaining amount 20,000,000 yen is proportionally allocated to the investor C at step SL-7. As a result, the successful bid stock number of the investor C is determined as shown in FIG. 44 (g). Then, the successful bid stock number determination processing finishes.

(Successful Bid Processing—Successful Bid Result Processing)

Figure 25:
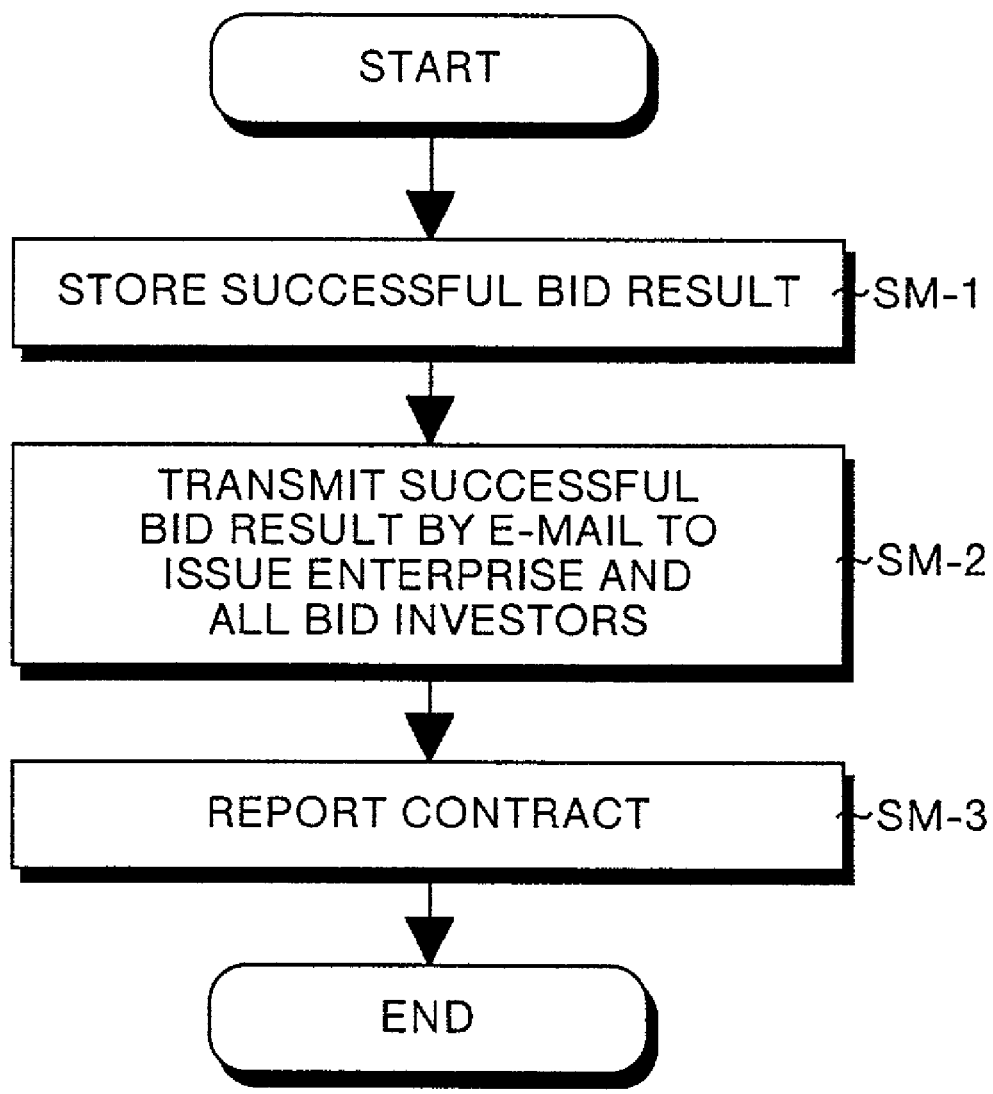
FIG. 25 is a flowchart of a successful bid result processing.

After the successful bid stock price and the successful bid stock numbers have been determined as described above, a successful bid result processing is carried out. FIG. 25 shows a flowchart of this processing. As shown in FIG. 25, first, the successful bid stock price and the successful bid stock numbers that have been obtained in the above processing are stored into the successful bid information DB 16 in relation to the issue enterprise ID of the issue enterprise that has made the bid and the investor IDs of the investors who have been the successful bidders (step SM-1).

Then, a message of "the successful bid has been finished" and a message of "the request for reading the investment record (to be described later)" are transmitted by e-mail to the issue enterprise and all the investors who participated in the bidding (step SM-2). In this case, in place of "the request for reading the investment record (to be described later)", or together with this message, a URL of the successful bid result reading screen G4 may be transmitted thereby to facilitate the reference of the investment record. It is also possible to transmit the successful bid stock numbers and the successful bid stock price by this e-mail. However, it is not desirable to transmit this important information via the Internet from the viewpoint of security. Therefore, only the above contents are transmitted. In this case, it is necessary to input the investor ID and the password in order to refer to the successful bid result reading screen G4. Therefore, it is possible to avoid the leakage of the information on the result of the successful bid to the third party.

The transmission of this e-mail is carried out based on the automatic transmission function of the mail transmission processing section 211. The e-mail address in this case is obtained from the issue enterprise information DB 10 and the investor information DB 11. This e-mail is spooled in the mail server not shown like the Internet provider, and is then read at an optional timing in the electronic mailer 31b of the client units 3 and 4. Based on this, the issue enterprise and each investor can understand the result of the successful bid.

After the transmission of the e-mail, the contract is reported (step SM-3). Specifically, the contract amount is calculated for each investor based on the successful bid stock price and the successful bid stock number. A document is prepared that describes the successful bid stock price, the successful bid stock number, the contract amount, and the due date of payment obtained from the subscription information DB 12. Then, this document is transmitted to each investor. The preparation and transmission of this document can be carried out automatically using known optional means.

Then, the successful bid result processing finishes, and the successful bid processing shown in FIG. 17 finishes.

(Successful Bid Result Reading Screen)

Thereafter, as shown in FIG. 11, each investor and the issue enterprise can read the successful bid result reading screens G4 and G11 respectively from the investor top page and the issue enterprise top page respectively. In other words, when a predetermined link button provided on the investor top page and the issue enterprise top page is selected, the transmission request of the successful bid result reading screens G4 and G11 is transmitted to the server unit 1. Upon receiving this request, the server unit 1 generates the Web data of the successful bid result reading screens G4 and G11 that include the successful bid information stored in the successful bid information DB 16. This Web data is then transmitted to the client units 3 and 4. Then, the successful bid result reading screens G4 and G11 are displayed on the monitors 36 and 46. Therefore, each investor and the issue enterprise can confirm the successful bid result at an optional timing.

The successful bid result reading screen G4 includes the investment record for enabling the investor to refer to the record of the successful bid result. This investment record is a list including the successful bid processing date (the same as the successful bid processing scheduled date) of the unlisted stocks, the name of stocks (the enterprise name of the issue enterprise), the successful bid stock price, and the successful bid stock number. These pieces of information are obtained from the issue enterprise DB 10 and the subscription information DB 12 or from the successful bid information DB 16. The information is transmitted to the client unit 3 as a part of the Web data of the successful bid result reading screen G4, and is displayed on the monitor 36. By referring to this investment record, the investor can understand the investment result, and use the information as reference for the own investment management.

(Faq Reading Screen)

Thereafter, as shown in FIG. 11, each investor can read the FAQ reading screen from the investor top page. In other words, when a predetermined link button provided on the investor top page is selected, the transmission request of the FAQ reading screen is transmitted to the server unit 1. Upon receiving this request, the server unit 1 generates the Web data of the FAQ reading screen that includes the FAQ information stored in the FAQ information DB 17. This Web data is then transmitted to the client units 3. Then, the FAQ reading screen is displayed on the monitor 36. Therefore, the investor can obtain various kinds of knowledge relating to the transaction of the unlisted stocks.

(IR Reading Screen)

Further, as shown in FIG. 11, each investor can read the IR reading screen from the investor top page. In other words, when a predetermined link button provided on the investor top page is selected, the transmission request of the IR reading screen is transmitted to the server unit 1. Upon receiving this request, the server unit 1 generates the Web data of the IR reading screen that includes the IR information stored in the IR information DB 18. This Web data is then transmitted to the client units 3. Then, the IR reading screen is displayed on the monitor 36. Therefore, the investor can know the transition of the financial state of the issue enterprise as the IR information of the issue enterprise.

The embodiment of the present invention has been explained above. In addition to the above embodiment, the present invention can also be implemented in various other different embodiments within the range of the technical idea described in the claims.

For example, the present apparatus, the present method, and the present medium can be similarly applied to an increase of an enterprise capital by allotting to third parties, M&A, and a business transfer. It is also possible to similarly apply the present invention to other optional transaction items. In this case, in the above explanations and drawings, the term of the "unlisted stocks" may be changed to the "transaction item", and the "stock number" may be changed to the "product number" or the "service number". Further, the "stock price" may be changed to the "product unit price" or the "service unit price". The "purchase number" may be changed to the "purchase stock number". The "subscription" includes the concept of the "sale" for transacting the issued stocks. Further, the "subscription" and the "sale" include the "private subscription" and the "public subscription".

Further, although the bidders are limited to the members in the above embodiment, main conditions of bidders may be set optionally.

Further, of the processing explained in the above embodiment, the whole or a part of the processing that has been explained to be automatically carried out may be processed manually. Alternatively, the whole or a part of the processing that has been explained to be manually carried out may be processed automatically based on a known method.

Further, the processing procedures, the control procedures, the detailed names, and the information including various registration data and parameters like retrieval conditions shown in the above document and drawings, can be optionally changed except where a special remark is made.

SECOND EMBODIMENT

A stock transaction system and a method relating to a second embodiment of the present invention will be explained with reference to FIGS. 49 to 57.

This stock transaction system is a membership system. According to this system, a Web site built up on the Internet is used as a transaction place. A member person who wants to purchase stocks (an investor) makes an application to this site for the bid in on-line. A processing of a successful bid for unlisted stocks is carried out based on this bid.

Figure 49:
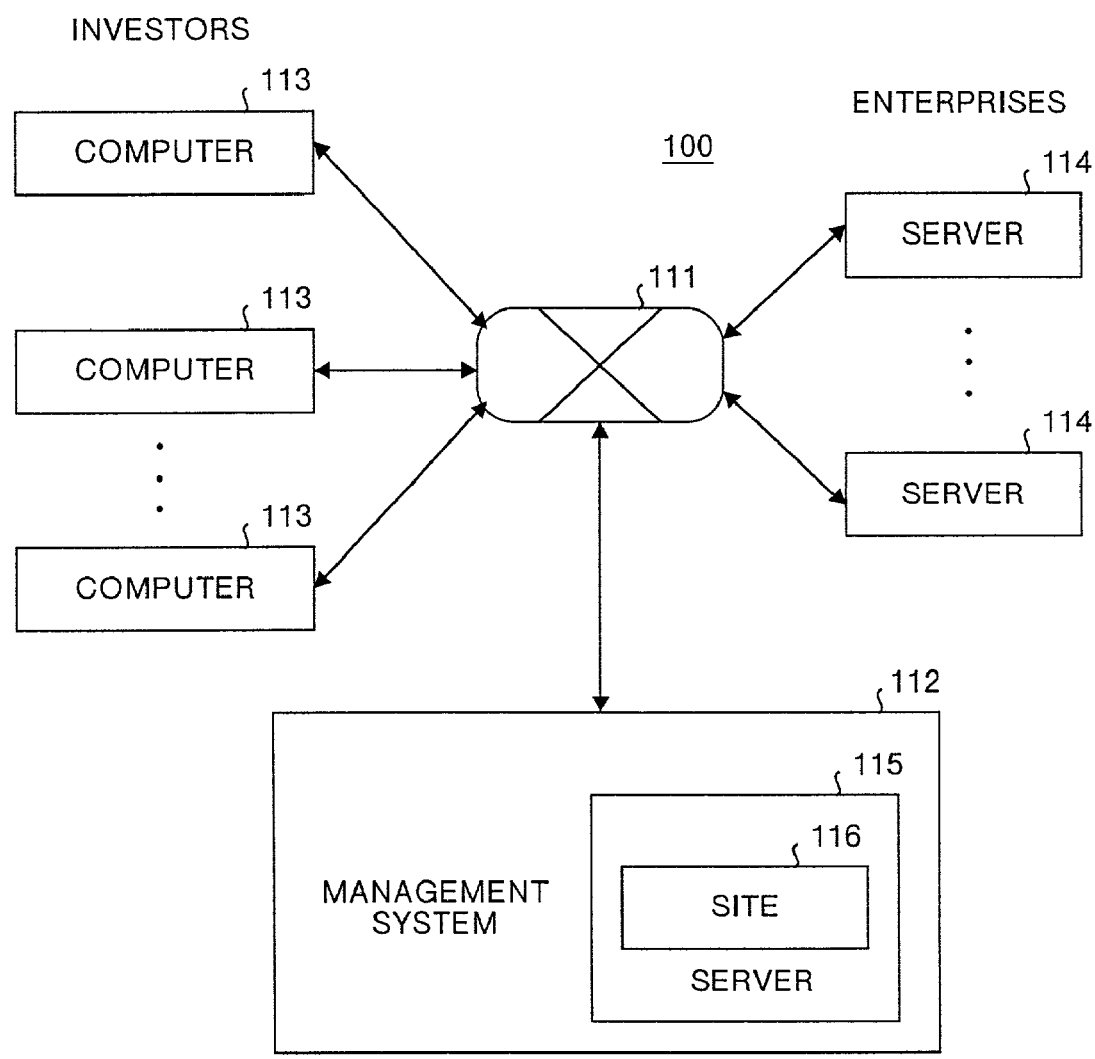
FIG. 49 is a diagram for explaining a schematic structure of a stock transaction system relating to a second embodiment of the present invention.

First, the outline of the hardware structure of this system will be explained. As shown in FIG. 49, this stock transaction system 101 consists of the Internet 111 as a network, a management system 101 connected to the Internet 111 for the manager of the present system 101 to carry out management, computers 113 like personal computers of a large number of investors (purchasers) connected to the Internet 111, and servers 114 of enterprises (issue bodies) connected to the Internet 111 that are going to issue unlisted stocks by utilizing this system.

The computers 113 of the investors and the servers 114 of the enterprises have been installed with applications like Browsers and e-mails. These computers 113 and servers 114 are connected to the Internet 111 via an exclusive line or a dial-up connection line.

The management system 101 is equipped with a WWW (Worldwide Web) server 115 connected to the Internet 111 via a firewall server and an authentication server not shown. This server 115 presents a stock transaction Web side 116. With this arrangement, the stock transaction Web side 116 has been built up on the Internet 111. Although not shown in the drawing, the WWW server 114 is also equipped with a file server and a database server for storing various kinds of customer files and management data, and a monitor work station. These servers and the workstation have been installed with applications necessary for a startup, operation management and updating of the Web site 115, and applications like e-mails as a communication function. The WWW servers 114 are connected to the Internet 111 via an exclusive line.

Based on the above arrangement, each investor and each enterprise can make access to the Web site 115 in on-line. At the same time, the manager can also communicate with the investors 113 and the enterprises 114 in on-line, so that bidirectional communications are possible.

Figure 50:
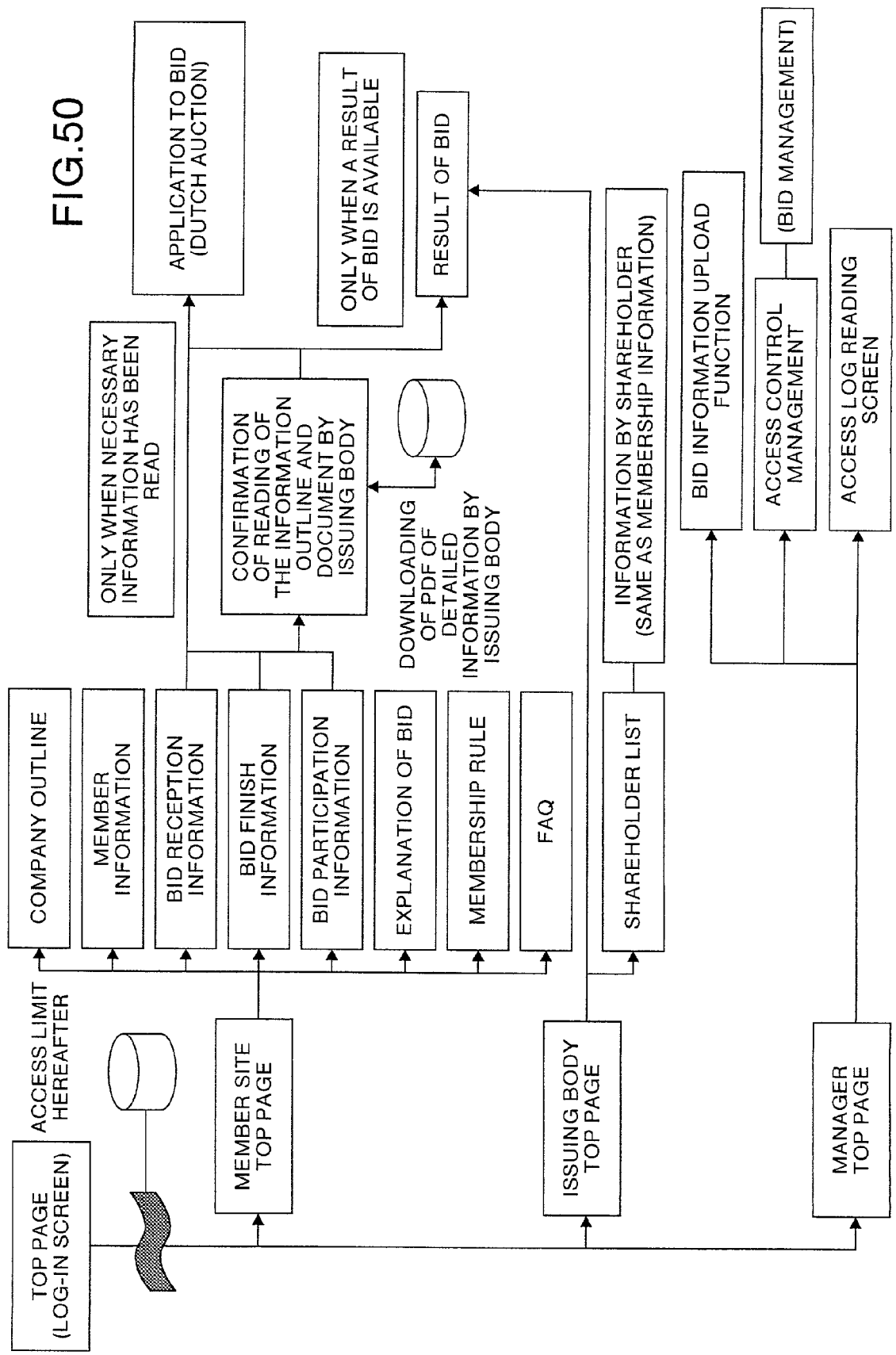
FIG. 50 is a diagram of a site map showing a function of a stock transaction site opened on the Internet.

The stock transaction Web site 115 has functions of a site map shown in FIG. 50 in the management system 101. According to this site map, a person or an enterprise that has made access to this site 115 can open a log-in screen as a top page. After this top page, there is a site area into which only the manager and a user (an investor) or an issue enterprise (an issuing body) registered as a member can enter.

A user as a member can open a member site top page after logging in. From this top page, the user can move to the company outline, the member information, the bid (bid price) reception information, the bid finish information, the bid participation record, the explanation of the bid, the membership rule, and the FAQ. Only when the user has already read the necessary documents of the enterprise, the user can directly apply for the bid. From the bid reception information, the bid finish information, and the bid participation record, it is possible to present the outline information of each issuing body (enterprise) and to confirm the reading of the documents. The confirmation of the reading of the documents is carried out by downloading the detailed information by enterprise in the PDF format. When the reading of the documents has been finished, the user can make application for the bid. When a bid result according to the auction method is output, the user can make aces to the bid result.

The issue enterprise can open the top page of the issuing body after logging in. Further, the issue enterprise can make access to a result of the bid from the top page. On the other hand, the issue enterprise can sequentially access the list of shareholders, and the information by shareholder (the same as the member information).

Further, the manager can open the top page for the management after logging in. The manage can move from this top page to the bid information upload function, the access control management, the bid management, and the management of the access log reading screen.

Figure 51:
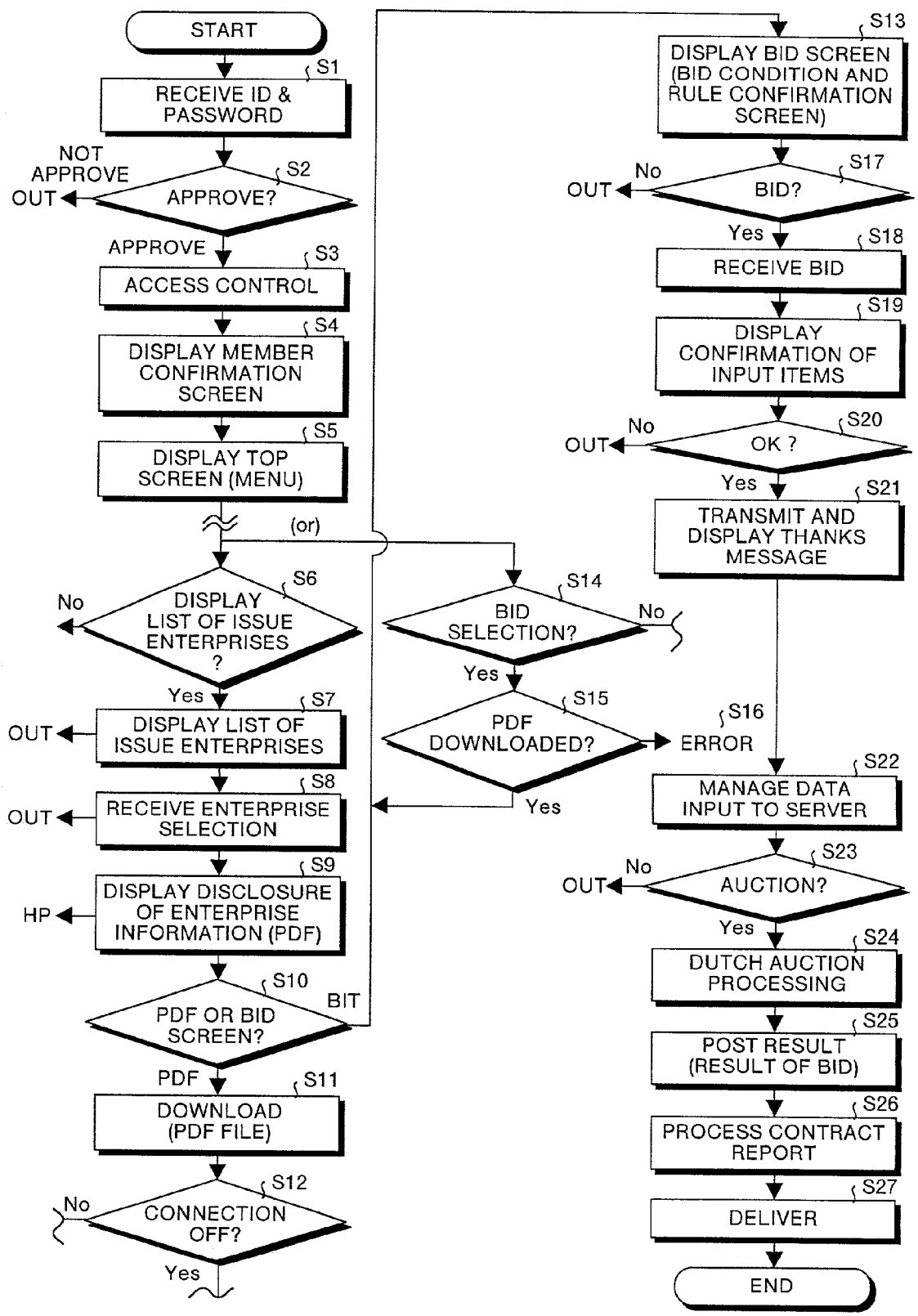
FIG. 51 is a flowchart with a part omitted, showing an example of a work processing executed in the stock transaction system relating to the second embodiment.

Next, one example of the work and processing in this stock transaction system will be explained with reference to FIG. 51. Among the items to be explained below, the processing relating to the on-line communication is carried out in co-operation with the computers 113 of the users, the Internet 111, and the management system 101 of the manager.

As the present system employs a membership system, each user (individuals and corporations) needs to obtain a membership ID and an authentication password in advance. In order to obtain these, the user sends by mail, for example, an application sheet entered with necessary items to the manager (a managing company) of the stock transaction Web site 116 (hereinafter to be referred to as the site) have the sheet examined. A user who has passed the examination is given a membership ID and an authentication password from the manager.

The manager registers users who have passed the examination, and gives membership IDs and authentication passwords to them. On the other hand, the manager prepares the attributes of the users into data, and stores the data into the file server. As parameters of the attributes of the user, there are (1) a form of business (a city bank, a local bank, a trust and banking company, a life insurance company, an indemnity insurance company, a venture capital, etc.), (2) a capital relationship (Zaibatsu A, Zaibatsu B, Zaibatsu C, etc.), (3) characteristic of a fund (whether it is possible to expect a long-term holding or not), (4) scale (capital xx yen or above, etc.), (5) nationality (only Japan, Japan and USA, etc.), (6) area of existence (Kanto, Kansai, etc.), and (7) the other party of transaction (names of companies when the member is a bank or the like), etc.

For the members who have once finished the registration of the membership, investment demand of each member is checked occasionally through inquiries, and a result is stored in data into the filer server. As parameters of the data of the investor, there are (1') a form of business, type of industry, a business model of a company to which the investor wants to invest (an unlisted enterprise), (2') an establishment stage, a scale or a financial state desired by the investor, and (3') business policy and business philosophy of the issue enterprise desired by the investor, etc.

On the other hand, the enterprise (hereinafter the issuing body) that is going to issue unlisted stocks by utilizing this stock transaction system needs to give necessary information (the issue stock number, the unit stock number, the bid processing date, etc.) to the manager and have the information registered in advance, in a similar manner.

When a user who has become a member or a user who has not yet registered the membership has made access to the stock transaction site 116 in on-line via the Internet 111, a log-in screen as shown in FIG. 52 is displayed on the user computer 113. The member user can input a member ID and an authentication password from the own computer 113 on this log-in screen. In response to this log-in, the stock transaction server 115 of the management system 101 carries out the processing shown in FIG. 51.

First, upon receiving the member ID and the authentication password transmitted from the user, the stock transaction server 115 makes a decision about whether it is possible to authenticate or not (steps S1 and S2). When a result of this decision made is "Authenticate", the stock transaction server 115 processes the attributes of the user under the access control (step S3).

In the present embodiment, the access control includes two modes. A first access control has an object of selecting users who reflect the intention of the issuing body from among users who are going to bid for the transaction of unlisted stocks to be described later. Specifically, based on the access management function of the stock transaction server 114, the stock transaction server 115 reads the attributes of users whose member IDs and authentication passwords have been received, from the stored data of the file server. Then, under a desired condition, the stock transaction server 115 classifies the users (investors) who are hierarchically managed according to the above-described parameters (1) to (7). The stock transaction server 115 then controls the access from the users whether they can participate in the bidding or not. Based on this, the issuing body can avoid the fear of an acquisition of stocks or a takeover by an investor which the issuing body that issues unlisted stocks does not want. Further, it is possible to expect a possibility of a future business tie-up.

A second access control has an object of selecting bidders when the issue of unlisted stocks is a private placement. Based on the access management function of the stock transaction server 114, the stock transaction server 115 reads the attributes of users whose member IDs and authentication passwords have been received, from the stored data of the file server, in a similar manner to that described above. Then, the stock transaction server 115 classifies the users (investors) who are hierarchically managed according to the above-described parameters (1') to (3'), and selects users (investors) who have a high possibility of participating in the bidding while reflecting the intention of the issuing body for issuing stocks. The stock transaction server 115 can give the right of participating in the bidding to these selected users with priority. As a result, it is possible to restrict the number of investors to be invited to the limit number of 49.

When users have been selected based on the access control as explained above, a result of the selection is reflected on the list display of the "list of issue enterprises" as described later. In other words, the list of issue enterprises of which bidding (subscription) a certain user can participate in is limited to the list contents that reflect the attributes of the user and the intention of the issue enterprises.

After the above access control (step S3) has finished, a screen that shows the information that the member must confirm is displayed on the computer 103 of the user (step S4). Next, a top (menu) screen of the site 116 is displayed on the computer 103 of the user (step S5).

Figure 53:
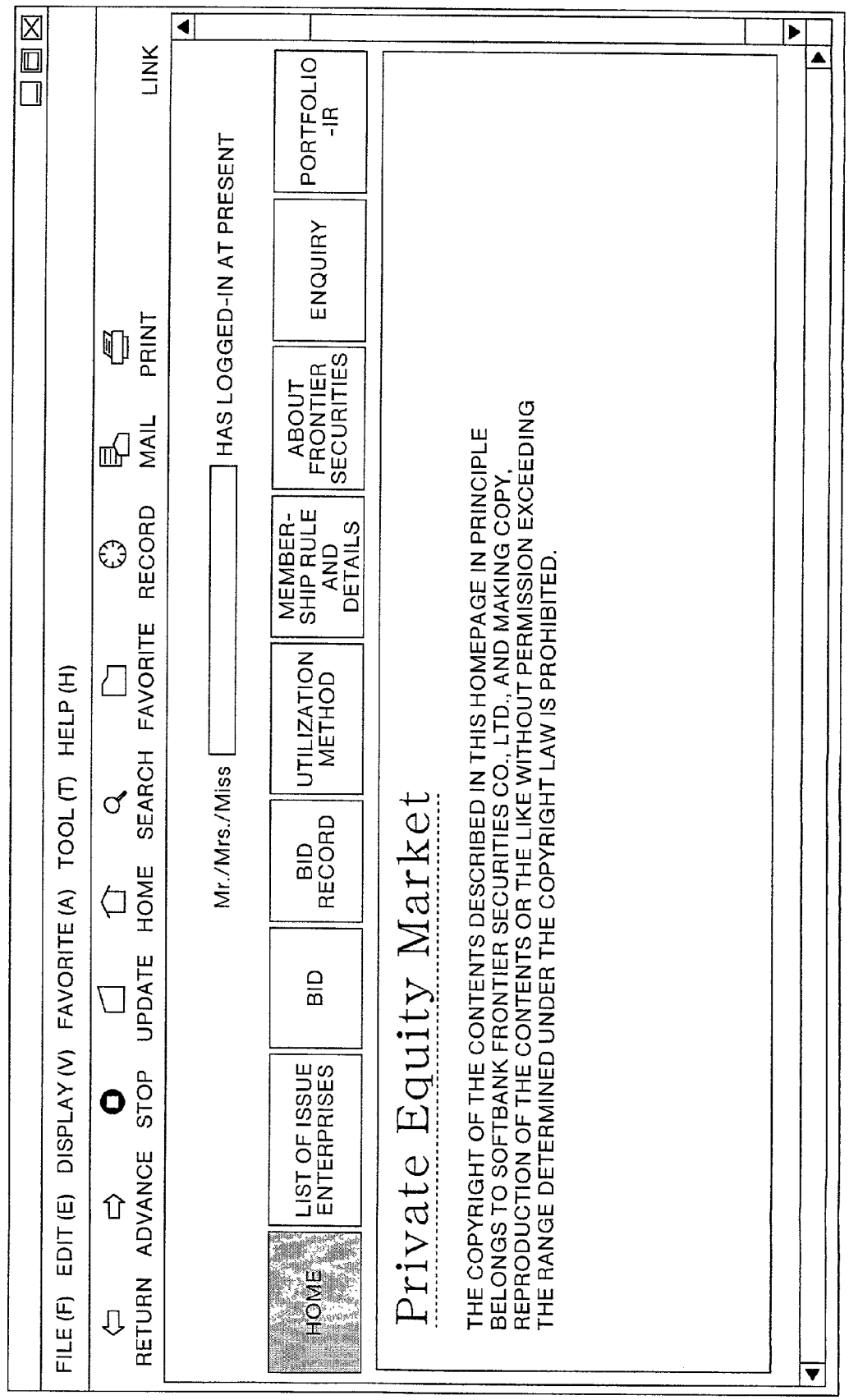
FIG. 53 is an example of a top page displayed on a computer terminal of an investor.

FIG. 53 shows one example of this top screen. As shown in this drawing, the top screen is provided with tab bars of at least the "home", the "list of issue enterprise", the "bid", the "bid record", the "utilization method", the "membership rule and details" the "about Frontier Securities", the "enquiry", and the "portfolio/IR", so that the user can open a necessary screen easily.

When the user has clicked the "home" tab among these tabs, the user can shift to a page that introduces mainly newly information. FIG. 54 shows one example of the screen of this homepage. The tab of the "list of issue enterprises" makes a shift to a page that displays a list of issue enterprises of which bidding the member user who accessed the stock transaction site 116 can participate in (refer to FIG. 55). When the user has opened a prospectus of the PDF file to be described later of an enterprise, the "bid" tab enables this user to execute the bid to this enterprise directly from the top screen. When the user has clicked the "bid record" tab, the server 115 makes display of a page of the record that shows what bid (subscription) this accessed user has participated in the past and what was the bid result. The "utilization method" tab has a function of shifting to a page that explains how to utilize this system. The "membership rule and details" tab is the tab for shifting to a page that explains the membership rule and details. The "about Frontier Securities" tab makes a shift to a page that explains and makes PR of the net securities company as the manager (managing company) of this system. Further, the "enquiry" tab makes a shift to a page that receives an enquiry from the user. Further, the "portfolio"/IR" tab has a function of making a direct shift to a page that presents information relating to the user portfolio and/or IR (Investor Relations)".

Therefore, a user who has accessed the site 116 can directly obtain information by clicking a desired tab from the top screen. However, when the user is going to participate in the bidding, it is an essential condition that the user clicks the "list of issue enterprises" tab, makes display of the list of the issue enterprises of which bidding the user can participate in, and confirms the prospectus.

Then, the user selects the "list of issue enterprises" tab from the top screen of the own computer 113, and makes display of the list of issue enterprises (steps S6 and S7) FIG. 55 shows one example of the list of issue enterprises.

In this case, the stock transaction server 115 reads a result of the access control (refer to step S3) processing from the file server, and makes display of only the list of issue enterprises of which intention of the stock issue coincides with the attributes of the accessed user, among a large number of issue enterprises. Therefore, the enterprises of which intention does not coincide with the attributes of the user are automatically excluded from the list of issue enterprises. As a result, the issue enterprises that utilize this system can avoid the fear of a hostile acquisition or a takeover. Further, it is possible to collect investors with whom a future business tie-up can be expected. As a result, this system is safe and highly reliable. Further, when an issue enterprise wants to carry out a private placement, it is possible to automatically limit the number to 49 persons. In this list display, the list of issue enterprises linked with the access control carried out by the server 115 of the manager is selected at a place that cannot be observed by users. Therefore, the users can read only the list of enterprises of which bidding the users can participate in. As a result, there is no room that the investors feel the artificial sense or discomfort.

The list of the "list of issue enterprises" describes one or a plurality of company names of which bidding the accessed user can individually participate in, information presentation starting dates, bid organizations, a successful bid result determination date, a payment date, and remarks, of these enterprises.

Further, the stock transaction server 115 receives the enterprise names that the user has selected from the "list of issue enterprises" on the own computer 113 (step S8). The individual information of the selected enterprises is displayed (disclosed) as the HTML (HyperText Markup Language) file (step S9). On this information screen, there are displayed in a suitable layout, the history of the company, the philosophy of the president, the business policy, the introduction of a business model, the introduction of products and services, the current capital structure, the past and current financial statements, the R&D and facility investment plan, and the purpose of fund procurement. These pieces of information are always updated to the latest version based on the information updating function of the server 115. Therefore, when the user watches this disclosure screen, the user can understand the current power of the enterprise the user has selected, and can feel the future latent growth.

The information disclosure screen by company is provided with the "PDF" (this may be other format including the PDF) and "bid screen" buttons. When the user clicks the "PDF" button, the user can download the disclosure information in the PDF format. The PDF format for the downloading is one example. The enterprise individual information may be downloaded in other suitable format. The disclosure information of each company includes a large volume of information. Therefore, after downloading the information, the user can once set the line to the off-line state. Thereafter, the user can study the information by taking time, and can decide whether to participate in the bidding or not. On the other hand, when the user clicks the "bid screen" button, the user can directly shift to the screen necessary for participating in the bidding.

In all cases, the user can participate in the bidding only when the user has opened and studied the information disclosure screen of each selected company. Based on this, it is possible to securely give an opportunity to study the investing company to the user. As a result, this system is effective in warning a rash or impulsive investment.

Therefore, when the user has clicked the "PDF" button, the detailed information of the selected company stored in the file server via the server 15 is downloaded to the user computer 113 in the PDF (Portable Document Format) (steps S10 and S11). Thereafter, the user can once provisionally switch the line to the off-line, or can study the detailed information by company in the on-line state (step S12).

When the user has selected the "bid screen" button in the decision about a selection of either the "PDF" button or the "bid screen" at the above step S10, the server 115 makes a decision that the user has read and confirmed the detailed information by company in the on-line state, and makes display of the bid screen (step S13). When the user has once switched the line to the off-line state after selecting the "PDF" button as described above, and then selects the "bid" button on the top screen in this state (step sS14 to S16), the stock transaction server 115 makes execute the display screen of this bid screen.

This bid screen shows a declaration statement of "As a result of reading and studying the prospectus of the company A, I will participate in the bidding of the unlisted stocks of this company", and a bid stock price and a bid stock number. When the user has input the bid stock price, the bid stock number, and the lowest permissible purchase stock number, a provisional contract amount is automatically calculated based on the case when the contract is made under the condition of the input bid stock number and the input bid stock price, and this is displayed. Therefore, the user can timely confirm the provisional contract amount at this place. It is possible to correct and cancel the once input information before the "bid" button is clicked on the bid screen.

When the user has clicked the "bid" button on this screen, the input information is transmitted to the server 115 in on-line. Based on this, the user can participate in the bidding via the bid reception function of the server 115. On this screen, there is also provided the "cancel" button for the user to stop the participation in the bidding for some reason. Thus, the user can also stop the bid. (step S17).

When the user has clicked the "bid" button on the bid screen, the bid information (the user ID, the bid price, the bid stock number, the lowest permissible purchase stock number, etc.) is transmitted from the user computer 113 to the stock transaction server 115 via the Internet. Then, this bid information is received by the server 115 (step S18).

The server 115 that has received this bid information automatically returns this information to the user computer 113 by e-mail in on-line, transmits the confirmation screen to the user again and requests the user to confirm whether or not the user can accept the returned contents (the user name, the user ID, the bid price, the bid stock number, and the provisional contract amount when the contract is made based on the bid stock number and the bid price) (steps S19 and S20) When the user has clicked the "OK" button on this confirmation screen, the server 115 regards that the bid participation has been completed, and transmits a message of thanks for the bid participation to the user computer 113 (step S21). However, when the user has clicked the "cancel" button on the confirmation screen, the participation in the bidding is cancelled although the bid information has been once transmitted to the server 115 (step S20).

When the bidding has been completed in this way, the server 115 stores the bid information into the file server, and at the same time, updates the bid record of this bid user, thereby managing the necessary data (step S22).

When there is an enterprise of which bid date has already reached among the registered issue enterprises, the server 115 reads all the bid participation data of this enterprise from the file server, and executes the bid processing according to the auction method (steps S23 and S24)

This auction method is implemented as follows.

As a basic one example, assume that the issue stock number of unlisted stocks of a certain enterprise is 1,000 stocks, and there is not limit to a unit stock number. Then, assume that a company X has bid 500 thousand yen for 700 stocks, a company Y has bid 400 thousand yen for 200 stocks, a company Z has bid 300 thousand yen for 100 stocks, and a company W has bid 200 thousand yen for 500 stocks. In this case, the bid price is made as a successful bid price to the company Z that satisfies up to 1,000 stocks. Then, only three companies of the company X, the company Y and the company Z are successful in bidding 300 thousand yen for the applied stock numbers 700 stocks (the company X), 200 stocks (the company Y), and 100 stocks (the company Z).

However, it is rare that issue stocks are satisfied without a fraction or without a limit to the unit stock number or the lowest permissible purchase stock number, like this case. In actual practice, as exemplified in cases 1 to 6 in FIG. 56 (although there are more cases), there are special cases. In these special cases, according to this auction, when the bid stock number at the successful bid price has exceeded the issue stock number, a proportional allocation processing is carried out based on the unit stock number (a fraction that does not satisfy the unit stock number is rounded off) in principle. For the remaining stock number, the minimum unit stock number is sequentially allocated to bidders whose rounded-off stock number is large. For the bidders whose rounded-off stock number is the same, the minimum unit stock number is allocated by lot. However, when the member (bidder) has limited the lowest permissible purchase stock number at the time of bidding, priority is given to this limit stock number.

In the representative exceptional cases 1 to 6 shown, when the processing is carried out based on the above principle, for the companies A and B (cases 1 and 2), or the company A, the company B and the company C (cases 3 to 6) whose bid price is the third, their successful bid stock numbers are determined as shown in the squared column according to the unit stock number, presence or absence of the minimum unit stock number, and the stock number. In these cases 1 to 6, the successful bid price of the second highest two companies is the third bid price (300 thousand yen).

This auction processing includes the determination of a successful bid price, and the preparation of a list of successful bidders by stock number and by contract amount like data analysis of auctioned bid information for the manager.

When the bidding has been completed and the bid result becomes firm, the result is replied to all the bid participants and the issue enterprise by e-mail, for example (step S25). This e-mail is transmitted after the contents have been enciphered. The user computer 113 receives the e-mail and deciphers the contents. The participant can make access to the site from the own computer 113 and confirm the successful bid result by reading the own bid record.

The successful bid result includes the information about whether the applicant has been successful or not in the bidding. When the applicant has been successful, the information includes the successful bid number, the successful bid price, the contract date, the contract amount, the delivery date, and the delivery method. When the applicant has not been successful, the information includes information relating to the successful bid price as reference information for the bid participant.

Thereafter, the stock transaction server 115 carries out the contract report processing to the successful bidders based on the contract calculation function and the contract report function (step S26). Next, at a suitable time, the successful bid stocks are delivered (step S27).

As explained above, according to the present embodiment, it is possible to provide a stock transaction system that is suitable for unlisted stocks. According to this system, users (investors) participate in the bidding in on-line at the stock transaction site opened on the Internet. Then, the bidding is executed according to the auction method.

FIG. 57 schematically shows a workflow with this stock transaction system as a center. As shown in FIG. 57, this system develops the services by utilizing the Website system. In addition to the bidding system function, this system also includes the function of providing various kinds of information and analysis and forecasting services as described above. The information provision service includes the provision of information relating to the user portfolio and/or IR.

Further, the unlisted stock company participates in this stock transaction system for issuing unlisted stocks, and provides information for this purpose. On the other hand, the investor participates in this stock transaction system as a member of this system for the purpose of investment, and collects information of interested enterprises. Based on the collected information, the investor analyzes and forecasts for the investment, judges the investment from the result of this study, and makes determination. This determination is realized in the form of a participation in the bidding. The investor waits for a result of the bidding carried out by the stock transaction system according to the auction method. When the result of the bidding has been successful, the issue enterprise can procure funds from the market.

In other words, the issue enterprise can collect funds in the mode of competitive bid from a plurality of investors in the market. Bad effects of the conventional closed negotiation and consultation system can be removed or substantially suppressed. As a result, the situation that the economic power relation between the issue enterprise and the investors gives a large influence to the determination of stock prices can be securely avoided. Therefore, even an issue enterprise whose current popularity level is low but has a promising future growth can issue stocks at an advantageous stock price, which facilitates the procurement of the funds.

Based on this, it is possible to determine the stock price of the unlisted stocks at a rational value taking into the current capacity and the future possibility of the enterprise, reflecting the intention of the total market. Particularly, based on the utilization of the auction method, it is possible to provide a new system and a new method for rationally determining the stock price in the total market. Further, it is possible to provide a new stock transaction system and a method therefore that is suitable as a pipe for connecting between a venture enterprise having future possibility and whose schedule up to the stock open date is not firm and the investors.

Further, when the stock price of the unlisted stocks is going to be determined based on the decision of the total market, it is possible to procure funds based on the selection of investors who reflect the business strategic intention of the issue enterprise by controlling access to the site.

Conventionally, a system that transacts unlisted stocks based on the utilization of the Internet has been known. However, this unlisted stock transaction system basically follows the stock price determination system according to the conventional closed negotiation and consultation system. This system does not have the nature of auction like the present invention. Therefore, this system is not for rationally determining the stock price by taking into account the current position and the future possibility of the issue enterprise. In the case of the stock transaction system of the present invention, the stock price is determined rationally through the auction. At the same time, it is possible to provide information of the on-line processing procedure to the investors and the issue enterprise, and it is possible to procure funds by access control that reflects the business strategy of the issue enterprise.

In the above embodiment, the explanation has been gives about the case where a bidder participates in one stock item at one-time bidding. However, according to the bidding of the present invention, it is also possible that the bidder participates in the bidding of a plurality of stock items at one-time access. The present invention is applied to each stock item.

Further, it is also possible to arrange such that the WWW server mathematically analyzes a result of bidding, calculates index data, and makes this data open to the issue enterprise, and to the investors or the general public according to the needs, in addition to the preparation of a distribution diagram that shows the distribution of bid prices, the highest bid amount and the successful bid amount at each time of the bidding. Based on this arrangement, it is possible to give information about how the market looks at the issue enterprise, to the issue enterprise, in addition to the information of the successful amount. This is considered useful from the viewpoint of the education of the venture. At the same time, it is possible to provide information useful for the subsequent investment activities, to the investors and the general public.

Further, the communication line for connecting between the investors, the enterprise and the management system of the manager is not limited to the Internet. This line may be a computer communication network based on a general public line.

Further, the explanation has been gives about the case where the stock transaction system of the above embodiment employs a membership system. However, users who can use the stock transaction system of the present invention are not necessarily limited to the members; but they may be general public and enterprises who have been provided with ID numbers and passwords.

Further, the auction method for the bidding that can be employed in the stock transaction system of the present invention is not limited. Other type of auction method can also be used.

In the stock transaction system of the present invention, the system of carrying out the auction can be excluded from the system that has been explained above. Instead, there may be employed a structure for carrying out collection of various kinds of information relating to the enterprises and stocks and for carrying out stock transactions in on-line.

The present invention is not limited to the above-described structure of the embodiment, but those skilled in the art can implement the invention in a more suitable mode within a range not deviating from the scope of claim for a patent.

In the present invention, the recording medium is a structure unit of various kinds of memories like a CD-ROM, an FD, an HD, the Internet-type server client, etc. that are recorded with a program for making a computer execute known stock transactions. The recording medium also includes a communication medium.

As explained above, according to the present invention, the same successful bid price to all the successful bidders is automatically determined, and successful bid numbers to all the successful bidders are automatically determined, based on the subscription total number or the subscription total amount, and the bid unit price and the bid number or the bid total amount, respectively. Therefore, the successful bid price and the successful bid numbers are automatically determined according to a constant rule that is fair to all the investors. As the stock price of a transaction item is determined based on only the bid unit price and the bid number that are bid by the bidder, it is possible to form the price objectively and rationally by eliminating the arbitrariness.

According to the next invention, the calculation is carried out until when the cumulative number reaches the subscription total number or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

According to the next invention, the calculation is carried out until when the cumulative amount reaches the subscription total amount or until when the calculation for all the bidders is finished, whichever satisfies the condition earlier. Then, the bid unit price presented by the bidder that becomes the basis of the calculation when the price determination condition is satisfied becomes the successful bid price. Therefore, it is possible to determine the successful bid price objectively and rationally.

According to the next invention, a bid number of each bidder accumulated so far is recalculated, based on the bid unit price presented by a bidder that becomes a new basis of calculation, each time when the cumulative number of the bid number is calculated. Thus, the bid number of the bidder who has bid at a high bid price increases along a fall in the successful bid price. Therefore, the bidder who has bid at a high bid unit price can purchase the transaction item under a more favorable condition. Further, according to this system, there is a tendency that the successful bid number of the bidder of a high bid total amount increases. Further, the successful bid price can be easily set at a high price. Therefore, when the transaction item is unlisted stocks, the issue enterprise can raise more funds while restricting an increase in the number of shareholders.

According to the next invention, when a cumulative number of a bid number does not exceed the subscription total number, the bid number of the bidder becomes the successful bid number. Therefore, in this case, a desired quantity of the transaction item can be allocated to each bidder.

According to the next invention, it is possible to allocate the successful bid numbers with priority in the order of the bids that presented high bid unit prices. As a result, it is possible to give the incentive rationally to the bidders who present high bid unit prices. Further, as the successful bid numbers are determined based on the proportional allocation for the bidders who presented the bid numbers that caused the excess, the remaining successful bid numbers can also be determined rationally according to the bid numbers.

According to the next invention, when the successful bid number is not an integer times of the unit number, this successful bid number is carried up or carried down into an integer times of the unit number. Therefore, it is possible to automatically match the successful bid number with the condition of the unit number. Particularly, in the case of carrying out transactions of a transaction item like stocks that are set with unit numbers, it is possible to secure the validity of the transactions.

According to the next invention, when the successful bid number does not reach the lowest permissible purchase number, the successful bid number is set to 0. Therefore, it is possible to automatically match the successful bid number to the condition of the lowest permissible purchase number. Particularly, in the case of carrying out transactions of a transaction item like stocks that are set with the lowest permissible purchase number, it is possible to secure the validity of the transactions.

According to the next invention, when there are a plurality of bidders who present the same bid unit price that is equal to or higher than a successful bid price, and when it is not possible to determine the successful bidprice based on the proportional allocation, successful bidders are selected by lot from these plurality of bidders. Therefore, when the bid conditions presented by a plurality of bidders are the same, and also when it is not possible to give priority to them, it is possible to automatically process the successful bid. In this case, it is possible to quickly process the successful bid as compared with an artificial lot. Particularly, this system is effective in transactions like electronic transactions in which promptness is required. Further, as the lot is carried out automatically based on a predetermined condition, it is possible to secure objectiveness.

According to the next invention, the information relating to the transaction item and the information relating to the bidders are transmitted to the client unit based on a request from the bidder via the client unit. Therefore, the bidder can confirm the own transaction by referring to the information relating to the transaction item to study the bid or by referring to the own information.

According to the next invention, when a bidder has not received a provision of the information relating to the transaction item, for example, a prospectus, a bid unit price and others posted from this bidder are not taken into account, and this bidder cannot carry out the bid. Therefore, it is possible to verify by estimate that the prospectus has been presented to the bidder prior to the bid. As a result, it is possible to satisfy the legal condition for the bid.

According to the next invention, the information of the record relating to the provision of the information is stored, and a decision is made about whether or not the information has been provided, based on this information. Therefore, it is possible to decide automatically and more securely whether the information has been provided to the bidder or not. As a result, this can satisfy the legal condition for the bid more easily and securely.

According to the next invention, a bidder who can participate in the bidding for the transaction item is selected based on the information relating to the bidder and the basis for selecting a bidder. Therefore, it is possible to automatically select only bidders who have satisfied a constant condition, even when there are a large number of bidders.

According to the next invention, a transaction amount when the bidder has been successful in the bid for the transaction item is calculated based on the bid unit price and the bid number posted from the bidder. Then, this transaction amount is posted to the bidder. Therefore, in the case of transaction of stocks, for example, the bidder can know own successful bid amount, and can confirm the bid contents easily and securely.

According to the next invention, the successful bid stock price and the successful bid stock number can be determined automatically based on the subscription stock number or the subscription total amount, and the bid stock price and the bid stock number or the bid total amount respectively. Therefore, it is possible to carry out objectively and rationally the transactions of unlisted stocks of which price it is difficult to determine because of no actual transaction so far. As a result, it is possible to build up a fair and highly reliable transaction system for unlisted stocks.

According to the next invention, it is possible to automatically satisfy the legal request relating to the stock transaction, by presenting the prospectus to the bidders. Alternatively, an issue enterprise that issues stocks can positively disclose information to investors as bidders, by presenting IR (Investor Relations).

According to the next invention, it is possible to assist the investment management of investors, by presenting the investment record to the investors.

According to the next invention, it is possible to selectively input either a bid unit price and a bid number, or a bid unit price and a bid total amount, and transmit either the bid unit price and the bid number, or the bid unit price and the bid total amount that have been input to the input interface, to the transaction information processing apparatus. Therefore, it is possible to carry out the bid based on the stock number bidding system, by inputting the bid unit price and the bid number. Alternatively, it is possible to carry out the bid based on the total amount bidding system, by inputting the bid unit price and the bid total amount. In other words, a bidder can select either the stock number bidding system or the total amount bidding system, according to the own desire. As a result, the bidder can bid based on the bidding system that is most suitable to satisfy the own needs.

According to the next invention, it is possible to selectively input either a bid stock price and a bid number, or a bid stock price and a bid total amount, thereby to bid to the unlisted stocks.

According to the next invention, the successful bid stock price and the successful bid stock number can be determined automatically based on the subscription stock number or the subscription total amount, and the bid stock price and the bid stock number or the bid total amount respectively. Therefore, it is possible to carry out objectively and rationally the transactions of unlisted stocks of which price it is difficult to determine because of no actual transaction so far. As a result, it is possible to build up a fair and highly reliable transaction system for unlisted stocks.

INDUSTRIAL APPLICABILITY

As explained above, the transaction information processing apparatus, the transaction terminal unit, the transaction information processing method, and the recording medium relating to the present invention are useful as an electronic business transaction system for electronically carrying out transactions of various kinds of products and services. Particularly, the present invention is suitable for an electronic business transaction system of products and services of which price it is difficult to determine because of small volume of actual transaction so far.

The invention claimed is:

1. A transaction information processing apparatus that is connected to a plurality of transaction terminal units via a network, for processing information relating to a predetermined transaction item, the transaction information processing apparatus comprising:
   a subscription information storage unit which stores a subscription total number or a subscription total amount as a condition for inviting bids for the transaction item;

a bid information storage unit which stores a bid unit price and a bid total number or a bid total amount transmitted from each of a plurality of bidders via the respective transaction terminal unit; and a successful bid processing unit operable to carry out a successful bid processing of the transaction item, based on the subscription total number or the subscription total amount stored in the subscription information storage unit, and the bid unit prices and the bid numbers or the bid total amounts stored in the bid information storage unit, the successful bid processing unit including, a successful bid price determination unit operable to determine the same successful bid price to all the successful bidders; and a successful bid number determination unit operable to determine successful bid numbers to all the successful bidders;

wherein when (i) a cumulative bid number of the bid numbers or a cumulative bid amount of the bid amounts by the plurality of bidders exceeds the subscription total number or the subscription total amount, respectively, and (ii) a plurality of bidders present bids that generate said excess and the plurality of bidders exceeding the subscription total number or the subscription total amount present the same bid unit price, then the successful bid number determination unit is operable (a) to determine successful bid numbers of all the bidders who present the same bid unit price as that of the bidder that generates said excess, by proportionally allocating a successful bid number remaining at the time when the excess occurred according to the respective bid numbers of the bidders, or (b) to select, by lot, successful bidders from the plurality of bidders who present the same bid price as that of the bidder that generate the excess.

2. The transaction information processing apparatus according to claim 1, wherein the successful bid price determination unit is operable to calculate the cumulative bid number or the cumulative bid amount (1) until the cumulative bid number or the cumulative bid amount reaches the subscription total number or the subscription total amount, respectively, in the order of bidders of high bid unit prices, or (2) until the calculation for all the bidders is finished, and to determine the bid unit prices presented by the bidders, who are subjects of the calculation when the calculation of the cumulative bid number or the cumulative bid amount is completed, as the successful bid price.

3. The transaction information processing apparatus according to claim 1, wherein when the bid total amount is included in bid information stored in the bid information storage unit, the successful bid price determination unit is operable to recalculate a bid number of each bidder accumulated so far, based on the bid unit price presented by a bidder that becomes a new basis of calculation, each time the cumulative bid number or the cumulative bid amount is calculated.

4. The transaction information processing apparatus according to claim 1, wherein the subscription information storage unit stores a unit number as a unit capable of allocating the transaction item to the bidders, and the successful bid number determination unit is operable to carry up or down a successful bid number into an integer times of the unit number when the determined successful bid number is not an integer times of the unit number.

5. The transaction information processing apparatus according to claim 1, wherein the bid information storage unit stores a lowest permissible purchase number as a lower limit of the successful bid number, and the successful bid number determination unit is operable to set the successful bid number to 0 when the determined successful bid number does not reach the lowest permissible purchase number.

6. The transaction information processing apparatus according to claim 1, further comprising:

a transaction item information storage unit which stores item information relating to the transaction item; and a transmitting unit operable to transmit the item information stored in the transaction item information storage unit to at least one of the transaction terminal units, based on a request made from the bidder via the at least one transaction terminal unit.

7. The transaction information processing apparatus according to claim 6, wherein the successful bid processing unit further comprises:

a reference record storage unit which stores record information when the transmitting unit transmits the item information to said at least one transaction terminal unit, and a decision unit operable to decide whether the bidder has received the provision of the item information, based on the record information stored in the reference record storage unit.

8. The transaction information processing apparatus according to claim 1, further comprising:

a bidder information storage unit which stores bidder information relating to the bidders;

a reference information storage unit which stores reference information that becomes a basis for selecting a bidder who can participate in the bidding for the predetermined transaction item; and a selecting unit operable to select a bidder who can participate in the bidding for the transaction item, based on the bidder information stored in the bidder information storage unit and the reference information stored in the reference information storage unit.

9. The transaction information processing apparatus according to claim 1, further comprising:

a transaction amount calculating unit operable to calculate a transaction amount when the bidder has been successful in the bid for the transaction item, based on the bid unit price and the bid number posted from the bidder; and a communication unit operable to transmit the transaction amount calculated by the transaction amount calculating unit to the transaction terminal unit of said bidder.

10. A transaction terminal unit for transmitting/receiving information relating to a predetermined transaction item to/from the transaction information processing apparatus according to claim 1 connected thereto via a network, the transaction terminal unit comprising:

an input interface for allowing a bidder to selectively input either (i) a bid unit price and a bid number, or (ii) a bid unit price and a bid total amount in a bid for the transaction item; and a transmitting unit for transmitting either (i) the bid unit price and the bid number, or (ii) the bid unit price and the bid total amount that have been input via the input interface, to the transaction information processing apparatus via the network.

11. A transaction information processing method for processing information relating to a predetermined transaction item, the method comprising:
   a subscription condition storage step of storing a subscription total number or a subscription total amount as a condition for inviting bids for the transaction item;
   a bid condition storage step of receiving a bid unit price and a bid number or a bid total amount relating to the transaction item transmitted by each of a plurality of bidders from respective transaction terminal units via the network, and storing the received information; and
   a successful bid number determination step of determining a successful bid number of the transaction item, based on the subscription total number or the subscription total amount stored at the subscription condition storage step, and the bid unit price and the bid number or the bid total amount stored at the bid condition storage step,
   wherein, in the successful bid number determination step, when
   (i) a cumulative bid number of the bid numbers or a cumulative bid amount of the bid amounts by the plurality of bidders exceeds the subscription total number or the subscription total amount, respectively, and
   (ii) a plurality of bidders present bids that generate said excess and the plurality of bidders exceeding the subscription total number or the subscription total amount present the same bid unit price,
   then
   (a) successful bid numbers of all the bidders, who present the same bid unit price as that of the bidder that generates said excess, are determined by proportionally allocating a successful bid number remaining at the time when the excess occurred according to the respective bid numbers of the bidders, or
   (b) successful bidders are selected, by lot, from the plurality of bidders who present the same bid price as that of the bidder that generate the excess.

12. The transaction information processing method according to claim 11, further comprising a successful bid price determination step, wherein
   when the subscription total number is stored as a condition for inviting bids,
   then
   (I) the cumulative bid number or the cumulative bid amount is calculated (1) until the cumulative bid number or the cumulative bid amount reaches the subscription total number or the subscription total amount, respectively, in the order of bidders of high bid unit prices, or (2) until the calculation for all the bidders is finished, and
   (II) the bid unit price presented by the bidders, who are subjects of the calculation when the calculation of the cumulative bid number or the cumulative bid amount is completed, is determined as the successful bid price.

13. The transaction information processing method according to claim 11, further comprising
   a successful bid price determination step, wherein
   when the bid total number or the bid total amount is stored,
   then a bid number of each bidder accumulated so far is recalculated based on the bid unit price presented by a bidder that becomes a new basis of calculation, each time the cumulative bid number or the cumulative bid amount is calculated.

14. The transaction information processing method according to claim 11, further comprising:
   a bidder information setting step of setting bidder information relating to the bidders;
   a reference information setting step of setting reference information that becomes a basis for selecting a bidder who can participate in the bidding for the predetermined transaction item; and
   a selection step of selecting a bidder who can participate in the bidding for the transaction item, based on the bidder information set at the bidder information setting step and the reference information set at the reference information setting step.

15. A computer readable medium storing therein instructions, which when executed by a computer cause the computer to perform as:
   a subscription condition storage unit which stores a subscription total number or a subscription total amount as a condition for inviting bids for a predetermined transaction item;
   a bid condition storage unit operable to receive a bid unit price and a bid number or a bid total amount relating to the transaction item transmitted by each of a plurality of bidders via a network, and to store the received information; and
   a successful bid processing unit operable to carry out a successful bid processing of the transaction item, based on the subscription total number or the subscription total amount stored in the subscription condition storage unit, and the bid unit price and the bid number or the bid total amount stored in the bid condition storage unit, the successful bid processing unit comprising:
   a successful bid price determination unit operable to determine the same successful bid price to all the successful bidders; and
   a successful bid number determination unit operable to determine successful bid numbers to all the successful bidders;
   wherein when
   (i) a cumulative bid number of the bid numbers or a cumulative bid amount of the bid amounts by the plurality of bidders exceeds the subscription total number or the subscription total amount, respectively, and
   (ii) a plurality of bidders present bids that generate said excess and the plurality of bidders exceeding the subscription total number or the subscription total amount present the same bid unit price,
   then the successful bid number determination unit is operable
   (a) to determine successful bid numbers of all the bidders who present the same bid unit price as that of the bidder that generates said excess, by proportionally allocating a successful bid number remaining at the time when the excess occurred according to the respective bid numbers of the bidders, or
   (b) to select, by lot, successful bidders from the plurality of bidders who present the same bid price as that of the bidder that generate the excess.

* * * * *